United States Patent [19]
Kinjo et al.

[11] Patent Number: 5,504,642
[45] Date of Patent: Apr. 2, 1996

[54] MAGNETIC RECORDING/REPRODUCING APPARATUS HAVING A LOCUS PLANE OF ROTARY HEADS TILTABLE WITH RESPECT TO A LOWER DRUM

[75] Inventors: Hisao Kinjo; Hiromichi Hirayama, both of Yokohama, Japan

[73] Assignee: Victor Company of Japan, Ltd., Yokohama, Japan

[21] Appl. No.: 126,221

[22] Filed: Sep. 23, 1993

[30] Foreign Application Priority Data

| Nov. 25, 1991 | [JP] | Japan | 4-338154 |
| Sep. 24, 1992 | [JP] | Japan | 4-279577 |
| Oct. 15, 1992 | [JP] | Japan | 4-302852 |
| Mar. 9, 1993 | [JP] | Japan | 5-075252 |

[51] Int. Cl.⁶ ............................. G11B 5/588; G11B 15/61
[52] U.S. Cl. ............................ 360/109; 360/130.24
[58] Field of Search ............................ 360/107, 109, 360/84, 130.24

[56] References Cited

U.S. PATENT DOCUMENTS

| 4,541,557 | 9/1985 | Fell et al. | 226/191 |
| 4,703,370 | 10/1987 | Inoue et al. | 360/10.2 |
| 5,067,035 | 11/1991 | Kudelski et al. | 360/85 |

FOREIGN PATENT DOCUMENTS

| 0270155 | 6/1988 | European Pat. Off. | |
| 3217762A1 | 12/1983 | Germany . | |
| 61-158633 | 10/1986 | Japan . | |
| 4-295657 | 10/1992 | Japan . | |
| 2060974 | 5/1981 | United Kingdom . | |
| 2155685 | 9/1985 | United Kingdom | 360/130.24 |
| WO88/09550 | 12/1988 | WIPO . | |

Primary Examiner—John H. Wolff
Assistant Examiner—Craig A. Renner
Attorney, Agent, or Firm—Michael N. Meller

[57] ABSTRACT

The present invention relates to a magnetic recording/reproducing apparatus capable of performing a fast forward reproduction, a fast backward reproduction, a still picture reproduction and the time-lapse recording. The magnetic recording/reproducing apparatus according to the present invention realizes a preferred reproduced image containing no noise-bar, by correcting deviation of magnetic heads mounted on an upper drum from intended tracks depending on a difference in tape running speed between a recording operation and a reproducing operation by tilting the upper drum about a predetermined pivot point with respect to a lower drum having a lead formed thereon. Further, the magnetic recording/reproducing apparatus according to the present invention realizes a preferred reproduced image containing no noise-bar even for a signal recorded in a narrow track pattern in an extended time recording mode, by correcting a slight separation of the magnetic tape from the lead due to a tilt of the upper drum, by tilting the lower drum.

15 Claims, 73 Drawing Sheets

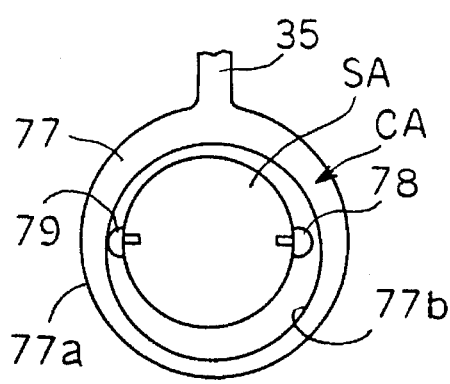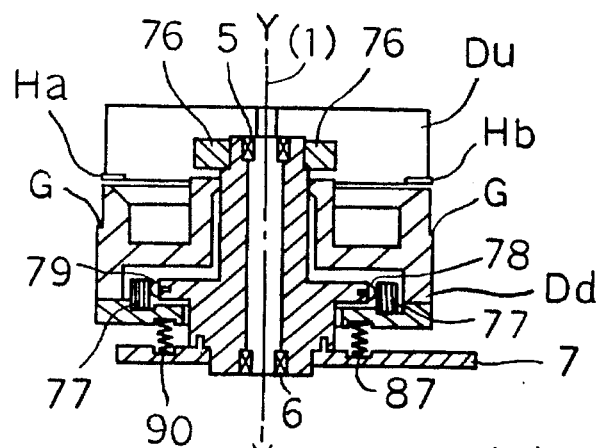
Fig.11 (b)　　Fig.11 (a)
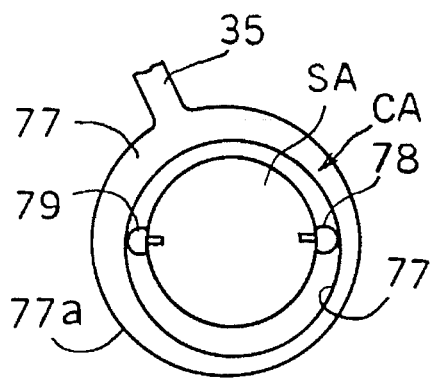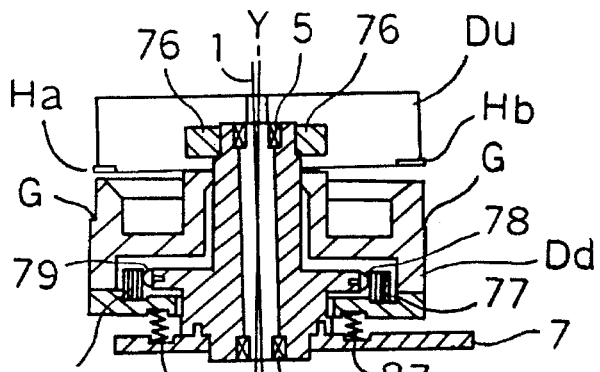
Fig.11 (d)　　Fig.11 (c)
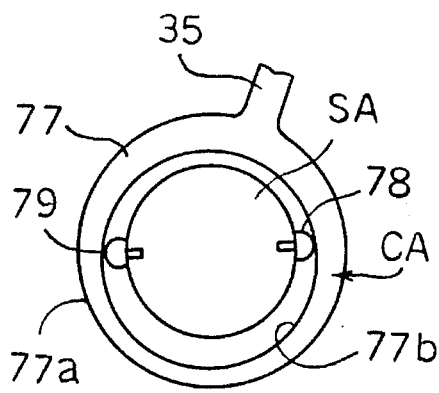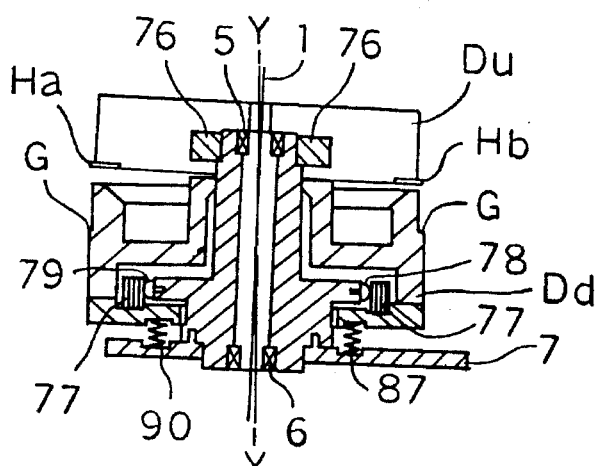
Fig.11 (f)　　Fig.11 (e)

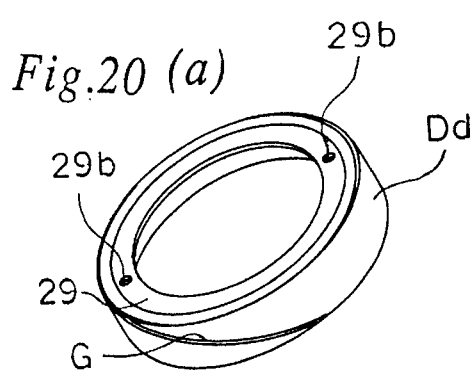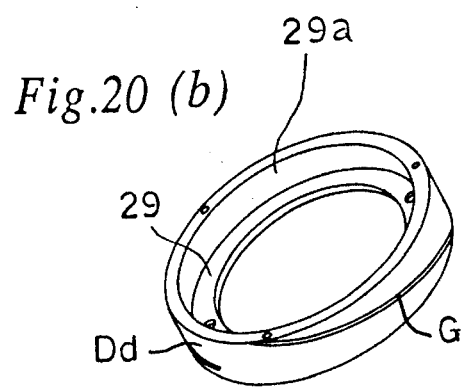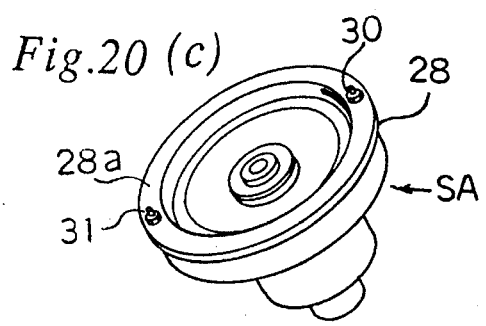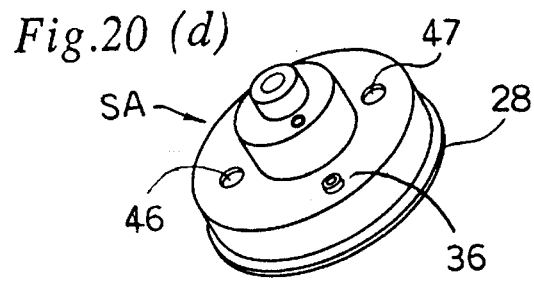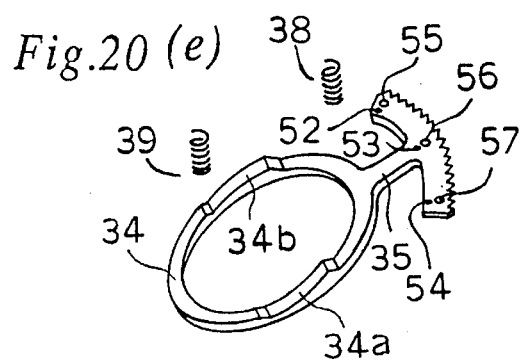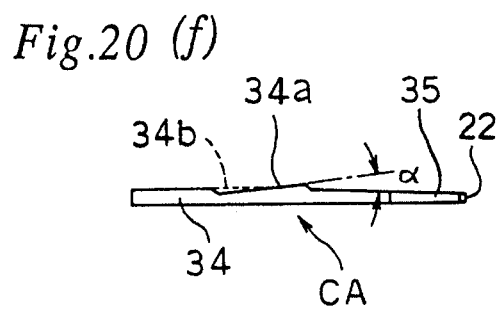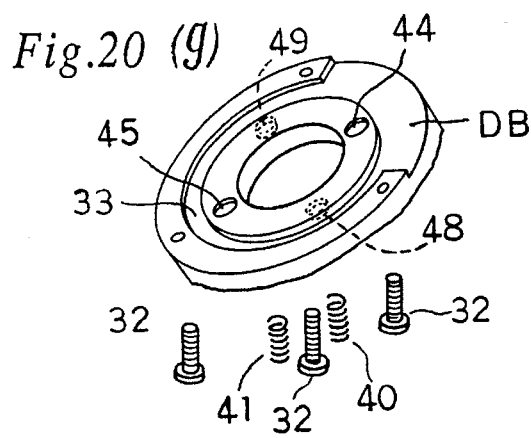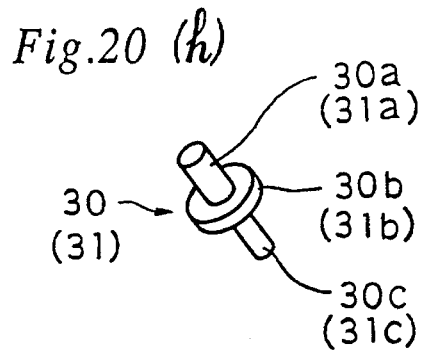

Fig.25
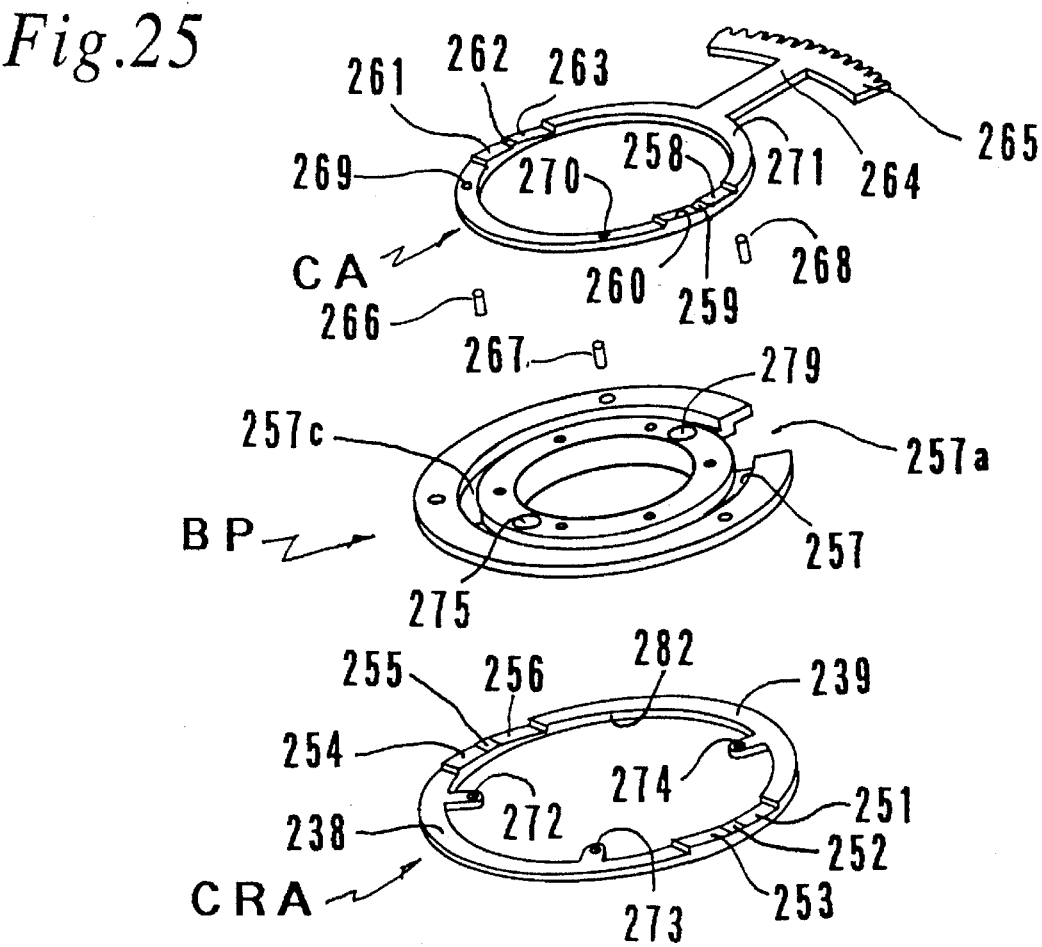
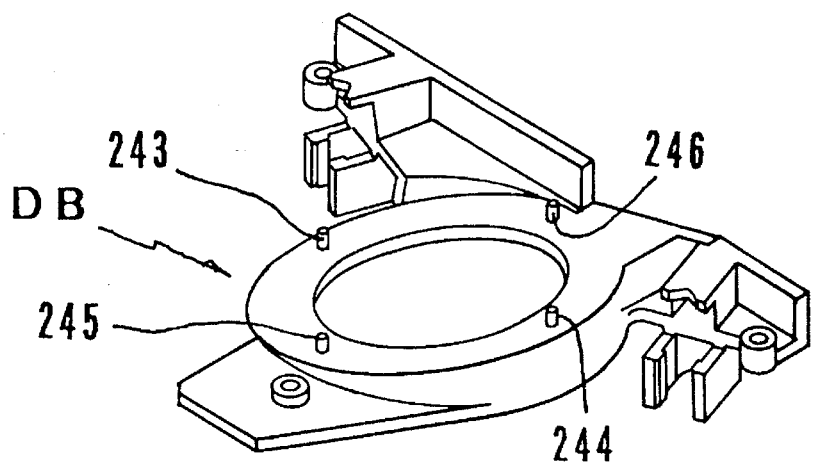
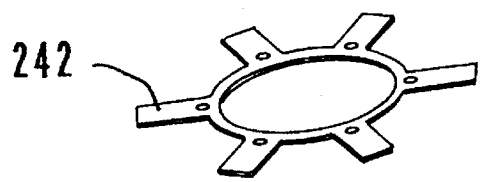

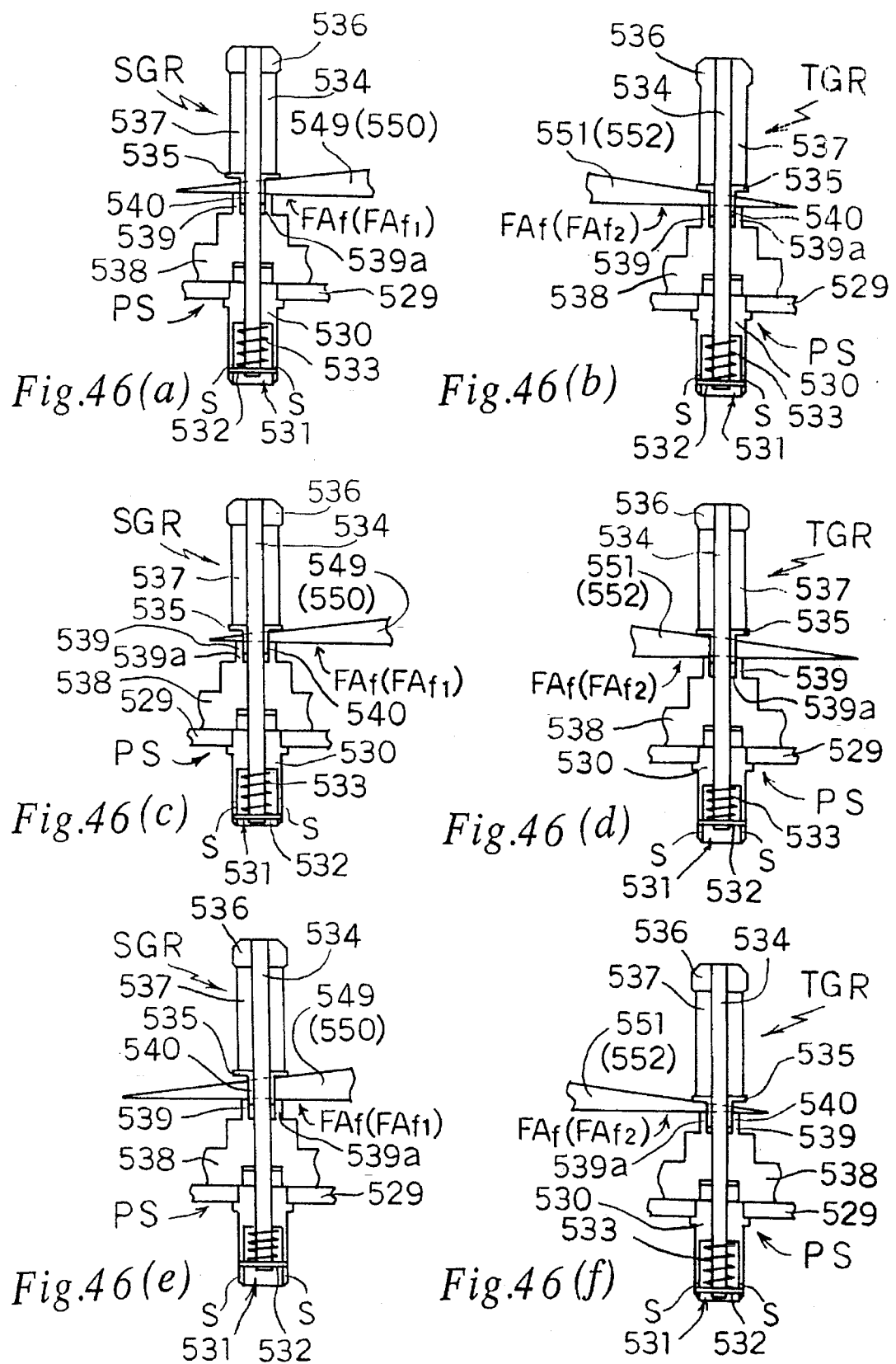

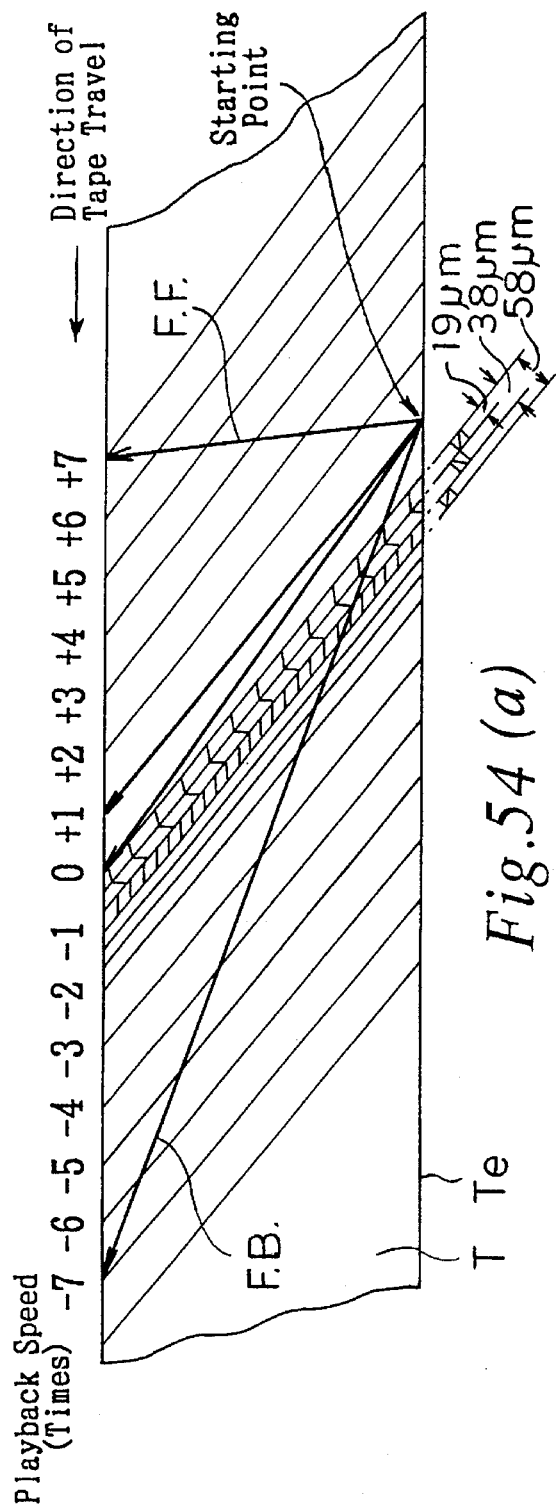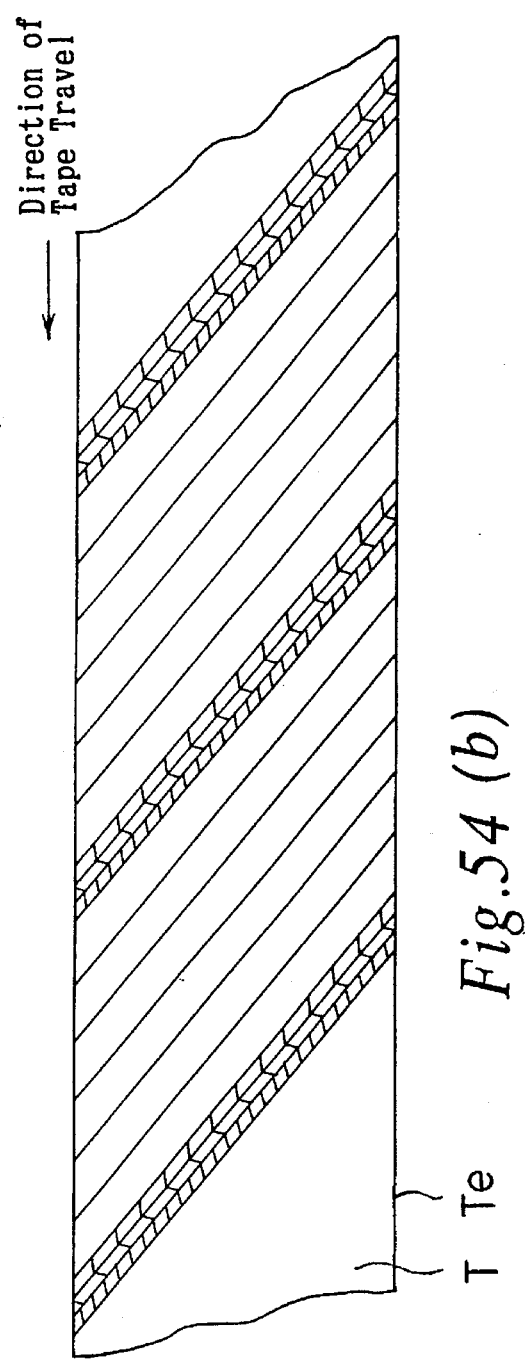
Fig.54 (a)
Fig.54 (b)

MAGNETIC RECORDING/REPRODUCING APPARATUS HAVING A LOCUS PLANE OF ROTARY HEADS TILTABLE WITH RESPECT TO A LOWER DRUM

BACKGROUND OF THE INVENTION

1. Field of the Invention

The present invention relates to a magnetic recording/ reproducing apparatus and, particularly, to a magnetic recording/reproducing apparatus in which a rotary magnetic head can reliably trace recorded tracks on a magnetic tape by changing a spatial positional relation between a rotary locus plane of the rotary magnetic head and the magnetic tape correspondingly to a change of running speed of the magnetic tape running along a portion of a peripheral surface of a drum in slide contact therewith.

2. Description of the Prior Art

A typical example of the magnetic recording/reproducing apparatus which performs a recording/reproducing operation by helically scanning a magnetic tape running at a certain speed along a peripheral surface of a drum composed of an upper drum and a lower drum in slide contact with a portion of the peripheral surface with a rotary magnetic head (referred to as "magnetic head", hereinafter) may be a video tape recorder (referred to as "VTR", hereinafter).

It is usual that a VTR of this type is provided with, in addition to a function of normal reproduction in which a recorded information is reproduced while running a magnetic tape at the same speed as that used in recording operation, with a function of the so-called variable speed reproduction (referred to as "trick play", hereinafter) in which a reproduction is performed while running a magnetic tape at a speed (including "stopping") different from the magnetic tape speed used in the recording, in a direction which may be different from the tape running direction in a recording operation.

Further, a VTR is also available in which an event is recorded over a considerably long time while running a magnetic tape intermittently such as in time-lapse (intermittent) recording or frame-by-frame recording operation and the magnetic tape thus recorded is reproduced at an industrial standard tape speed.

An example of a general magnetic tape running system in the vicinity of a drum of a VTR is shown in FIG. 51. In FIG. 51, a magnetic tape T supplied from a supply reel (not shown) is transported along a known tape transport system and then wound on a slanted drum DA composed of an upper drum Du and a lower drum Dd over a predetermined angle while being made slanted with respect to the drum DA through a supply side guide roller SGR, a supply side slanted pole 26, a take-up side slanted pole 27 and a take-up side guide roller TGR. After passed through the take-up side guide roller TGR, the magnetic tape is transported through a known tape transport system and taken up on a take-up reel (not shown).

During this transportation, a recorded track pattern (referred to as "tape pattern" or "track pattern", hereinafter) such as that shown in FIG. 53 is formed on the magnetic tape T by rotary magnetic heads Ha and Hb mounted on the drum DA.

In FIG. 53, a straight line connecting a "start" point at a lower edge of the magnetic tape T to a point +1 and a number of lines parallel to the straight line are center lines of respective tracks. When the magnetic tape T having such track pattern as shown is reproduced while running it in the same direction as a recording direction at the same speed as a recording speed, the rotary magnetic heads Ha and Hb trace the respective tracks, resulting in a normal reproduction.

However, when the magnetic tape running direction and/ or its running speed during a reproducing operation are different from those in the recording operation, a locus of the magnetic heads Ha and Hb on the magnetic tape T becomes such as shown by FF, STILL or FB in FIG. 53 since a relative linear speed of the magnetic tape T to the magnetic heads is changed.

In FIG. 53, straight lines connecting the start point to respective points +2, +3, . . . +7 are loci of the magnetic heads Ha and Hb on the magnetic tape T when the magnetic tape runs in a forward direction, that is, the same direction (shown by a sign +) as that in recording operation at a speed twice, triplex, . . . or seven-times the recording magnetic tape speed, respectively (this will be referred to as "FF reproduction", hereinafter).

Similarly, straight lines connecting the start point to respective points −2, −3, . . . −7 are loci of the magnetic heads Ha and Hb on the magnetic tape T when the magnetic tape runs in an opposite direction (shown by a sign −) to that in recording operation at a speed twice, triplex, . . . seven-times the recording magnetic tape speed, respectively (this will be referred to as "FB reproduction", hereinafter).

Incidentally, a straight line connecting the start point to a point 0 in an upper edge of the magnetic tape T is a locus of the magnetic heads Ha and Hb on the magnetic tape T when a reproducing operation is performed while the magnetic tape T is stopped (this will be referred to as "still reproduction", hereinafter).

For a VTR of a VHS (registered trade mark) system which is a typical example of a VTR system, it is general that a magnetic tape T runs while being helically wound on an outer peripheral surface of a rotary drum having diameter of 62 mm and rotating at 1800 rpm over an angle range of about 180°. In a recording of a standard mode (referred to as "SP mode", hereinafter), the magnetic tape is transported at a rate of 33.35 mm/second and a locus of the rotary magnetic head having track width of 58 μm on the magnetic tape T forms a video track angle of 5°58'9.9" with respect to a reference edge Te of the magnetic tape T as shown in FIG. 53. In addition to the SP mode, the VTR of VHS system has a triplex mode (referred to as "EP mode", hereinafter) in which the magnetic tape T is transported at 11.12 mm/second and recorded by a rotary magnetic head having track width of 19 μm. In the EP mode in which the magnetic tape running speed and the track width are one-third those in the SP mode, respectively, a recording time becomes three times that in the SP mode. However, it is more difficult than in the case of the SP mode to exactly trace the respective tracks with the rotary magnetic heads Ha and Hb in the trick play, due to the narrower track width recorded on the magnetic tape, as will be described later.

In a case where the magnetic tape T is made stationary, a locus of the rotary magnetic head on the magnetic tape T makes an angle of 5°56'7.4" with respect to the reference edge Te of the magnetic tape T. Further, in this case, a straight line connecting the start point to the point +7 on the upper edge of the magnetic tape T in the SP mode shown in FIG. 53 makes an angle of 6°10'54" with respect to the reference edge Te of the magnetic tape T and the straight line connecting the start point to the point −7 in the SP mode makes an angle of 5°42'25.7" with respect to the reference edge Te.

As is clear from the track pattern shown in FIG. 53, the track pattern recorded on the magnetic tape T in the SP mode intersects the locus of the rotary magnetic heads Ha and Hb on the magnetic tape T in the trick play. Therefore, a signal level of an FM signal reproduced in the trick play is considerably changed every time when the rotary magnetic heads Ha and Hb intersect the recorded track, resulting in an envelope of the FM signal in one vertical scan period as shown in FIG. 52(b), which includes a large variation. Due to this fact, an image reproduced in the trick play includes noise and is low in quality.

Recently, a VTR of new type which is capable of recording/reproducing a High Definition TV (trade name, referred to as "HDTV", hereinafter) image information has been proposed in which a magnetic tape T is recorded with 3 tracks each being 19 μm wide simultaneously in parallel to form a recorded pattern such as shown in FIG. 54(a). In this VTR, two adjacent tracks of the 3 tracks are used by two rotary magnetic heads whose azimuth angles are opposite, to perform a recording/reproducing of a video image signal and the remaining track is used by another rotary magnetic head to perform a recording/reproducing of a sound signal.

In a case where a magnetic tape T recorded by the new type VTR is reproduced while feeding or rewinding the tape at a higher speed than a recording speed, a locus of the rotary magnetic heads on the magnetic tape T becomes a straight line connecting a "start point" in FIG. 54(a) to a point on an upper edge of the tape indicated by +7 or −7, so that the rotary magnetic heads perform the reproducing operation while intersecting the three recorded tracks on the magnetic tape T. Therefore, a reproduced image shall includes many noise-bars.

Further, there are many digital VTRs for home use which have been proposed recently, in which an image signal is recorded by compressing an amount of data thereof with using the High Efficiency Coding System. When, in such digital VTR, a rotary magnetic head performs a reproduction such as FF reproduction or FB reproduction in which the rotary magnetic head crosses recorded tracks of a magnetic tape, an image reproduction may become completely impossible dependent on orientation of data blocks arranged in a mosaic.

In order to solve such problem, it is enough to make the locus of the rotary magnetic head coincident with the recorded track of the magnetic tape T. In order to realize this, the following methods have been proposed:

(1) A rotary magnetic head is mounted on an electro-mechanical transducer as an actuator and the rotary magnetic head is displaced to a direction intersecting the recorded track of the tape by controlling the electro-mechanical transducer by means of an open or closed loop control circuit so that the magnetic head follows the recorded track;

(2) As disclosed in, for example, Japanese Utility Model Publication No. Sho 63-34126 or Japanese Utility Model Laid-open No. Sho 61-158633, a rotary drum on which magnetic heads are mounted and a lower drum are inclined together so that the rotary magnetic heads follow the recorded track of the magnetic tape T; and (3) As disclosed in, for example, Japanese Patent Publication No. Sho 61-22376, magnetic tape guides provided on an entrance and exit sides of a drum for limiting height of the tape in width direction are changed in height so that the rotary heads follow the recorded track of the magnetic tape.

However, in a VTR which employs the method (1) above, the electro-mechanical transducer must be provided in a small space within the rotary drum and, therefore, the electro-mechanical transducer must be small in size and compact in shape. It is difficult to sufficiently displace the rotary magnetic heads with such a small electro-mechanical transducer. Further, it is necessary to maintain a head-touch state of the rotary magnetic heads with respect to the magnetic tape acceptably even if the rotary heads can be displaced considerably by the electro-mechanical transducer. However, it is difficult to always maintain such acceptable head-touch by using a small actuator having an acceptable operational characteristics. In addition, with such actuator, due to its limited frequency-amplitude response, cability of noiseless search is practically limited up to ± 3 times speed in the SP mode, thus a ±5 times or a ±7 times speed noiseless search can not be realized.

In a VTR which employs the method (2), particularly, disclosed in Japanese Utility Model Publication No. Sho 63-34126, an arc shaped tape lead for guiding the reference edge Te of the magnetic tape T substantially point-contacts with the reference edge Te. Therefore, a portion of the reference edge Te which does not contact with the tape lead becomes very unstable necessarily. Although the normal reproduction is possible when the magnetic tape T is recorded at relatively low recording density, that is, when the width of recorded track is relatively large, it is impossible to sufficiently remove noise-bars in the FF or FB reproduction. This problem becomes more severe when the magnetic tape T is recorded at relatively high density such as in EP mode operation of a VTR of the VHS system, that is, when the recording track width is relatively small.

Further, in a VTR which employs the method (2), particularly, disclosed in Japanese Utility Model Laid-open No. Sho 61-158633 and in which the guide member for guiding the reference edge Te of the magnetic tape T over a predetermined distance is provided in a fixed portion of the VTR arranged separately from the lower drum, it is possible to remove the positional deviation of the reference edge Te which may be caused in the magnetic recording/reproducing device disclosed in Japanese Utility Model Publication No. Sho 63-34126, during at least the normal reproducing operation. However, if, in order to perform the FF reproducing operation or the FB reproducing operation, the rotary drum on which the magnetic head is mounted is inclined together with the lower drum, the magnetic tape T which is running while being in slide contact with the surface of the upper and lower drums is also inclined, resulting in that the reference edge Te tends to deviate away from the guide member and thus noise-bars are produced on a reproduced image.

That is, when this method is applied to a VTR of the VHS system, there is substantially no noise-bar generated on a reproduced image in the SP mode even if, in order to perform the FF or FB reproducing operation, the rotary drum and the lower drum are slanted together because the track width of the magnetic tape T is as wide as 58 μm in the SP mode. That is, an effect of such deviation of a portion of the reference edge Te away from the guide member on such wide track is very small. However, in the EP mode of operation, the recorded track width is 19 μm which is one-third that in the SP mode. Therefore, the effect of such deviation on the track becomes larger, causing noise-bars.

This phenomenon also occurs in the previously mentioned HDTV in which the recorded track pattern including three parallel recorded tracks, each 19 μm wide, such as that shown in FIG. 54(a) is formed on the magnetic tape T.

SUMMARY OF THE INVENTION

Accordingly, it is a general object of the present invention to provide an improved magnetic recording/reproducing apparatus in which there is no noise-bar generated when a magnetic tape is reproduced at a speed different from a recording speed or the magnetic tape is reproduced while being fed in a reverse direction to the recording direction.

Another and specific object of the present invention is to provide a magnetic recording/reproducing apparatus in which a recording is made with such a drum of which the lead angle of the lower drum is made to 5°58'9.9" with respect to the reference edge Te of the magnetic tape, so that a recording of frame by frame picture in a unit of field or frame of television signal is performed, and that the pattern of the frame by frame recording satisfies the VHS industry standard, and when such recording is played back continuously at normal speed reproduction, continuously moving pictures such as for computer graphic pictures are obtained.

Still another and specific object of the present invention is to provide a magnetic recording/reproducing apparatus which includes a drum pair composed of an upper drum and a lower drum having at least a lead portion for guiding a reference edge of a magnetic tape and a slide-contact surface portion adapted to be in slide-contact with the magnetic tape wound on a portion of a peripheral surface of the drum pair in slanted state and recording a signal in slanted tracks on the magnetic tape and reproduces the signal therefrom by rotary magnetic heads provided on the peripheral surface of the drum pair, the magnetic recording/reproducing apparatus comprises a pivot point provided on a straight line contained in a locus plane or in the vicinity of the locus plane of the magnetic heads and orthogonal to a center axis of the lower drum and locus plane tilting device for tilting the locus plane of the rotary magnetic heads about the straight line by a predetermined angle.

Other objects and further features of the present invention will be apparent from the following detailed description with respect to preferred embodiments of the invention when read in conjunction with the accompanying drawings.

BRIEF DESCRIPTION OF THE DRAWINGS

FIGS. 11(a) through 11(f) shows a relation between a cam member for slant regulation and a slanted state of an upper drum in the fourth embodiment;

FIGS. 20(a) through 20(h) is a disassembled perspective view of the drum pair shown in FIGS. 19(a) and (b);

FIG. 25 is a disassembled perspective view of the drum pair shown in FIGS. 23(a) and (b) or 24;

FIGS. 44(a) through 44(f) is a cross sectional side view of a portion of the construction shown in. FIGS. 43(a) and (b);

FIGS. 46(a) through 46(f) is a cross sectional side view of a portion of the construction shown in FIG. 45;

FIGS. 54(a) and 54(b) illustrates another tape pattern.

DETAILED DESCRIPTION OF THE PREFERRED EMBODIMENT

First, a first type main portion and a second type main portion of a magnetic recording/reproducing apparatus to which the present invention can be applied will be described with reference to FIGS. 1 and 18 and, then, embodiments of the present invention will be described in detail.

Figure 1:
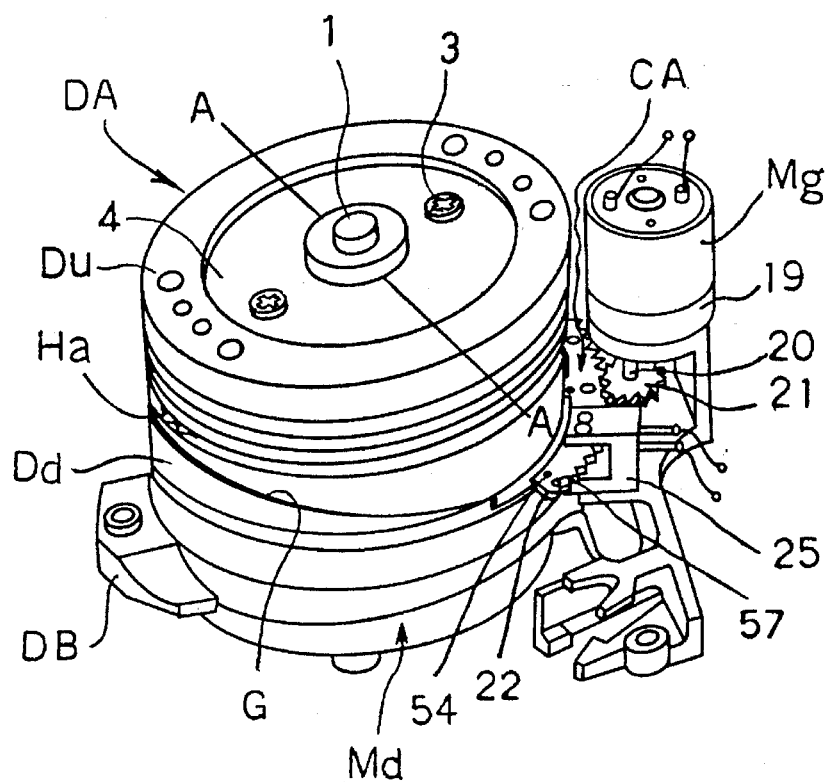
FIG. 1 is an oblique view of a construction of a main portion of a magnetic recording/reproducing apparatus according to the present invention, showing a drum motor provided below a lower drum thereof.

FIG. 1 is a perspective view of a main portion of a magnetic recording/reproducing apparatus according to the present invention, which belongs to the first type in which a drum motor Md is provided below a lower drum Dd.

Figure 18:
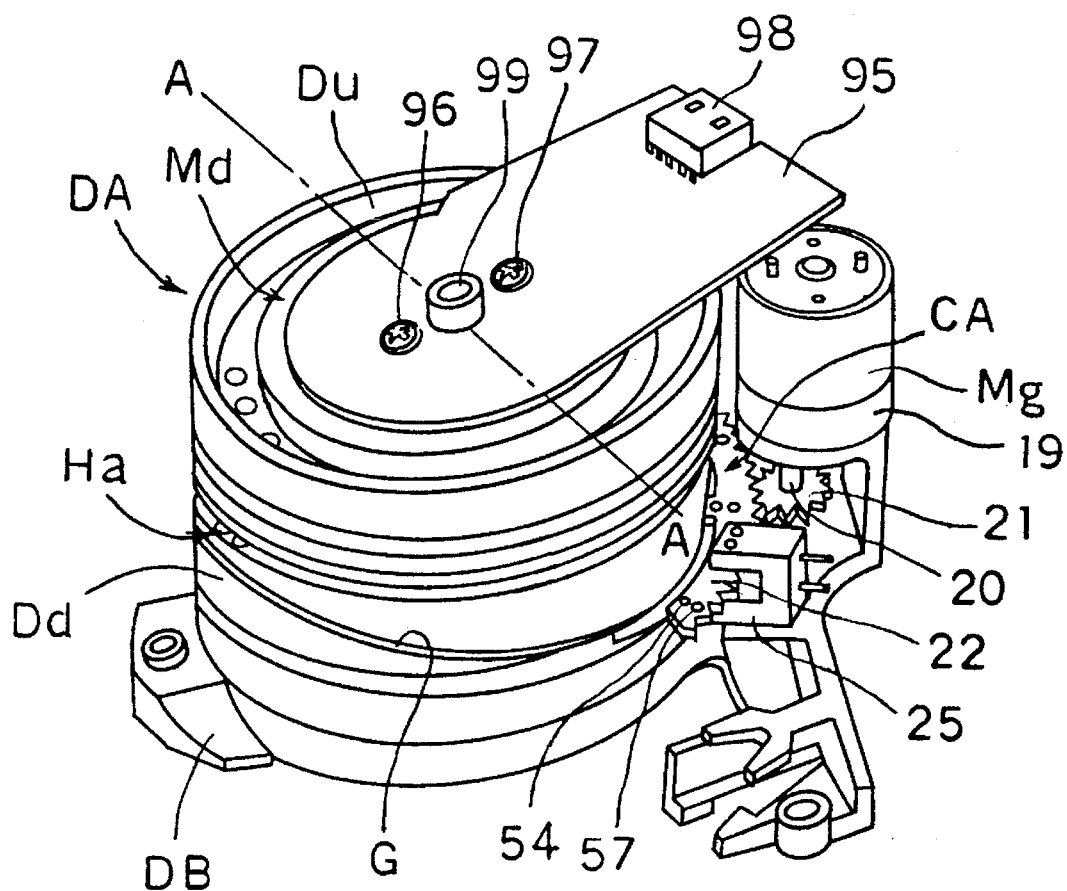
FIG. 18 is a perspective view of another construction of a drum pair which is a main portion of a magnetic recording/ reproducing apparatus, showing a drum motor arranged above an upper drum.

FIG. 18 is a perspective view of a main portion of a magnetic recording/reproducing apparatus according to the present invention, which belongs to the second type in which a drum motor Md is provided above an upper drum Du.

In FIGS. 1 and 18, a drum pair DA is composed of the upper drum Du and the lower drum Dd which is fixedly mounted on a drum base DB. The upper drum Du may be a rotary drum or a stationary drum. In the latter case, any known member such as an intermediate rotary drum or a head bar, etc., which mounts a magnetic head or heads thereon may be provided between the upper drum Du and the lower drum Dd. In embodiments of the present invention to be described in detail later, however, the upper drum Du is a rotary drum on which a magnetic head Ha is mounted.

In FIGS. 1 and 18, the magnetic head Ha includes a magnetic head (referred to as "SP head", hereinafter) for standard (tape speed) play (SP) mode and a magnetic head (referred to as "EP head", hereinafter) for extended play (EP) mode arranged adjacently to the SP head. A rotary magnetic head Hb (cf. FIG. 4) is mounted on the upper rotary drum Du symmetrically to the magnetic head Ha with an angle of 180°. Other magnetic heads than the magnetic heads Ha and Hb may be mounted on the upper drum Du as usual.

Figure 53:
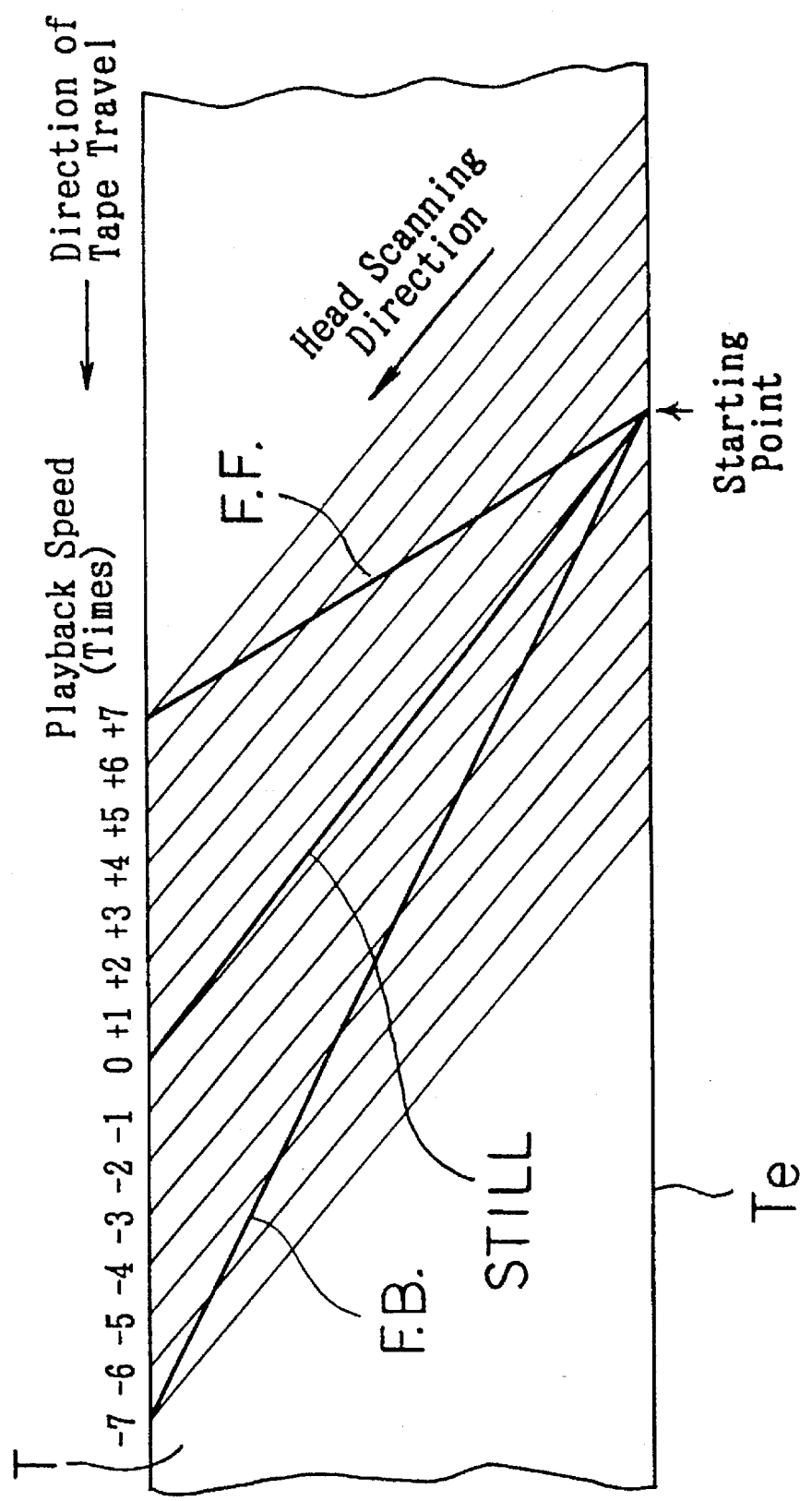
FIG. 53 illustrates a tape pattern.

As mentioned, the lower drum Dd fixedly mounted on the drum base DB which functions as a portion of the fixed portion of the magnetic recording/reproducing apparatus has a guide portion G formed on an outer peripheral surface thereof, which guide portion serves to restrict a position of a reference edge Te of a magnetic tape T (See FIG. 53). The magnetic tape T wound on a portion of the peripheral surface of the drum pair DA regardless of reproducing mode of the magnetic recording/reproducing apparatus is stopped or transported on the outer peripheral surface of the drum pair DA with the reference edge Te thereof being guided along the guide portion G, reliably.

Figure 2:
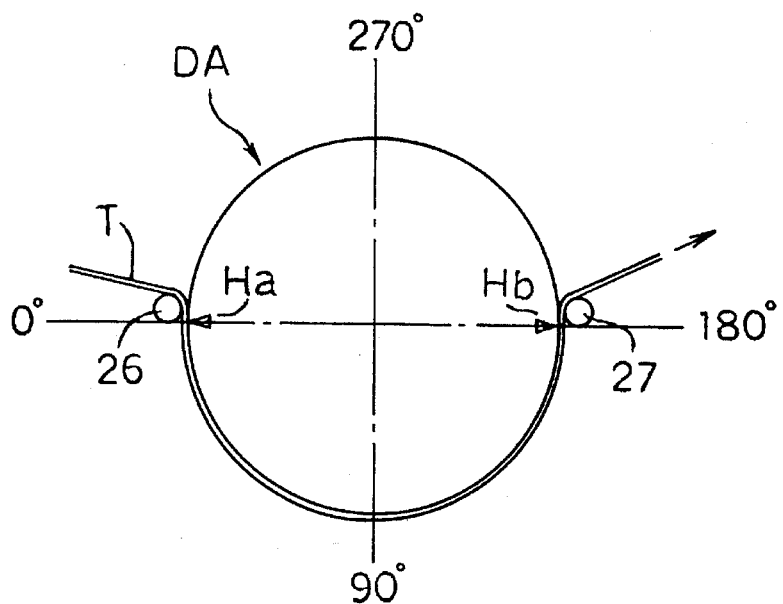
FIG. 2 is a plan view of a drum pair.

FIG. 2 is a plan view of the drum pair DA having an outer peripheral surface on a portion of which the magnetic tape T is wound. In FIG. 2, reference numerals 26 and 27 are slanted poles which constitute a portion of a mechanism for loading the magnetic tape T on the outer peripheral surface of the drum pair DA. The magnetic tape T is wound over a region of the surface of the drum pair DA corresponding to an angle slightly larger than 180° at the center angle of the drum.

In the same figure, 0 depicts a position of a center axis of the lower drum Dd and a center of the magnetic tape T wound over the region corresponds to a position indicated by 90°. A straight line L1 connects the center axis of the lower drum Dd to the center position of the magnetic tape portion wound on the drum pair DA and a straight line L2 passes the center axis O orthogonally to the straight line L1.

Figure 3:
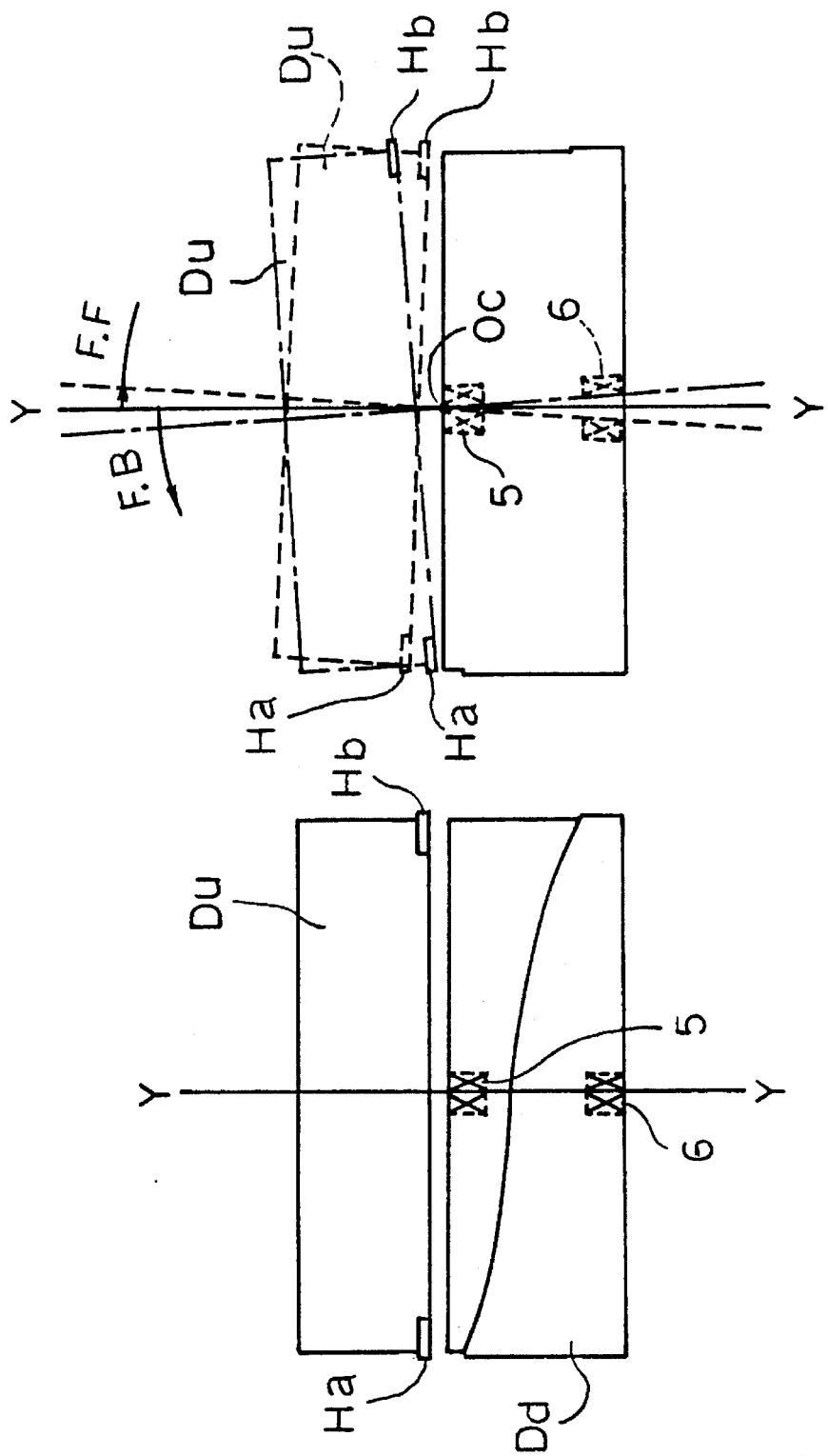
FIGS. 3(a) and 3(b) is a side view of the drum pair showing a constructive principle of the magnetic recording/reproducing apparatus according to the present invention and an operational principle thereof.

In the magnetic recording/reproducing apparatus according to the present invention, a position of the center axis of the lower drum Dd which is fixedly mounted on the drum base DB serving as a portion of the fixed portion of the apparatus is always maintained at a constant position indicated by a straight line Y—Y in FIG. 3.

Figure 4:
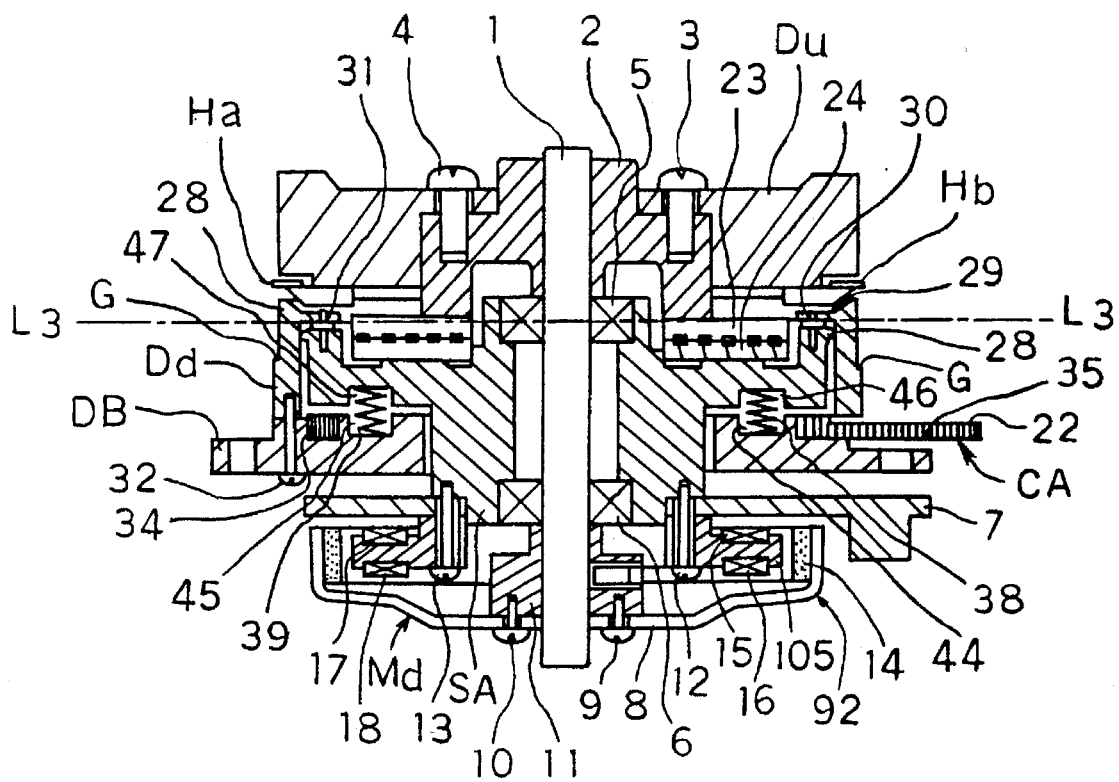
FIGS. 4(a) and 4(b) is a cross section of the drum pair which is a main portion of a magnetic recording/reproducing apparatus according to a first embodiment of the present invention.
Figure 4:
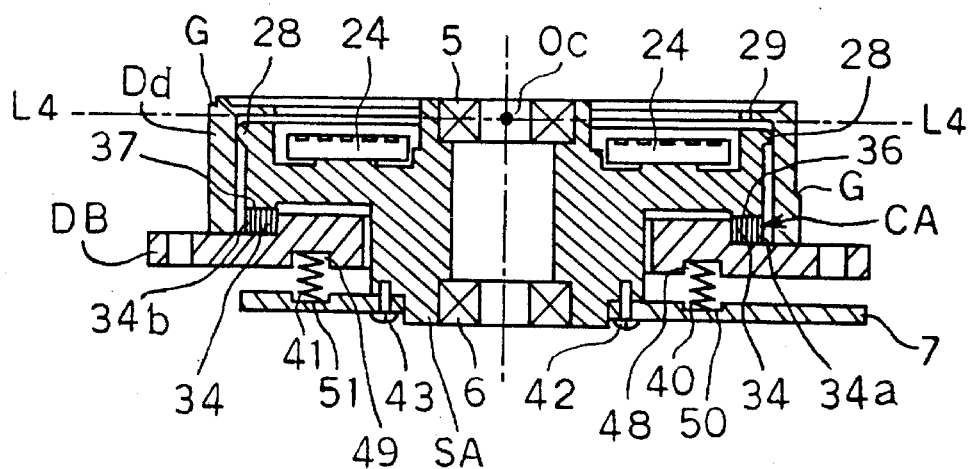

In FIG. 1, the upper drum Du on which the magnetic heads Ha and Hb are mounted is mounted on an intermediate member SA (cf. FIGS. 4 and 5) through bearings 5 and 6 mounted on a rotary shaft 1 of the drum motor Md. As shown in FIG. 4, the intermediate member SA is provided in suspended state between the drum base DB and the lower drum Dd and substantially within an inner space 29a of the lower drum Dd and rotatably supports the rotary shaft 1 through the bearings 5 and 6. The intermediate member SA can be slanted by a pressing force exerted by a slant regulating annular cam member CA (referred to as "annular cam member", hereinafter) (see FIGS. 4 and 5). With the intermediate member SA slanted, the center axis of the upper drum Du is changed within a range defined by a chain line (FB reproduction) and a dotted line (FF reproduction) with a center point being Oc, as shown in FIG. 3(b).

Figure 19:
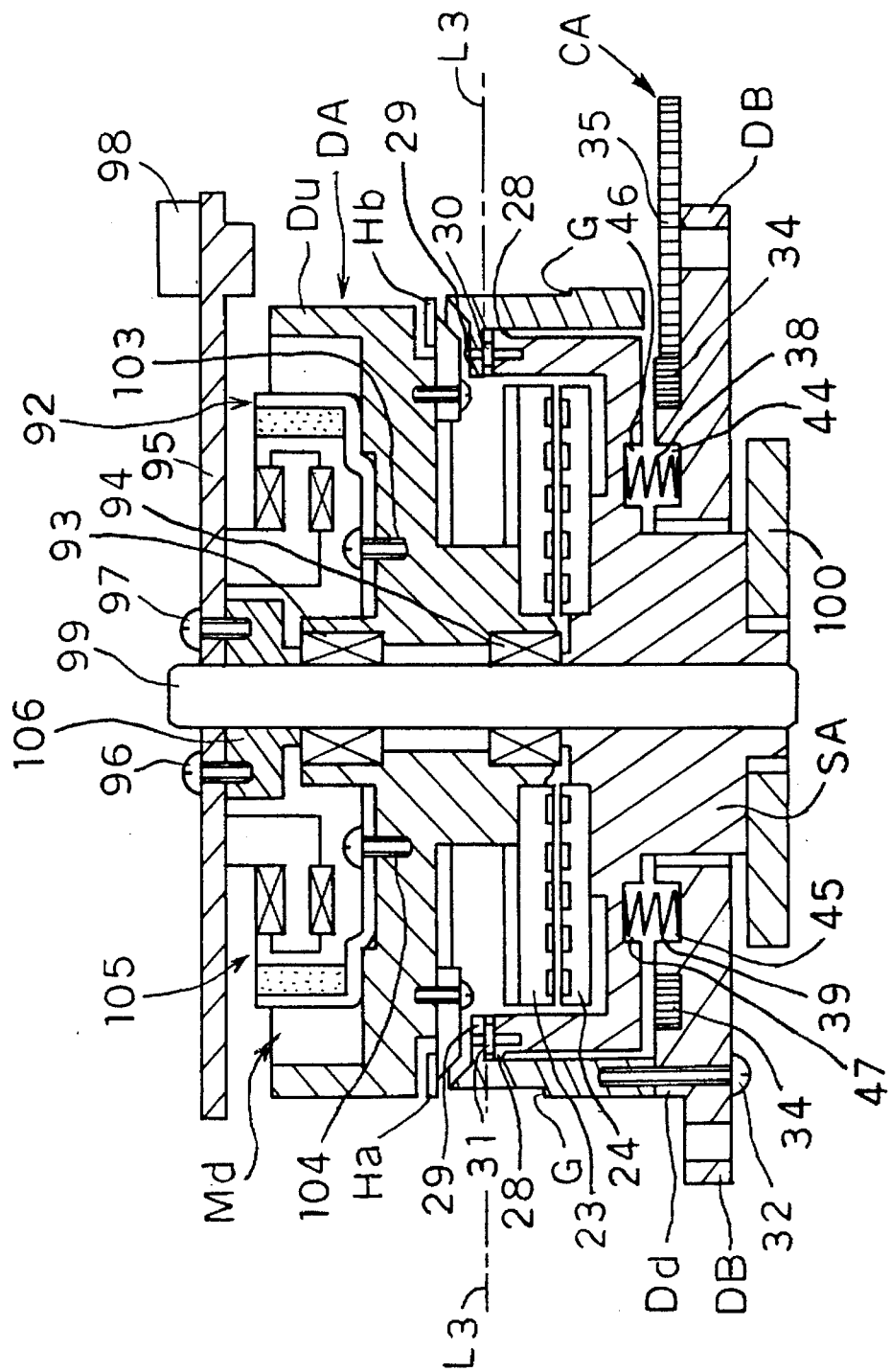
FIGS. 19(a) and 19(b) is a cross section of a portion of a drum pair which is a main portion of a magnetic recording/ reproducing apparatus according to an eighth embodiment of the present invention.
Figure 19:
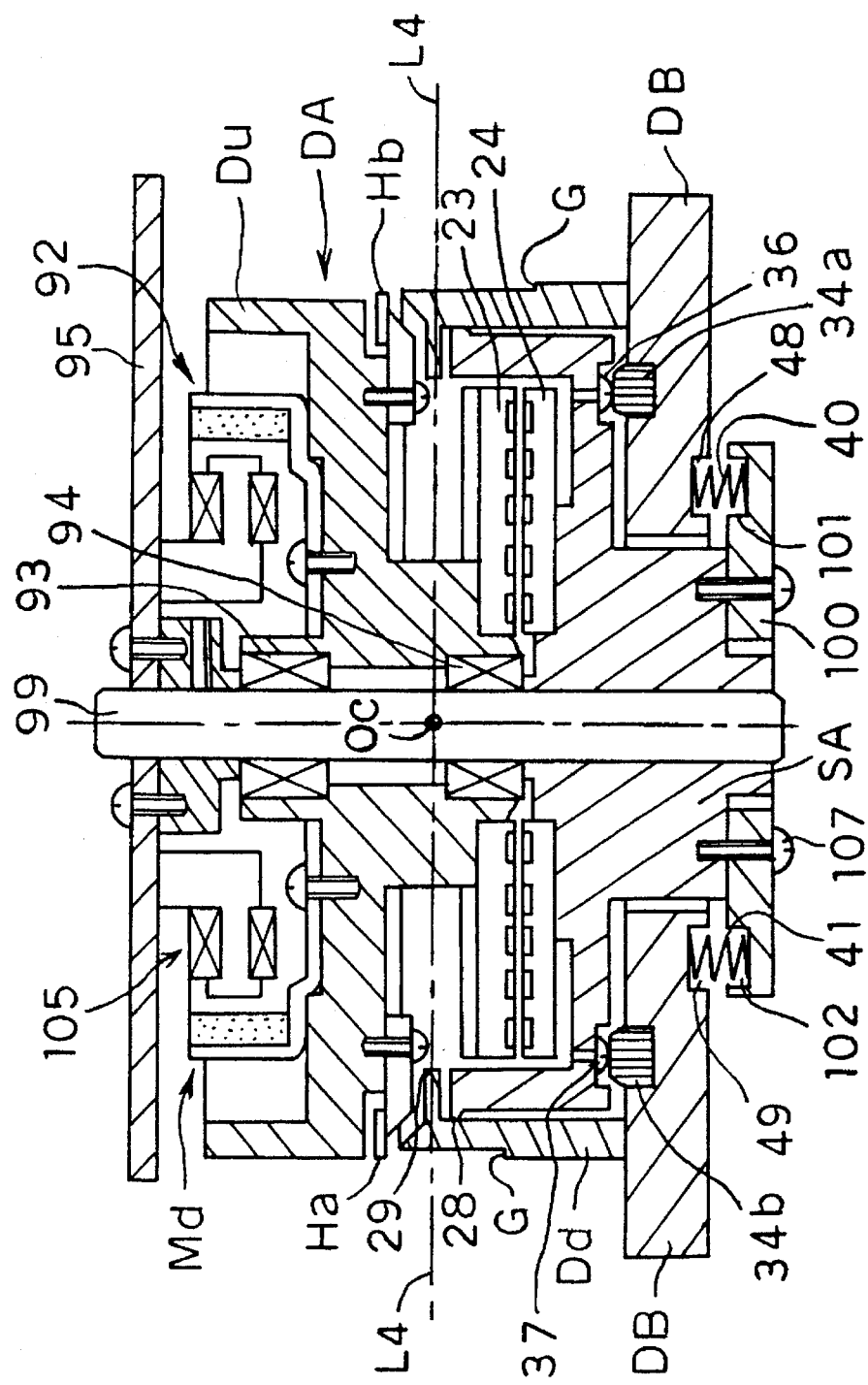

In FIG. 18, the upper drum Du on which the magnetic heads Ha and Hb are mounted fixedly mounts a rotor 92 (FIG. 19) of the drum motor Md and is mounted on an intermediate member SA (cf. FIGS. 19 and 20) fixedly mounted on a fixed shaft 99 through bearings 93 and 94. As in FIG. 1, the intermediate member SA is provided in suspended state between the drum base DB and the lower drum Dd and substantially within an inner space 29a of the lower drum Dd and rotatably supports the rotary shaft 1 through the bearings 5 and 6. The intermediate member SA can be slanted by a pressing force exerted by an annular cam member CA (FIGS. 19 and 20).

The intermediate member SA is fitted in an inner space of the lower drum Dd in a plane orthogonal to the center axis of the lower drum Dd in the vicinity of a circular locus of the magnetic heads Ha and Hb and is supported to tilt by two pivot points provided on a straight line L3 which is contained in a plane in the vicinity of the fitting portion, orthogonal to the center axis of the lower drum Dd and parallel to the straight line L1.

Therefore, when the rotary shaft 1 is slanted in a plane containing a straight line L4 (parallel to the straight line L2) passing through the center axis of the lower drum Dd by tilting the intermediate member SA about the straight line L3 as a rotation center, the slant of the locus plane of the rotary magnetic heads Ha and Hb mounted on the upper drum Du is changed, so that the rotary magnetic heads Ha and Hb can exactly trace the recorded track on the magnetic tape T.

Figure 5:
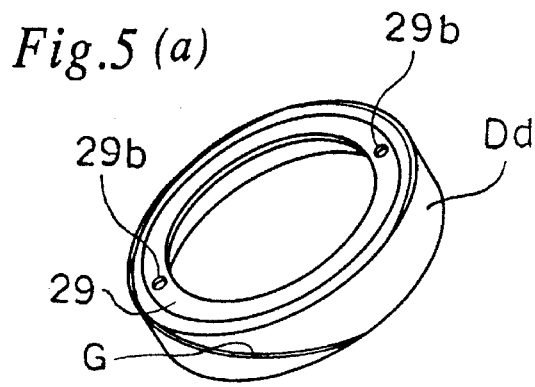
FIGS. 5(a) through 5(h) is a disassembled perspective view of the drum pair shown in FIG. 4.
Figure 5:
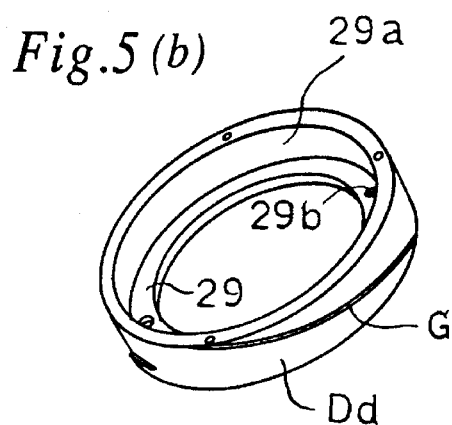
Figure 5:
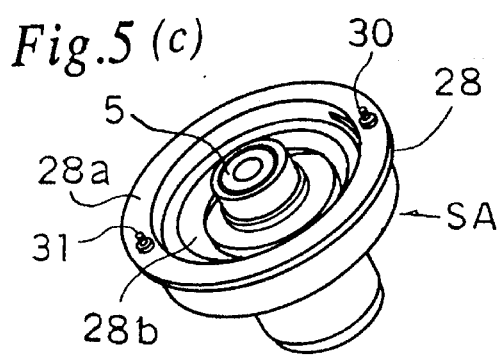
Figure 5:
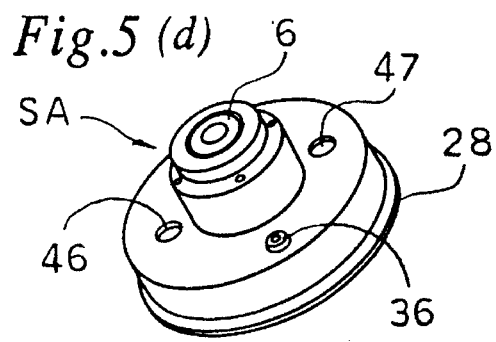
Figure 5:
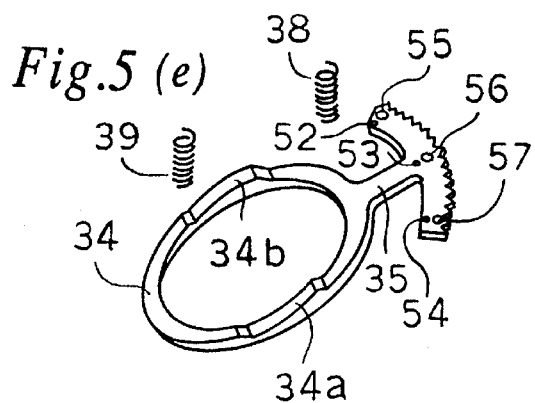
Figure 5:
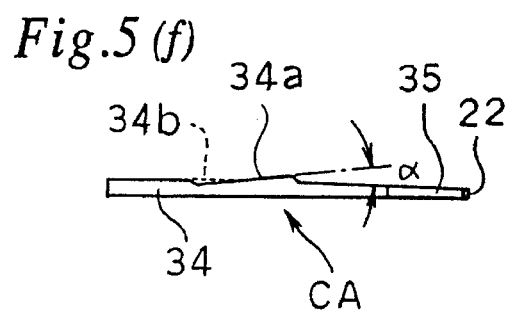
Figure 5:
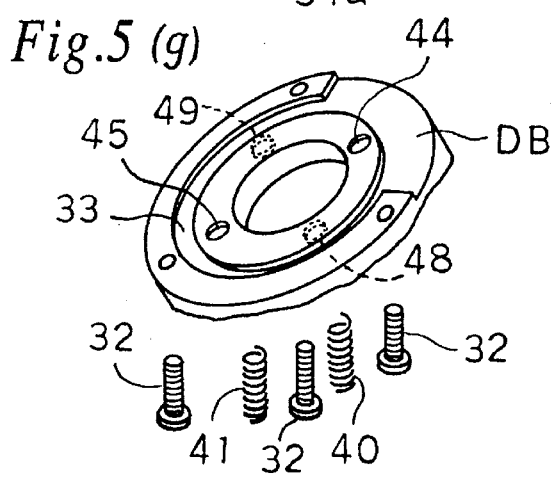
Figure 5:
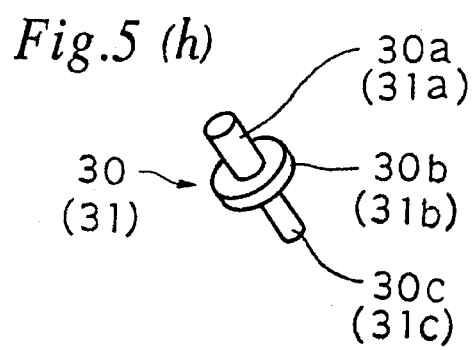

A first embodiment of the present invention will be described with reference to FIGS. 4 and 5. FIG. 4(a) is across section of the drum pair of the first type described with reference to FIG. 1, taken along a vertical line passing through the 90° position and the 270° position in FIG. 2. Similarly, FIG. 4(b) is a cross section thereof taken along a line passing the 0° position and the 180° position in FIG. 2. FIG. 5 is a disassembled drum pair portion shown in FIG. 4, in which FIGS. 5(a), 5(c), 5(e) and 5(g) show the lower drum Dd, the intermediate member SA, the annular cam member CA and the drum base DB, respectively. FIGS. 5(b) and 5(d) are rear side views of the lower drum Dd and the intermediate member SA, respectively, FIG. 5(f) is a side view of the annular cam member CA shown in FIG. 5(e) and FIG. 5(h) is an enlarged perspective view of pivot point members 30 and 31.

The lower drum Dd formed on its outer peripheral surface with the guide portion G for guiding the reference edge Te of the magnetic tape T is fixedly secured to the drum base DB by a plurality of screws 32.

The intermediate member SA provided within the inner space 29a of the lower drum Dd with a slight clearance with respect to an inner peripheral surface of the space has an edge portion 28 protruded from an upper edge of the outer peripheral surface of the lower drum Dd. That is, a diameter of the edge portion 28 of the intermediate member SA is slightly smaller than an inner diameter of the inner space 29a of the lower drum Dd.

It is preferable to round the edge portion 28 a curvature of which is centered to the point Oc in FIG. 4(b). With such rounded edge of the edge portion 28 of the intermediate member SA, it is possible to make the clearance sufficiently small while providing thickness thereof being sufficient structurally. That is, when the intermediate member SA is tilted about the point Oc (straight line L3), the top end of the edge portion 28 can smoothly slide the inner surface of the lower drum Dd with a rotation center of the intermediate member SA being maintained at the point Oc precisely.

Further, due to the pivot point members 30 and 31 provided at two points on the straight line L3 in the vicinity of the locus of the rotary magnetic heads Ha and Hb, the intermediate member SA is supported to tilt with respect to the lower drum Dd. That is, the pivot point members 30 and 31 in the form of pins implanted in the upper end portion 28a of the intermediate member SA at positions on the straight line L3 are received in two through-holes 29b provided in the edge portion 29 of the lower drum Dd, respectively, to form the two pivot points. Each of the pivot point members 30 and 31 includes a small diameter portion 30a to be fitted in the through-hole 29b of the lower drum Dd, a spacer portion 30b having large diameter for maintaining a predetermined space between the lower drum Dd and the intermediate member SA and a small diameter portion 30c to be implanted in the intermediate member SA.

A plane between the lower drum Dd and the intermediate member SA which includes the two pivot points provided by the pivot point members 30 and 31 and a plane including contact points between the edge portion 28 of the intermediate member SA and the inner wall of the lower drum Dd are very close to each other. Further, the plane between the lower drum Dd and the intermediate member SA is approximated to a plane including the locus of the rotary heads Ha and Hb.

With such construction as mentioned above, the locus of the rotary magnetic heads Ha and Hb does not deviate substantially from a position on a plane including the outer peripheral surface of the lower drum Dd even if the locus of the rotary magnetic heads Ha and Hb is changed by slanting the rotary shaft 1 within a plane including the straight line L4 and the center axis of the lower drum by tilting the intermediate member SA about the straight line L3 connecting the two pivot points. Therefore, contacting condition between air gap portions of the heads Ha and Hb and the magnetic tape T is not degraded and an acceptable reproduced image can be always obtained.

Now, a mechanism for tilting the intermediate member SA will be described. FIG. 5(e) shows an example of the annular cam member CA provided between the drum base DB and the intermediate member SA.

The drum base DB is formed with a guide groove 33 for rotatably receiving an annular portion 34 of the annular cam member CA to position the latter. The annular portion 34 of the annular cam member CA is formed with cam profiles 34a and 34b having predetermined shapes.

The annular portion 34 is further provided with a sector shaped gear 22 through a connecting portion 35. The intermediate member SA and the cam member CA are resiliently connected to the drum base DB by springs 38 to 41. The springs 38 and 39 are provided in spaces defined by holes 44 and 45 provided in the drum base DB and holes 46 and 47 provided in the intermediate member SA, respectively, as shown in FIG. 4(a). The spring 40 and 41 are provided in spaces defined by holes 48 and 49 formed in the drum base DB and holes 50 and 51 formed in a drum motor mounting plate 7, respectively, as shown in FIG. 4(b).

Rotational force of the motor Mg is transmitted through a reduction gear 19, an output shaft 20 and a pinion 21 to the sector shaped gear 22 of the annular cam member CA, as shown in FIG. 1. The annular cam member CA is rotated according to forward or backward rotation of the motor Mg with the annular portion 34 thereof being guided by the guide groove 33 of the drum base DB. In this case, cam followers 36 and 37 provided on the intermediate member SA engage with the cam profiles 34a and 34b formed on the annular portion 34, respectively, to rotate the annular cam member CA about the straight line L3 connecting the two pivot points provided by the pivot point members 30 and 31. As a result, the rotary shaft 1 of the drum motor Md which coincides with the rotation axis of the upper drum Du is slanted to change the position of locus plane of the magnetic heads Ha and Hb.

The output shaft 1 of the drum motor Md driving the upper drum Du is rotatably supported by the bearings 5 and 6 provided on the intermediate member SA. The drum motor Md shown in FIG. 4 is of the so-called "outer-rotor" type and includes an annular permanent magnet 14 fixedly secured to a support plate 8 onto which a shaft fixing member 11 is fixedly secured by screws 9 and 10.

The shaft 1 is received in a center hole of the shaft fixing member 11 and fixed thereto by a stop screw. A stator 105 having coils 15 to 18 is fixed to the drum motor mounting plate 7 and the intermediate member SA by screws 12 and 13. The drum motor mounting plate 7 is further fixed to the intermediate member SA by means of screws 42 and 43 as shown in FIG. 4(b).

On the other hand, the rotary shaft 1 rotatably supported by the bearings 5 and 6 provided on the intermediate member SA is fixedly secured to an upper drum fixing member 2 to which the upper drum Du is fixed by screws 3 and 4. Thus, the upper drum Du is rotated by the rotary shaft 1 of the drum motor Md. A gap between a rotary transformer 23 on the side of the upper drum Du and a rotary transformer 24 on the side of the intermediate member SA is kept constant even if the rotary shaft 1 is slanted by a tilt of the intermediate member SA, there is no level variation of a signal to be transmitted.

The motor Mg is used for a driving mechanism for changing an amount of tilt of the intermediate member SA, that is, an amount of slant of the rotary shaft 1. Rotational force thereof is transmitted through the reduction gear 19, the output shaft 20, the pinion 21 and the sector shaped gear 22 to the annular cam member CA under control of a driving control circuit which is not shown. A position detecting device 25 such as photo-interrupter for detecting a rotational position of the annular cam member CA is mounted on the drum base DB (FIG. 1). The position detector device 25 generates a position detection signal in conjunction with through holes (FIG. 5) provided in specific positions on the circular gear 22 of the annular cam member CA.

The position detection signal from the position detector device 25 is supplied to the drive control circuit mentioned above. The position detector device 25 has a ball which is in pressure-contact with the annular cam member CA by a spring and through-holes 55 to 57 [FIG. 5(e)] are formed in the sector shaped gear 22 of the annular cam member CA. The ball and the through-holes 55 to 57 form a stopper mechanism. That is, the rotational position of the annular cam member CA, that is, the slant of the rotary shaft 1, can be set by an engagement of the ball with a selected one of the through-holes 55 to 57 which is positioned at a specific position on the sector shaped gear 22.

Figure 7:
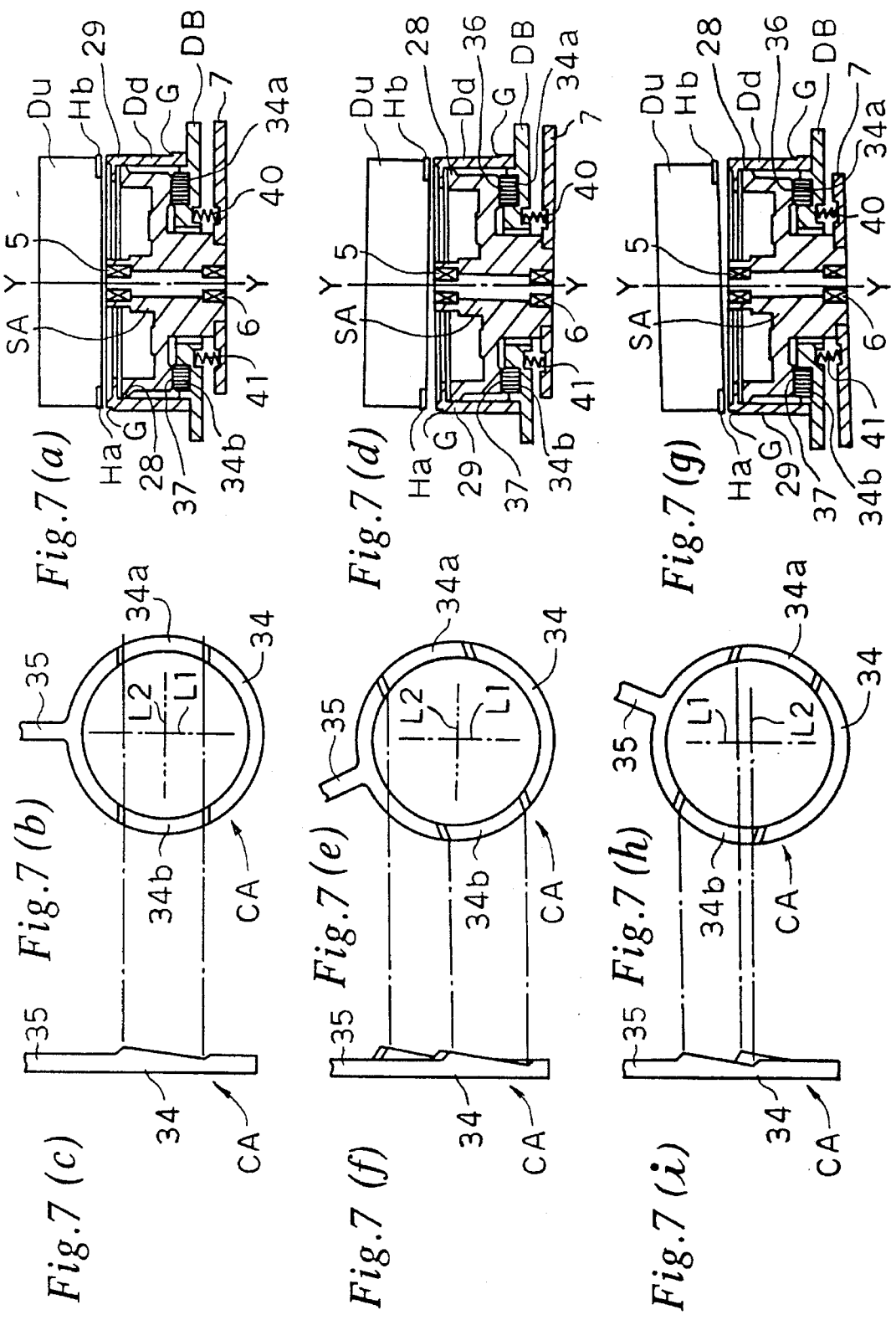
FIGS. 7(a) through 7(i) show a relation between a cam member for slant regulation and a slanted state of an upper drum.

FIGS. 7(a1) through 7(c3) shows a relation between the cam profiles 34a and 34b provided in a peripheral direction of the annular portion 34 of the annular cam member CA and the cam followers 36 and 37 of the intermediate member SA which are in contact therewith, when the annular cam member CA is rotated and a positional variation of the rotary locus plane of the rotary magnetic heads Ha and Hb. FIGS. 7(a1), 7(b1) and 7(c1) are cross sections of the drum pair DA taken along a line A—A (positions 0° and 180° in FIG. 2), similar to the longitudinal cross section shown in FIG. 4(b).

Lines Y—Y in FIGS. 7(a1), 7(b1) and 7(c1) indicate directions of the center axis of the lower drum Dd (similar to the direction of the straight line Y—Y in FIG. 3).

FIG. 7(a1) is the cross section of the drum pair DA during the normal reproduction, in which the rotary shaft 1 coincides with the center axis of the lower drum Dd. FIG. 7(a2) is a plan view showing a regulation of rotation of the annular cam member CA during the same normal reproduction. In these figures, straight lines L1 and L2 correspond to the straight lines L1 and L2 shown in FIG. 2, respectively. FIG. 7(a3) is a side view of the annular cam member CA during the normal reproduction.

FIG. 7(b1) is a cross section of the drum pair DA during the FF reproduction in which the rotary shaft 1 is slanted rightwardly with respect to the center axis of the lower drum Dd. FIG. 7(b2) is a plan view showing a regulation of rotation of the annular cam member CA and FIG. 7(b3) is a side view of the annular cam member CA, both during the FF reproduction.

FIG. 7(c1) is a cross section of the drum pair DA during the FB reproduction in which the rotary shaft 1 is slanted leftwardly with respect to the center axis of the lower drum Dd. FIG. 7(c2) is a plan view showing a regulation of rotation of the annular cam member CA and FIG. 7(c3) is a side view of the annular cam member CA, both during the FB reproduction.

The setting of reproduction mode of the magnetic recording/reproducing apparatus according to the present invention is performed by inputting an operation mode information to an operating portion of the apparatus, which is not shown. When the reproduction mode is changed to the normal reproduction mode, the FF reproduction mode or the FB reproduction mode, it is necessary that the annular cam member CA is rotated up to a predetermined position selected on the drum base DB and fixed thereat.

An operation of the magnetic recording/reproducing apparatus when various reproduction modes are selected.

When it is assigned to the normal reproduction mode, the control device which is not shown controls the apparatus such that a driving power of the motor Mg is transmitted through the reduction gear 19, the output shaft 20 and the pinion 21 (FIG. 1) to the sector shaped gear 22 provided on the annular cam member CA to rotate the latter. With the rotation of the annular cam member CA, the cam profiles 34a and 34b formed in the peripheral direction of the cam member engage with the cam followers 36 and 37 formed on the intermediate member SA to tilt the latter about the straight line L3 as a rotation center line. When the rotary shaft 1 supported by the intermediate member SA through the bearings 5 and 6 consists with the center axis of the lower drum Dd [FIG. 7(a1)], the through-hole 53 provided in the sector shaped gear 22 of the annular cam member CA for the normal reproduction mode reaches the position detection device 25 which generates the position detection signal. Upon this position detection signal, the drive control circuit stops the motor Mg and at the same time the ball is pushed in the stopper through-hole 56 provided in the annular cam member CA by the spring of the stopper mechanism provided in the position detection device 25 to fix the annular cam member CA in a predetermined rotational position correspondingly to the normal reproduction.

When the FF reproduction mode is assigned, the control device controls the apparatus to transmit the driving power of the motor Mg through the reduction gear 19, the the output shaft 20 and the pinion 21 (FIG. 1) to the sector shaped gear 22 provided on the annular cam member CA to rotate the latter. With the rotation of the annular cam member CA, the cam profiles 34a and 34b formed in the peripheral direction of the cam member engage with the cam followers 36 and 37 formed on the intermediate member SA to tilt the latter about the straight line L3 as a rotation center line. When the rotary shaft 1 supported by the intermediate member SA through the bearings 5 and 6 is slanted rightwardly with respect to the center axis of the lower drum Dd [FIG. 7( b1)], the through-hole 54 provided in the sector shaped gear 22 of the annular cam member CA for the FF reproduction mode reaches the position detection device 25 which generates the position detection signal. Upon this position detection signal, the drive control circuit stops the motor Mg and at the same time the ball is pushed in the stopper through-hole 57 provided in the annular cam member CA by the spring of the stopper mechanism provided in the position detection device 25 to fix the annular cam member CA in a predetermined rotational position correspondingly to the FF reproduction.

Now, an operation when the FB reproduction mode is selected will be described. When the FB reproduction mode is assigned, the control device controls the apparatus to transmit the driving power of the motor Mg through the reduction gear 19, the output shaft 20 and the pinion 21 (FIG. 1) to the sector shaped gear 22 provided on the annular cam member CA to rotate the latter. With the rotation of the annular cam member CA, the cam profiles 34a and 34b formed in the peripheral direction of the cam member engage with the cam followers 36 and 37 formed on the intermediate member SA to rotate the latter about the straight line L3 as a rotation center line. When the rotary shaft 1 supported by the intermediate member SA through the bearings 5 and 6 is slanted leftwardly with respect to the center axis of the lower drum Dd [FIG. 7(c1)], the through-hole 52 provided in the sector shaped gear 22 of the annular cam member CA for the FF reproduction mode reaches the position detection device 25 which generates the position detection signal. Upon this position detection signal, the drive control circuit stops the motor Mg and at the same time the ball is pushed in the stopper through-hole 55 provided in the annular cam member CA by the spring of the stopper mechanism provided in the position detection device 25 to fix the annular cam member CA in a predetermined rotational position correspondingly to the FB reproduction.

Figure 8:
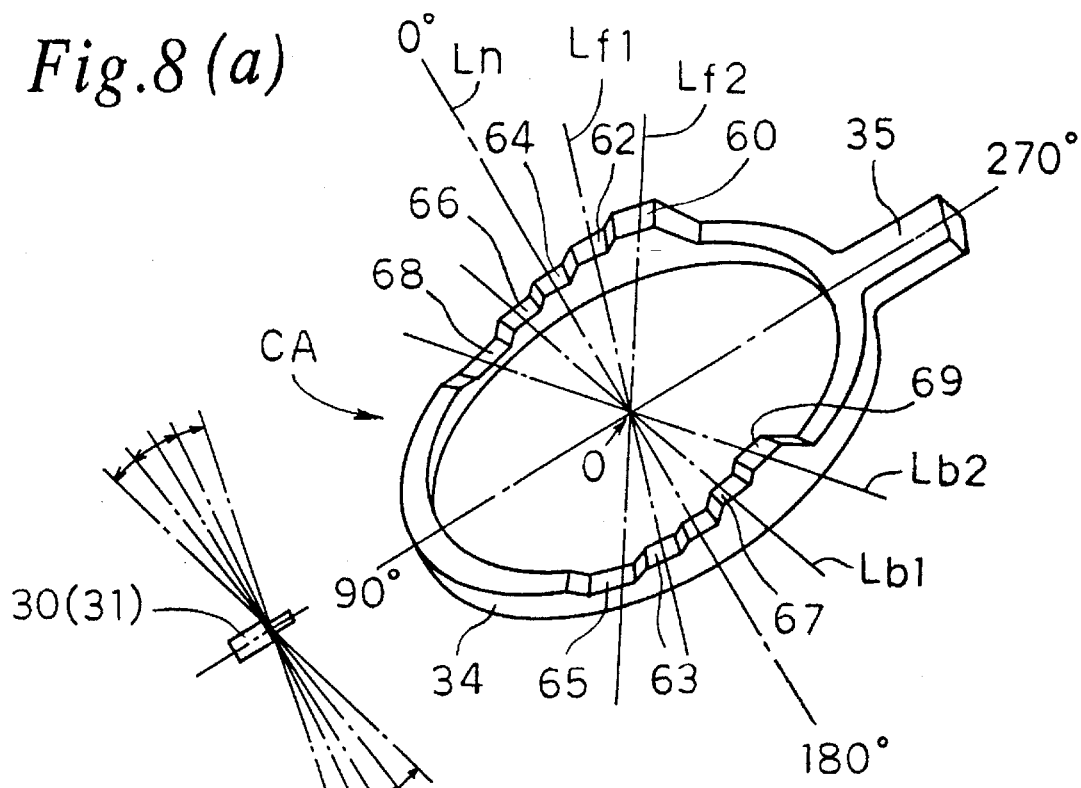
FIGS. 8(a) through 8(c) shows another construction of the slant regulation cam member.

FIG. 8 shows another example of the annular cam member CA. FIG. 8(a) is a perspective view of a portion of the annular cam member CA, in which a point O indicates a center point of an annular portion 34 of the cam member CA. Different cam profile pairs 60 to 69 are formed on both sides of the annular portion 34 about a straight line 90°–270° at positions on straight lines Lf2, Lf1, Ln, Lb1 and Lb2 each passing the center point O, respectively.

FIG. 8(b) is a side view of the annular portion 34, showing the cam profiles 61, 63, 65, 67 and 69 formed on one side of the annular portion. The cam profile 65 with 0 indicates the cam profile for the normal reproduction, the cam profiles 67 and 69 with –5 and –11 are cam profiles the FB reproduction at speeds of –5 times and –11 times that in the normal reproduction, respectively, and the cam profiles 61 and 63 with +11 and +5 are cam profiles for the FF reproduction at speeds 11 times and 5 times that of the normal reproduction, respectively.

FIG. 8(c) shows a change of slant of the locus plane of the rotary magnetic heads Ha and Hb when the intermediate member SA is tilted about the straight line L3 connecting the two pivot points, which are provided by the pivot point members 30 and 31, by pressure-contacting the cam followers 36 and 37 of the intermediate member SA to the cam profiles 60 to 69 of the annular portion 34 of the cam member CA.

It will be clear for persons skilled in the art that the annular cam member CA shown in FIG. 8 can be used directly in the first embodiment shown in FIG. 4 as a substitution for that shown in FIG. 5 or FIG. 7.

Figure 6:
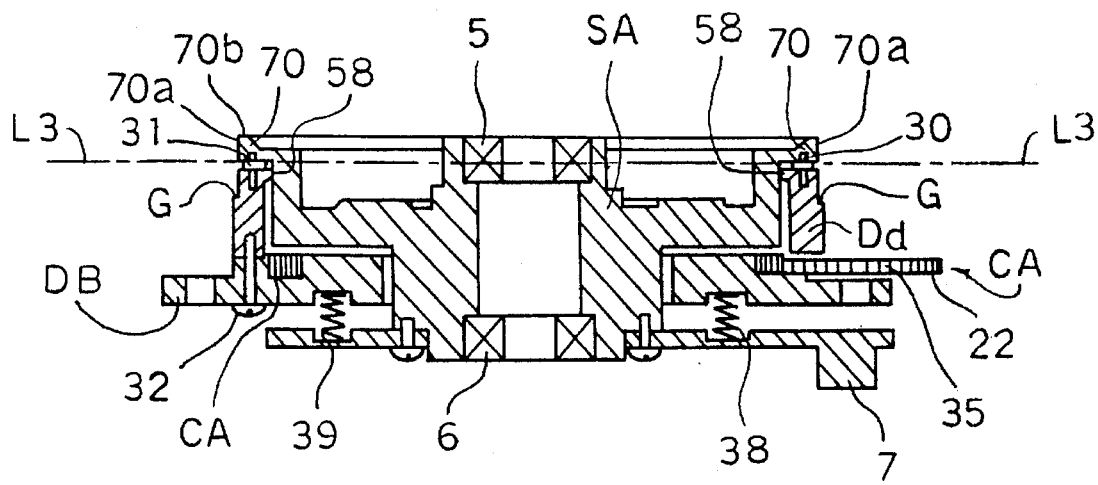
FIGS. 6(a) and 6(b) is a cross section of a portion of a drum pair which is a main portion of a magnetic recording/reproducing apparatus according to a second embodiment of the present invention.
Figure 6:
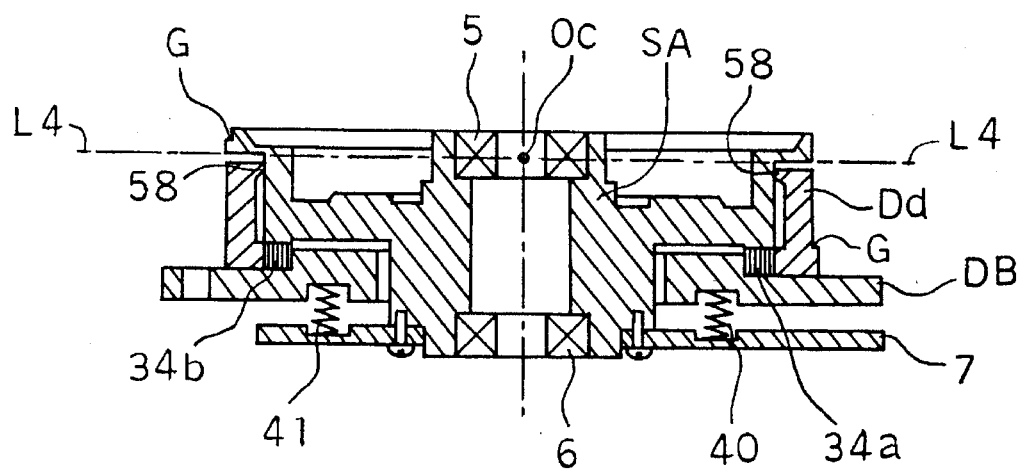

Now, a second embodiment of the present invention will be described with reference to FIG. 6. The second embodiment differs from the first embodiment in the fitting of an intermediate member SA and a lower drum Dd and the supporting structure for supporting the intermediate member. A rotatably with respect to the lower drum Dd. Therefore, only these different portions will be described in detail and description of other portions is omitted.

FIGS. 6(a) and 6(b) are cross sections taken along a line corresponding to the 90°–270° line in FIG. 2 and a line corresponding to the 0°–180° line in FIG. 2, respectively, showing the lower drum Dd, the intermediate member SA and a drum base DB.

The lower drum Dd having a guide portion G is fixedly secured to the drum base DB by a plurality of screws 32.

An inwardly protruding edge portion 58 is provided on an upper end portion of the lower drum Dd with a predetermined small clearance with respect to an outer peripheral surface of the intermediate member SA received in an inner space of the lower drum Dd. That is, an inner diameter of an edge portion 58 of the lower drum Dd is slightly larger than an outer diameter of the intermediate member SA.

Further, the intermediate member SA is supported to tilt with respect to the lower drum Dd by pivot point members 30 and 31 provided at two positions on a straight line L3 in the vicinity of a locus plane of rotary magnetic heads Ha and Hb. That is, the pivot point members 30 and 31 in the form of pins implanted in an upper end portion of the lower drum Dd at the positions on the line L3 are received in two through-holes provided in a protruded portion 70 of the intermediate member SA, respectively, to form two pivot points. The pivot point members 30 and 31 are substantially similar to those shown in FIG. 5(h). In the second embodiment, however, a small diameter portion 30a is fitted in a through-hole of a protruded portion 70 of the intermediate member SA and a small diameter portion 30c is implanted in the upper end portion of the lower drum Dd.

A plane between the lower drum Dd and the intermediate member SA which includes the two pivot points provided by the pivot point members 30 and 31 and a plane including contact points between an edge portion 58 of the lower drum Dd and an outer peripheral surface of the intermediate member SA are very close to each other. Further, a plane formed between the lower drum Dd and the intermediate member SA and containing the two pivot points is separated from a plane including the locus of the rotary heads Ha and Hb by a certain distance in a tangential line of an outer peripheral surface 70a of the protruded portion 70 of the intermediate member SA.

The intermediate member SA and an annular cam member CA are resiliently coupled to the drum base DB by means of springs 38 to 41.

According to the second embodiment, an air gap provided between the upper drum Du (not shown) and the upper end portion 70b of the intermediate member SA or a distance between the upper end portion 70b and the locus plane of the magnetic heads Ha and Hb can be maintained constant even if the intermediate member SA is tilted about the straight line L3.

Further, since the outer peripheral surface of the upper drum Du and the outer peripheral surface 70a of the protruded portion 70 are kept such that one of the surfaces is contained in an extension of the other surface, the contacting condition between magnetic gap portions of the heads Ha and Hb and the magnetic tape T is not changed even if the locus of the magnetic heads Ha and Hb is changed by tilting the intermediate member SA and thus an acceptable reproduced image can be always obtained.

Figure 9:
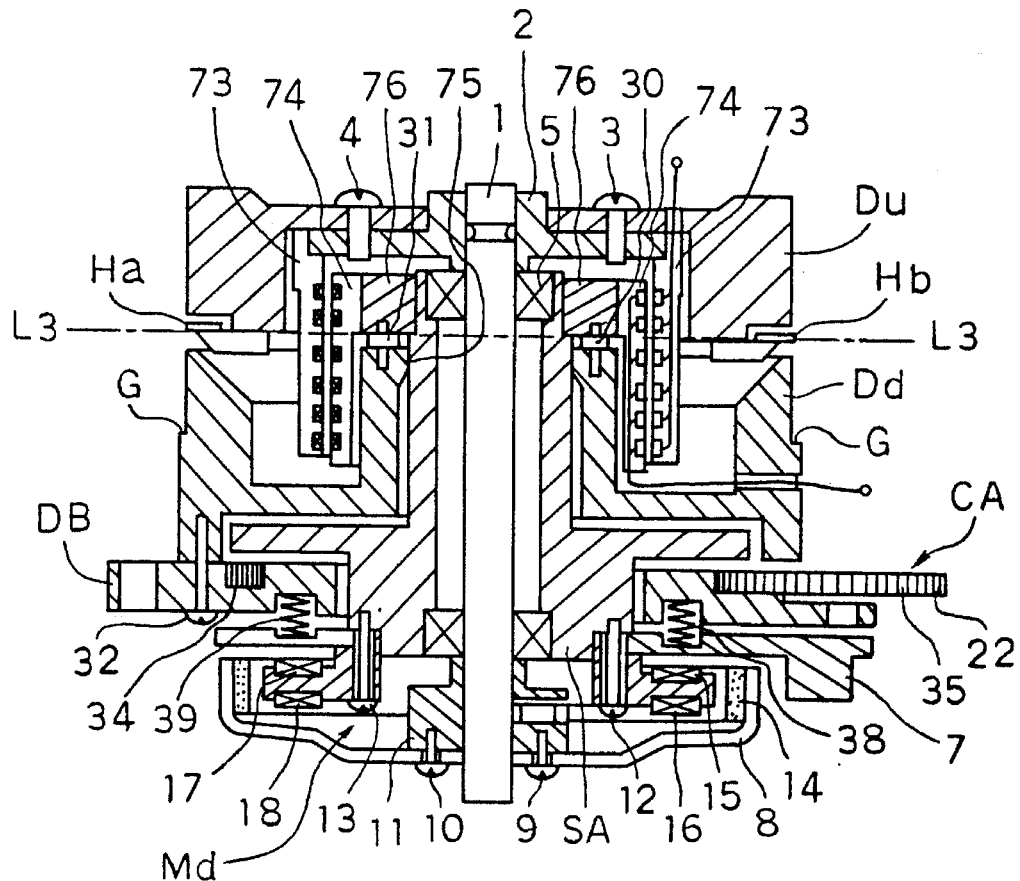
FIGS. 9(a) and 9(b) is a cross section of a portion of a drum pair which is a main portion of a magnetic recording/ reproducing apparatus according to a third embodiment of the present invention.
Figure 9:
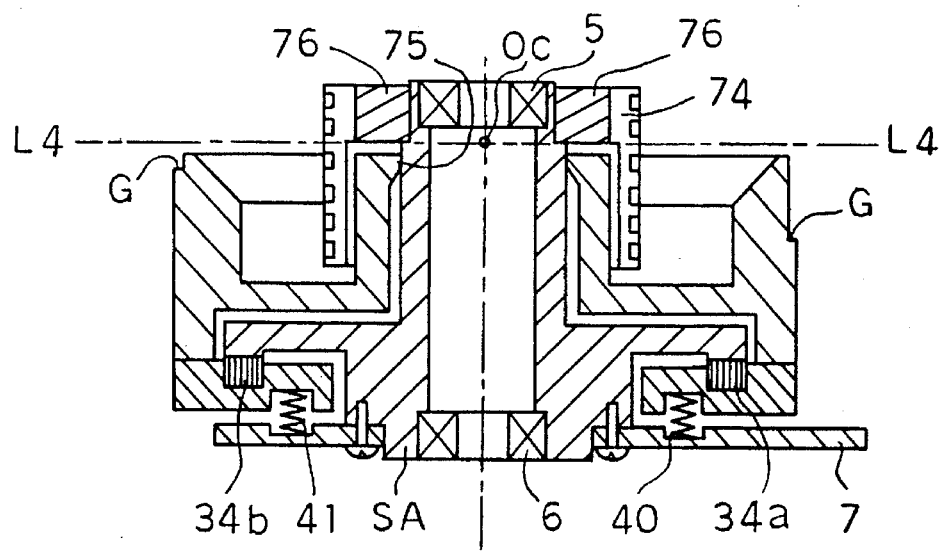

A third embodiment of the present invention will be described with reference to FIG. 9. The third embodiment differs from the first or second embodiment in that hollow cylindrical transformers 73 and 74 are used for signal transmission, that a rotation center of the intermediate member SA with respect to a lower drum Dd is formed in a position close to a rotary shaft 1 and that the intermediate ember SA is fitted in the lower drum Dd at a position close to the rotary shaft 1. Therefore, only these different portions will be described in detail and description of other portions is omitted.

FIGS. 9(a) and 9(b) are cross sections taken along a line corresponding to the 90°–270° line in FIG. 2 and a line corresponding to the 0°–180° line in FIG. 2, respectively, showing the upper drum Du and the drum motor Md of the drum pair of the first type.

The lower drum Dd having a guide portion G is fixedly secured to a drum base DB by a plurality of screws 32.

An inwardly protruding edge portion 75 is provided on an upper end portion of the lower drum Dd with a predetermined small clearance with respect to an outer peripheral surface of the intermediate member SA received in an inner space of the lower drum Dd. That is, an inner diameter of the edge portion 75 of the lower drum Dd is slightly larger than an outer diameter of the intermediate member SA.

Further, the intermediate member SA is supported rotatably with respect to the lower drum Dd by pivot point members 30 and 31 provided at two positions on a straight line L3 in the vicinity of a locus plane of rotary magnetic heads Ha and Hb. That is, the pivot point members 30 and 31 in the form of pins implanted in the upper end portion of the lower drum Dd at the positions on the line L3 are received in two through-holes provided in a connecting portion 76 of the intermediate member SA, respectively, to form two pivot points. The pivot point members 30 and 31 are substantially similar to those shown in FIG. 5(h). In the second embodiment, however, a small diameter portion 30a is loosely fitted in a through-hole of the connecting portion 76 of the intermediate member SA and a small diameter portion 30c is implanted in an upper end portion of the lower drum Dd.

On the other hand, a rotary shaft 1 rotatably supported by bearings 5 and 6 provided on the intermediate member SA is fitted in an upper drum fixing member 2. Further, an upper drum Du is fixedly secured to the upper drum fixing member 2 by screws 3 and 4 and a drum motor Md rotates the upper drum Du through the rotary shaft 1. A hollow cylindrical transformer 73 on the upper drum side and a hollow cylindrical transformer 74 on the intermediate member side are mounted on the upper drum fixing member 2 and the connecting member 76, respectively. Since the transformers 23 and 24 are tilted together, a distance therebetween is kept constant even if the rotary shaft 1 is slanted by the tilt of the intermediate member SA and thus there is no level variation of a transmitted signal.

Figure 10:
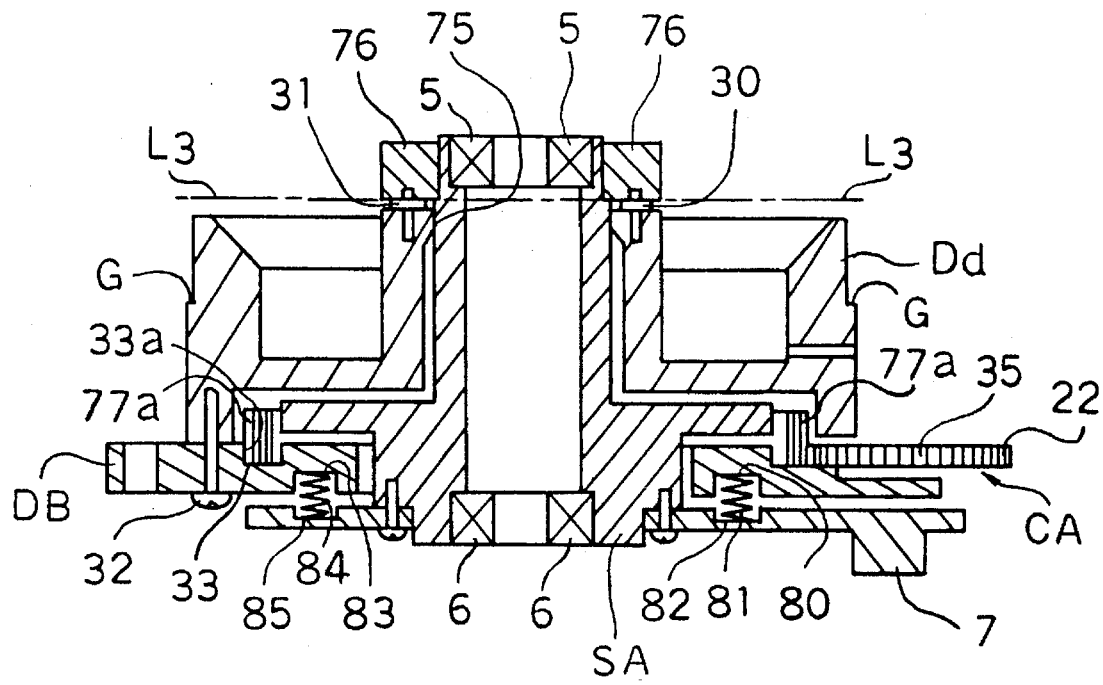
FIGS. 10(a) and 10(b) is a cross section of a portion of a drum pair which is a main portion of a magnetic recording/ reproducing apparatus according to a fourth embodiment of the present invention.
Figure 10:
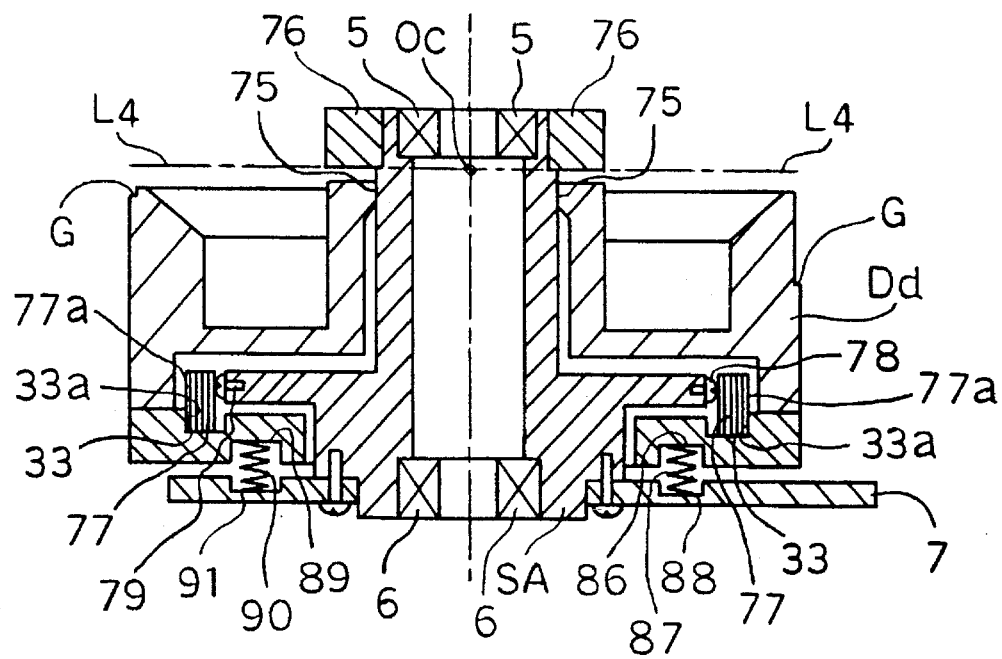

According to this embodiment, it is possible to make the rotation center completely consistent with the locus plane of the magnetic heads Ha and Hb and to make the contacting condition of the magnetic tape T with the rotary magnetic heads Ha and Hb on the inlet side of the drum pair DA completely the same on the exit side of the drum pair DA. A fourth embodiment of the present invention will be described with reference to FIG. 10. The fourth embodiment differs from the third embodiment in the mechanism for tilting a intermediate member SA by an annular cam member CA. Therefore, only this different portion will be described in detail and description of other portions is omitted.

FIGS. 10(a) and 10(b) are cross sections taken along a line corresponding to the 90°–270° line in FIG. 2 and a line corresponding to the 0°–180° line in FIG. 2, respectively, showing a lower drum Dd and the intermediate member SA.

As shown in FIGS. 10(a) and 10(b), springs 81, 84, 87 and 90 are provided in spaces defined by holes 80, 83, 86 and 89 formed in a drum base DB and holes 82, 85, 88 and 91 formed in a drum motor mounting plate 7 correspondingly in position to the holes of the drum base DB, respectively. With these springs, the intermediate member SA and an upper drum Du are resiliently coupled to a lower drum Dd through two pivot point members 30 and 31 provided between the lower drum and the intermediate member SA, and are supported to tilt about a straight line L3.

Although the annular cam member CA used in the respective embodiments described previously the cam profiles 34a and 34b or 60 to 69 which are different in height from the bottom surface of the guide groove 33 provided in the drum base DB are formed as shown in, for example, FIGS. 5(e) and 8, a hollow cylindrical member 77 is used instead thereof, a plan view of the cylindrical member 77 being shown in FIGS. 11(b), 11(d) and 11(f).

The hollow cylindrical member 77 as the annular cam member CA is rotated while guided along a guide groove 33 formed in the drum base DB with an outer peripheral surface 77a thereof being fitted in a wall surface 33a of the guide groove 33, When torque of a motor is transmitted to a sector shaped gear 22 as in the case of the annular cam member CA described with reference to FIGS. 1 and 5. An inner peripheral surface 77b of the hollow cylindrical member 77 forms an eccentric cam profile with respect to the outer peripheral surface 77a, which engages with semi-spherical cam followers 78 and 79 provided in the intermediate member SA horizontally in FIG. 10(b).

FIGS. 11(a), 11(c) and 11(e) are cross sections of the drum pair DA and the intermediate member SA taken along the line A—A in FIG. 1 (the 0°–180° line in FIG. 2) as in the vertical cross section shown in FIG. 10(b). In these figures, a line O—O indicates a direction of the center axis of the lower drum Dd fixed to the drum base DB (identical to the straight line O—O in FIG. 3).

FIG. 11(a) is the cross section of the portion including the drum pair DA during the normal reproduction, in which the rotary shaft 1 consists with the center axis of the lower drum Dd. FIG. 11(b) is a plan view of the annular cam member CA and the intermediate member SA during the normal reproduction, showing a rotation regulation of the cam member and a relation thereof to the intermediate member.

FIG. 11(c) is the cross section of the portion including the drum pair DA during the FB reproduction, in which the rotary shaft 1 is slanted leftwardly with respect to the center axis of the lower drum Dd. FIG. 11(d) is a plan view of the annular cam member CA and the intermediate member SA during the FB reproduction, showing a rotation regulation of the cam member and a relation thereof to the intermediate member.

FIG. 11(e) is the cross section of the portion including the drum pair DA during the FF reproduction, in which the rotary shaft 1 is slanted rightwardly with respect to the center axis of the lower drum Dd. FIG. 11(f) is a plan view of the annular cam member CA and the intermediate member SA during the FB reproduction, showing a rotation regulation of the cam member and a relation therebetween.

A fifth embodiment of the present invention will be described with reference to FIGS. 12 and 13. This embodiment as well as a sixth and seventh embodiments to be described differs from the first to fourth embodiments in that one of the bearings supporting the rotary shaft 1 is provided in the lower drum Dd. As mentioned previously, in the first to fourth embodiments, the bearings 5 and 6 are provided in the intermediate member SA and, in order to determine the rotation center (the straight line L3 or the point Oc) of the intermediate member SA, the lower drum Dd and the intermediate member SA are connected by the pivot point members 30 and 31 in the mutual fitting relation.

In the fifth embodiment as well as the sixth and seventh embodiments to be described later, the rotation center of the intermediate member SA is determined by providing the so-called "self-aligning bearing", etc., in the lower drum Dd. This difference of the fifth embodiment will be described mainly.

Figure 12:
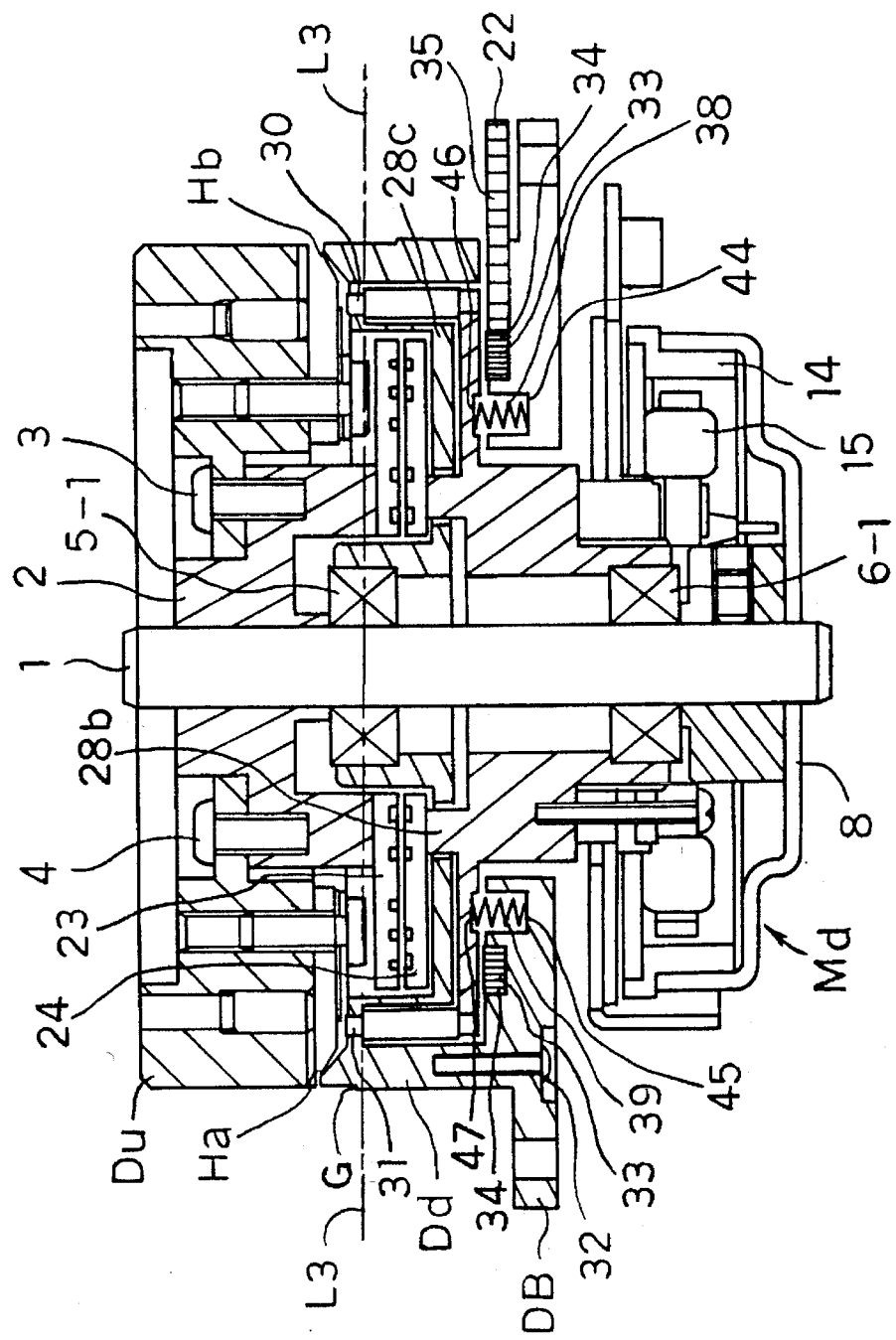
FIGS. 12(a) and 12(b) is a cross section of a portion of a drum pair which is a main portion of a magnetic recording/ reproducing apparatus according to a fifth embodiment of the present invention.
Figure 12B:
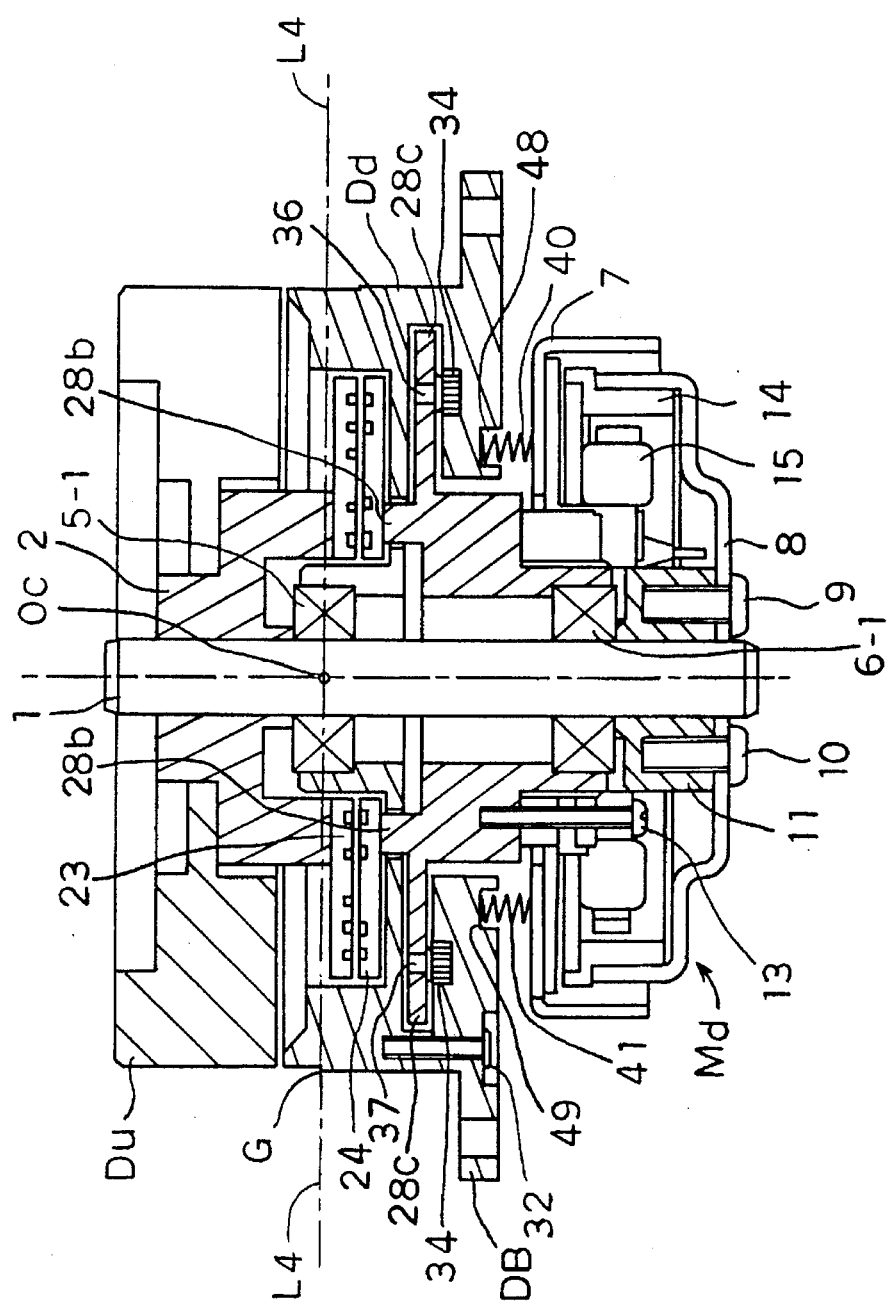
Figure 13A:
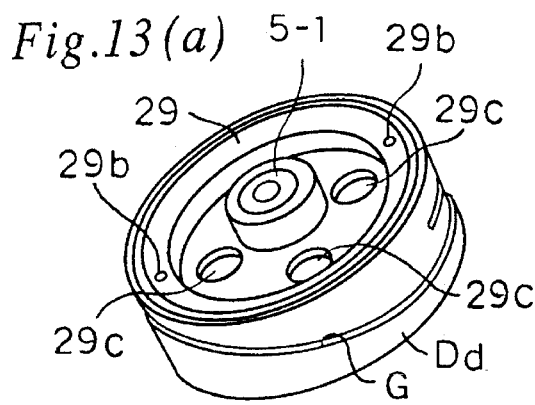
FIGS. 13(a) through 13(h) is a disassembled perspective view of the drum pair shown in FIGS. 12(a) and (b)
Figure 13B:
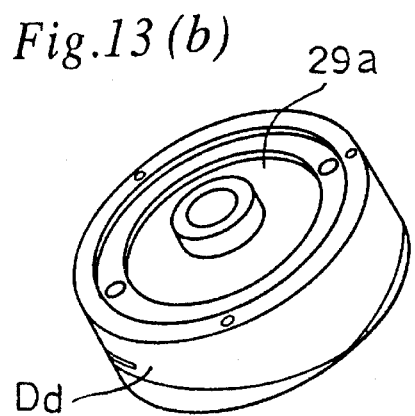
Figure 13C:
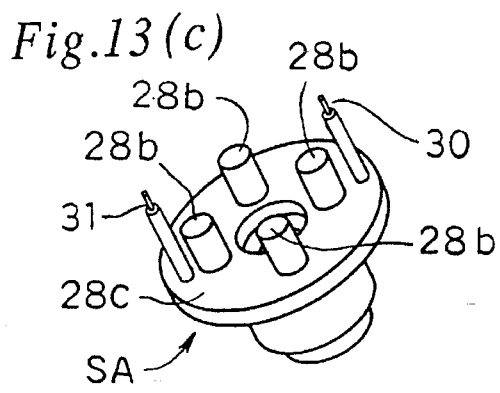
Figure 13D:
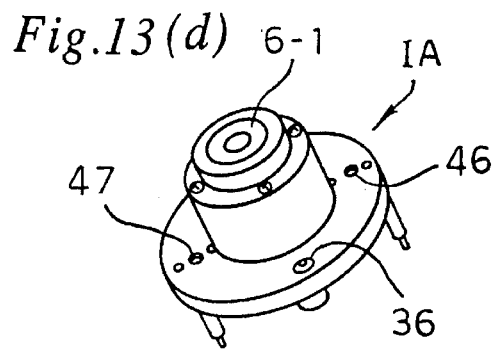
Figure 13E:
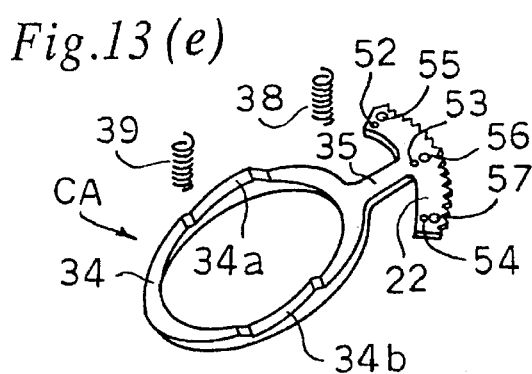
Figure 13F:
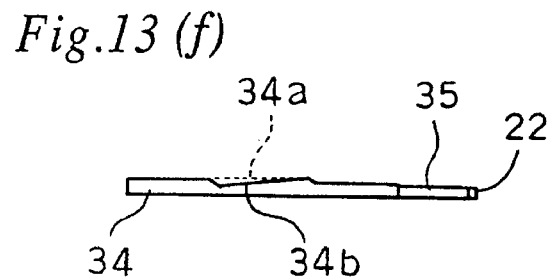
Figure 13G:
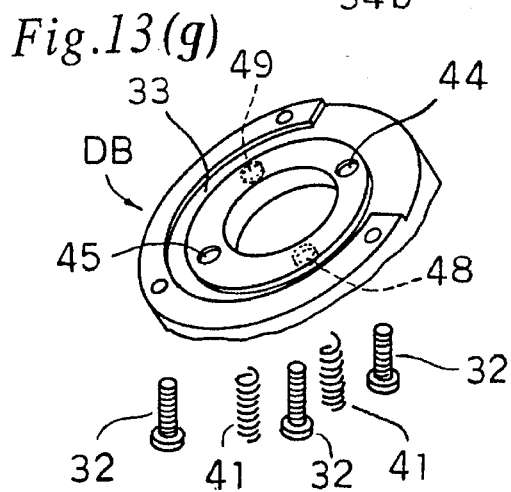
Figure 13H:
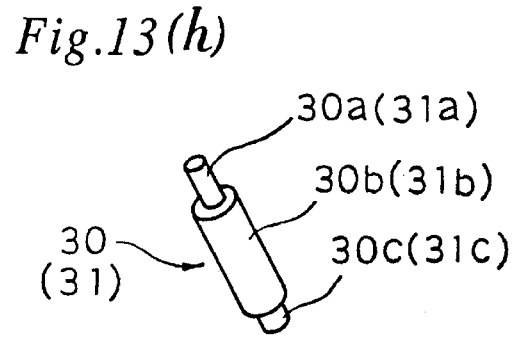

FIG. 12(a) is a cross section of the portion including a drum pair of the first type described previously with reference to FIG. 1, taken along the 90°–270° line in FIG. 2. Similarly, FIG. 12(b) is a cross section thereof taken along the 0°–180° line in FIG. 2. FIG. 13 is a perspective view of various components shown in FIG. 12 in disassembled state, in which FIGS. 13(a), 13(c), 13(e) and 13(g) show the lower drum Dd, the intermediate member SA, the annular cam member CA and the drum base DB, respectively. FIGS. 13(b) and 13(d) are rear views of the lower drum Dd and the intermediate member SA shown in FIGS. 13(a) and 13(c), respectively. FIG. 13(f) is a side view of the annular cam member CA shown in FIG. 13(e) and FIG. 13(h) is an enlarged perspective view of the rotation center members 30 and 31 shown in FIG. 13(c).

The lower drum Dd having a guide portion G is fixedly secured to the drum base DB by a plurality of screws 32.

On a surface of an edge portion 28c of the intermediate member SA provided within an inner space portion 29a formed in the lower drum Dd, mounting portions 28b for a rotary transformer 24 and the pivot point members 30 and 31 are provided. The mounting portions 28b are inserted into through-holes 29c formed in the lower drum Dd and support the rotary transformer 24 at their top ends. The pivot point members 30 and 31 have small diameter portions 30c and 31c [FIG. 13(f)] implanted in the edge portion 28c of the intermediate member SA and small diameter portions 30a and 31a. The small diameter portions 30a and 31a are inserted into through-holes 29b provided in the edge portion 29 of the lower drum Dd and protrude therefrom, respectively, to form two pivot points.

A bearing 6-1 is provided in a lower portion of the intermediate member SA and a bearing 5-1 is provided in the lower drum Dd in the vicinity of a line L3 connecting the two pivot points. The rotary shaft 1 is rotatably supported by these bearings. The bearing 6-1 may be a deep-groove double-row ball bearing which prevents inclination of the rotary shaft 1 and the bearing 5-1 may be a deep-groove single row ball bearing which allow an inclination of the rotary shaft 1 to some extent. The intermediate member SA and the annular cam member CA are resiliently coupled to the drum base DB by means of springs 38 to 41.

In this embodiment, since, in order to determine the rotation center of the lower drum Dd in the vicinity of the locus plane of the rotary magnetic heads Ha and Hb, the bearing 5-1 is provided in the lower drum Dd and the bearing 6-1 is provided in the intermediate member SA to support the rotary shaft 1 in the vicinity of the line L3 connecting the two pivot points, there is no need of using the relative fitting relation between the lower drum Dd and the intermediate member SA and thus it is possible to tilt the intermediate member SA smoothly.

Figure 14:
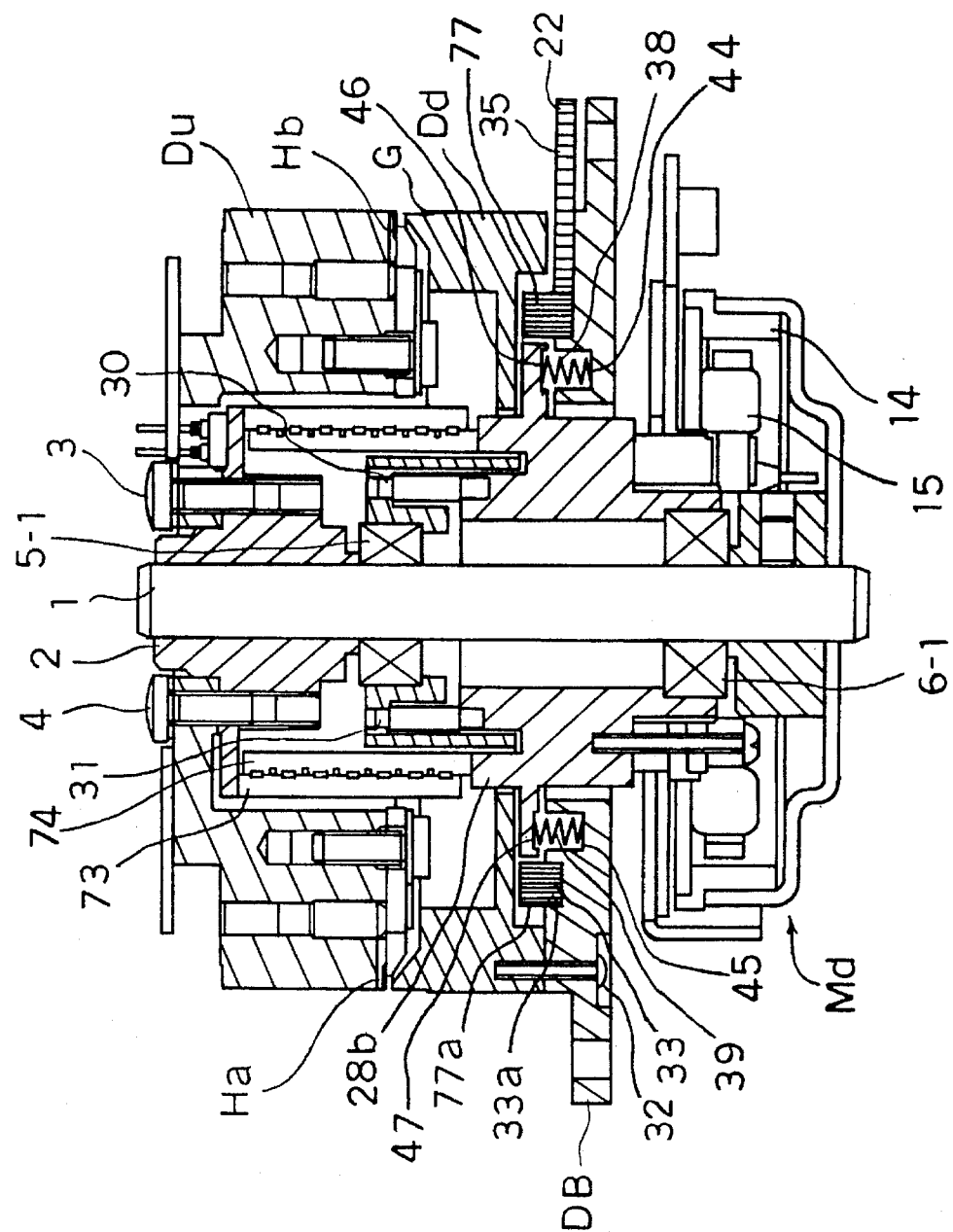
FIGS. 14(a) and 14(b) is a cross section of a portion of a drum pair which is a main portion of a magnetic recording/ reproducing apparatus according to a modification of the fifth embodiment of the present invention.
Figure 14:
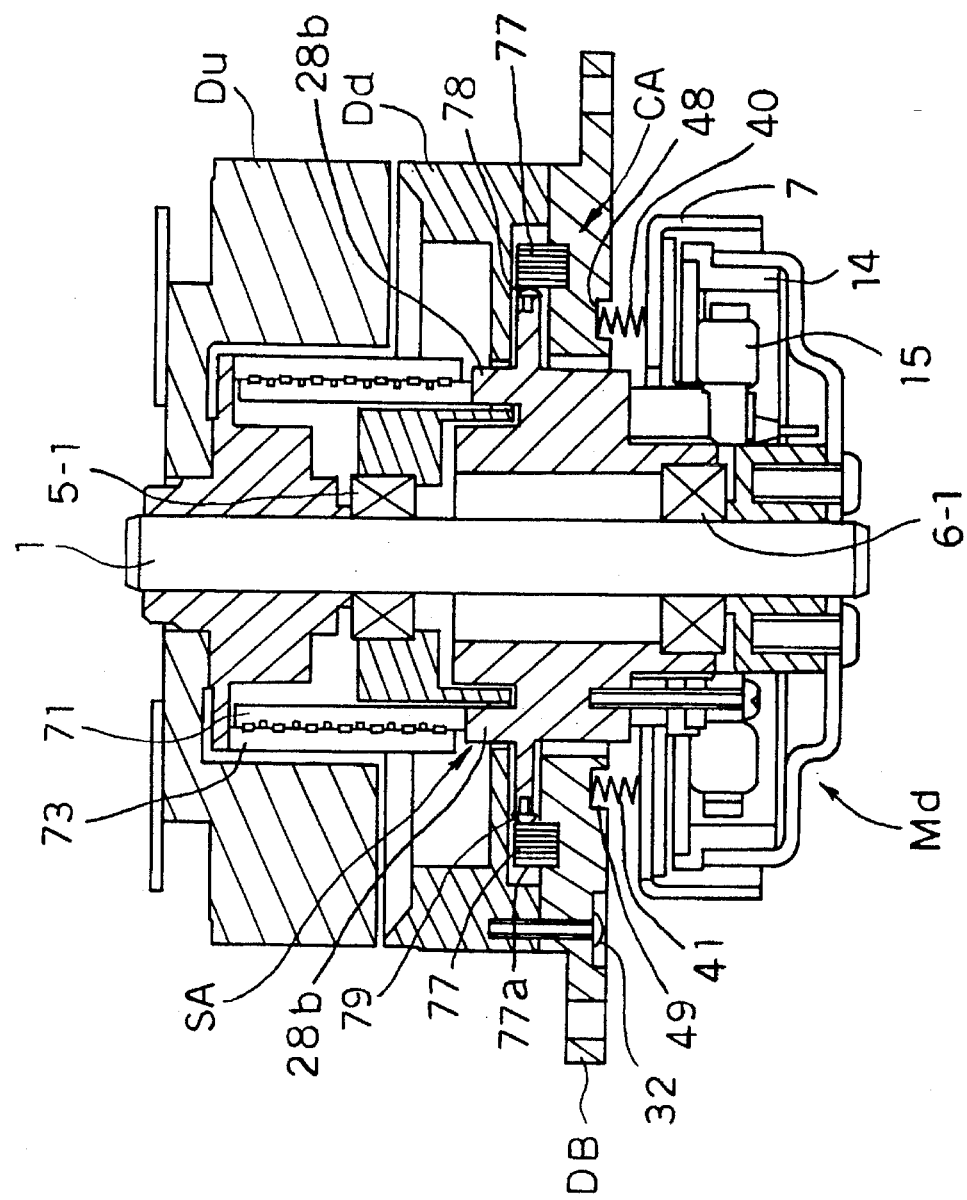

A modification of the fifth embodiment will be described with reference to FIG. 14. This modification is featured by that, in a magnetic recording/reproducing apparatus utilizing the hollow cylindrical rotary transformer 73 as in the third embodiment described with reference to FIG. 9, a bearing such as deep-groove single-row ball bearing which allows ann inclination of the rotary shaft 1 to some extent is provided in the lower drum Dd and a bearing such as deep-groove double-row ball bearing which prevents inclination of the rotary shaft 1 is provided in the intermediate member SA. Since construction and operation of various portions of this modification are clearly understood by referring to FIG. 14 together with FIGS. 9 and 12, etc., details thereof are omitted.

FIG. 14(a) is a cross section of the portion including the drum pair of the first type described previously with reference to FIG. 1, taken along the 90°–270° line in FIG. 2. Similarly, FIG. 14(b) is a cross section thereof taken along the 0°–180° line in FIG. 2.

Figure 15:
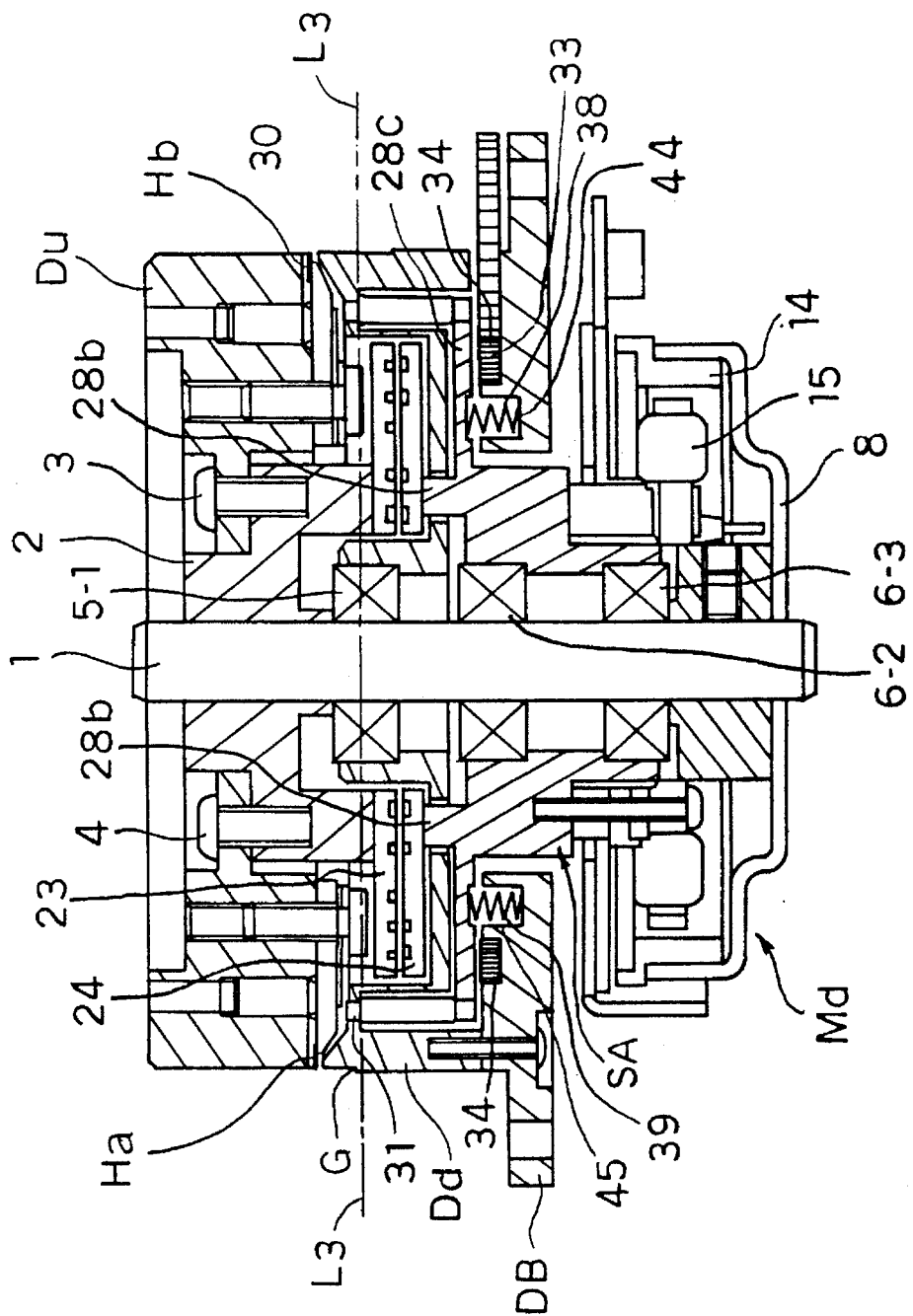
FIGS. 15(a) and 15(b) is a cross section of a portion of a drum pair which is a main portion of a magnetic recording/ reproducing apparatus according to a sixth embodiment of the present invention.
Figure 15:
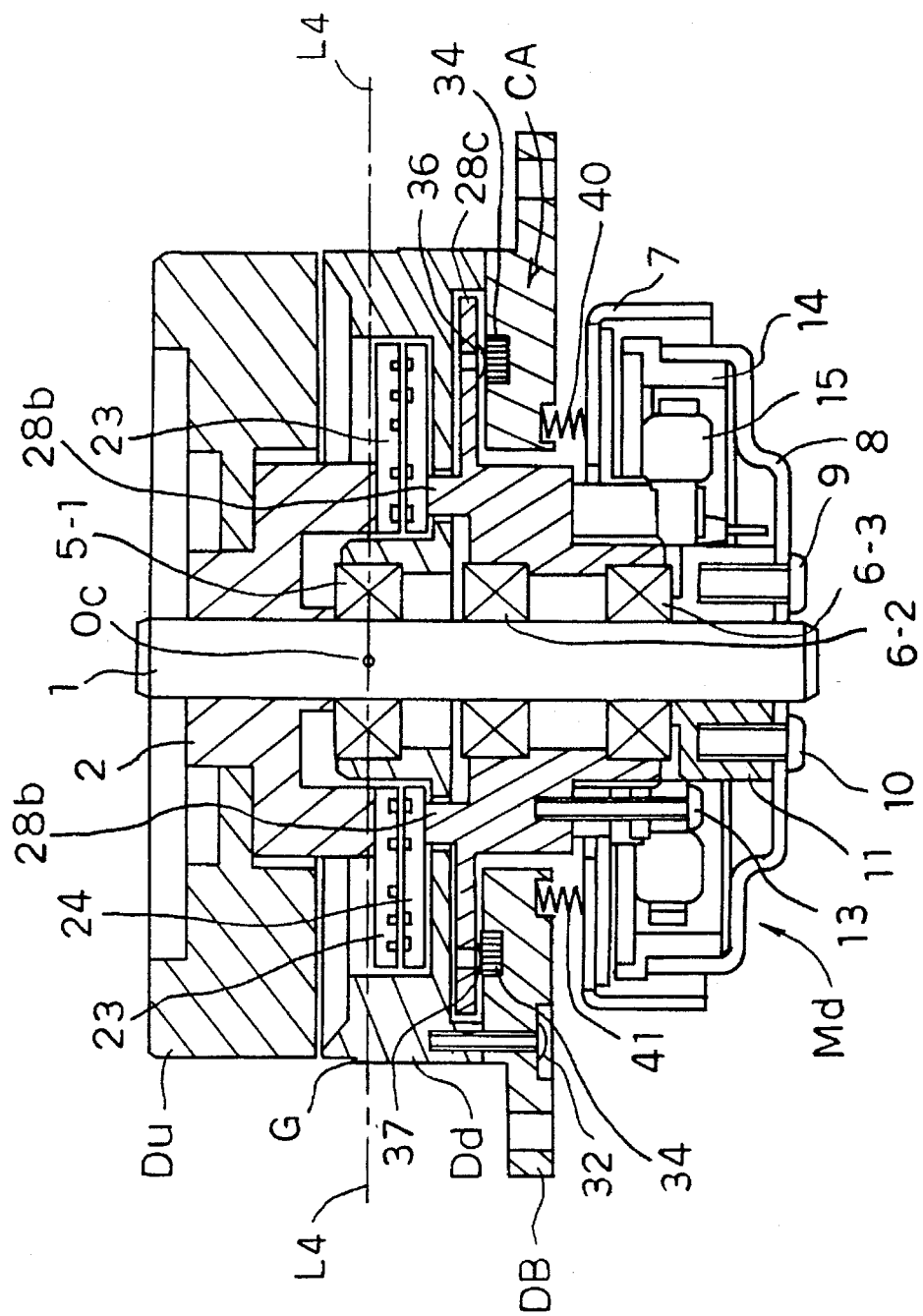

A sixth embodiment of the present invention will be described with reference to FIG. 15. This embodiment differs from the fifth embodiment in that two bearings such as deep-groove single-row ball bearings which allow inclination of a rotary shaft 1 to some extent are provided in an intermediate member SA. This difference of the sixth embodiment will be described mainly.

FIG. 15(a) is a cross section of the portion including the drum pair of the first type described previously with reference to FIG. 1, taken along the 90°–270° line in FIG. 2. Similarly, FIG. 15(b) is a cross section thereof taken along the 0°–180° line in FIG. 2.

A bearing 5-1 such as deep-groove single-row ball bearing which allows an inclination of the rotary shaft 1 to some extent is provided in the lower drum Dd as in the fifth embodiment and bearings 6-2 and 6-3 which are similar to the bearing 5-1 are provided in the intermediate member SA, to support the rotary shaft 1. With this construction, it is possible to use the deep-groove single row ball bearings which have simple structure and is inexpensive compared with the deep-groove double-row ball bearing or roller bearing, etc.

Figure 16:
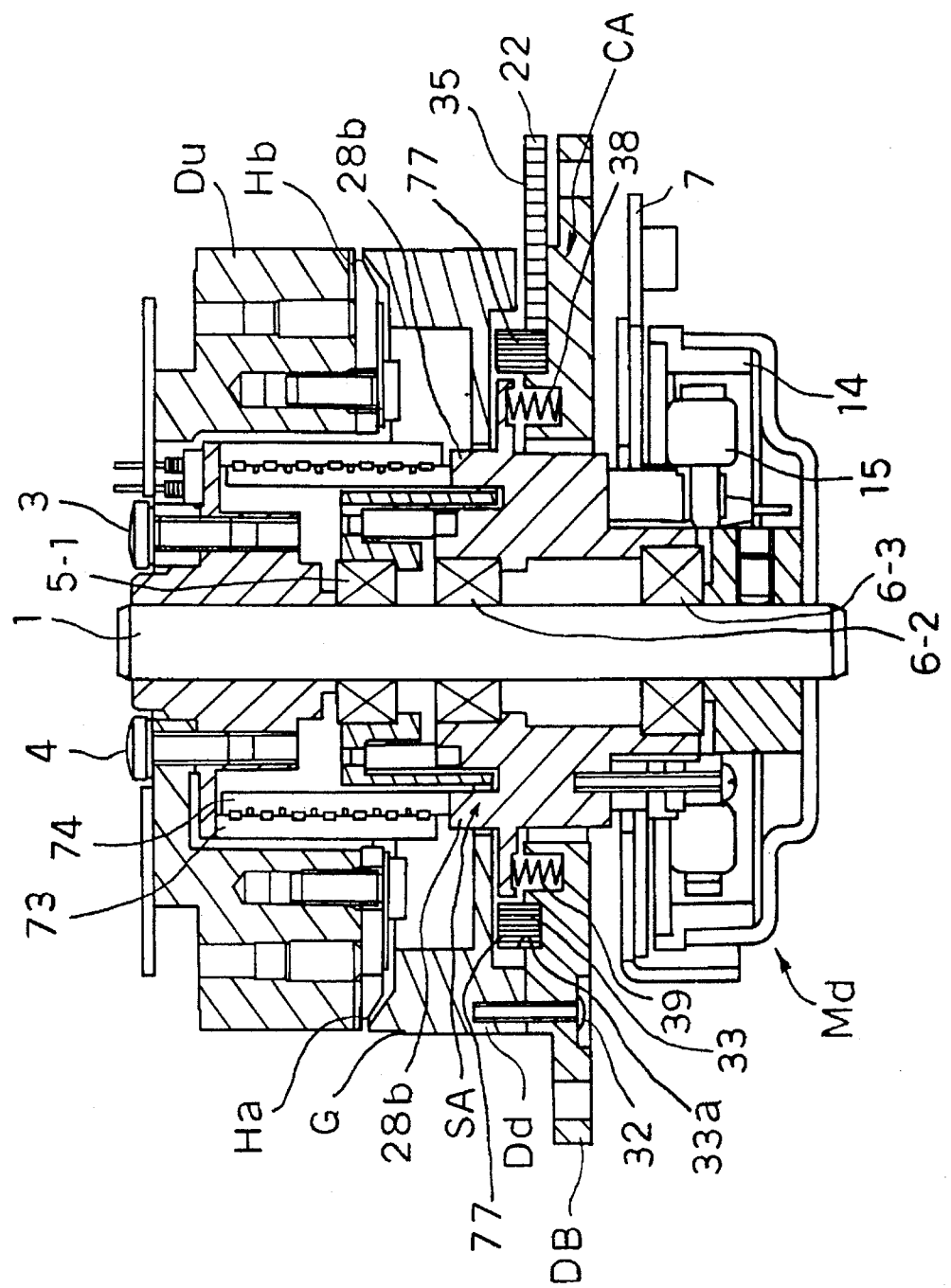
FIGS. 16(a) and 16(b) is a cross section of a portion of a drum pair which is a main portion of a magnetic recording/ reproducing apparatus according to a modification of the sixth embodiment of the present invention.

A modification of the sixth embodiment will be described with reference to FIG. 16. This modification is featured by that, in a magnetic recording/reproducing apparatus utilizing the hollow cylindrical rotary transformers 73 and 74 as in the third embodiment described with reference to FIG. 9, a bearing such as deep-groove single-row ball bearing which allows an inclination of the rotary shaft 1 to some extent is provided in the lower drum Dd and such as two deep-groove single-row ball bearings are provided in the intermediate member SA. Since construction and operation of various portions of this modification are clearly understood by referring to FIG. 16 together with FIGS. 9 and 15, etc., details thereof are omitted.

Figure 16B:
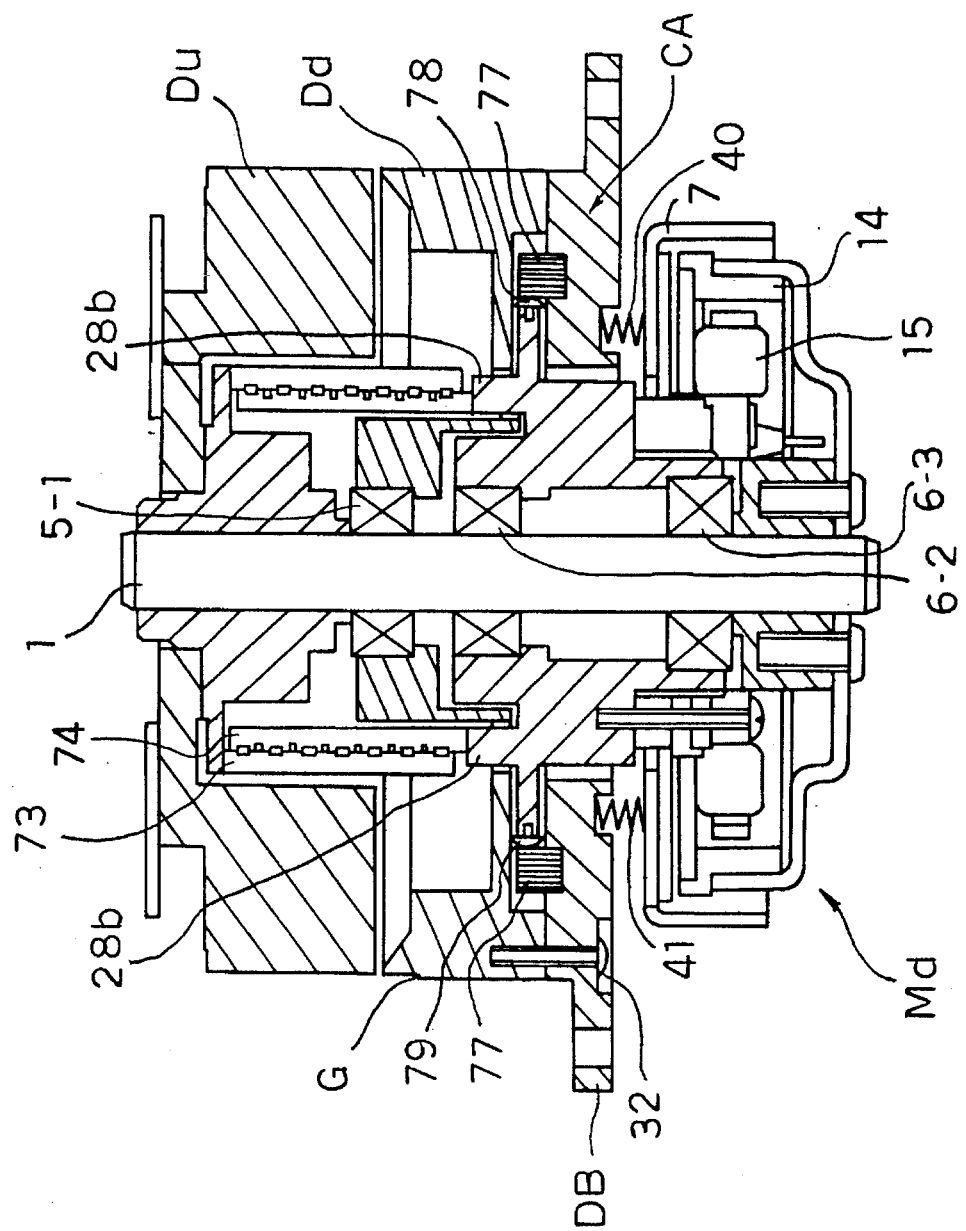

FIG. 16(a) is a cross section of the portion including the drum pair of the first type described previously with reference to FIG. 1, taken along the 90°–270° line in FIG. 2. Similarly, FIG. 16(b) is a cross section thereof taken along the 0°–180° line in FIG. 2.

A seventh embodiment of the present invention will be described with reference to FIG. 17. This embodiment differs from the sixth embodiment in the construction of pivot point members 30 and 31 connecting a lower drum Dd to an intermediate member SA. This difference of the sixth embodiment will be described mainly.

FIG. 17(a) is a cross section of the portion including the drum pair of the first type described previously with reference to FIG. 1, taken along the 90°–270° line in FIG. 2. Similarly, FIG. 17(b) is a cross section thereof taken along the 0°–180° line in FIG. 2.

FIGS. 17(c) to 17(g) are for explanation of construction of the pivot point members 30 and 31 provided between the intermediate member SA and the lower drum Dd.

Figure 17:
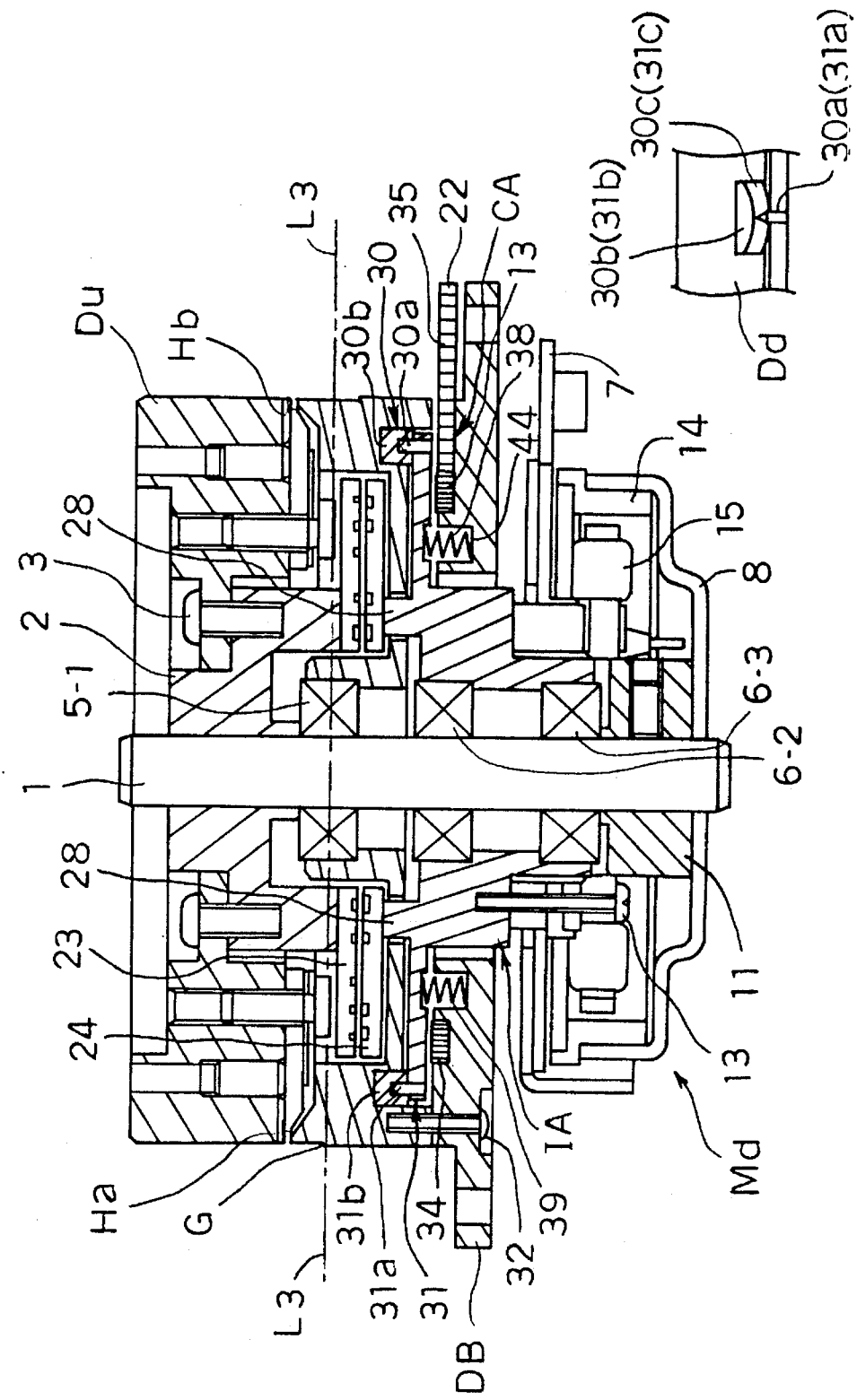
FIGS. 17(a) through 17(g) is a cross section of a portion of a drum pair which is a main portion of a magnetic recording/reproducing apparatus according to a seventh embodiment of the present invention.
Figure 17:
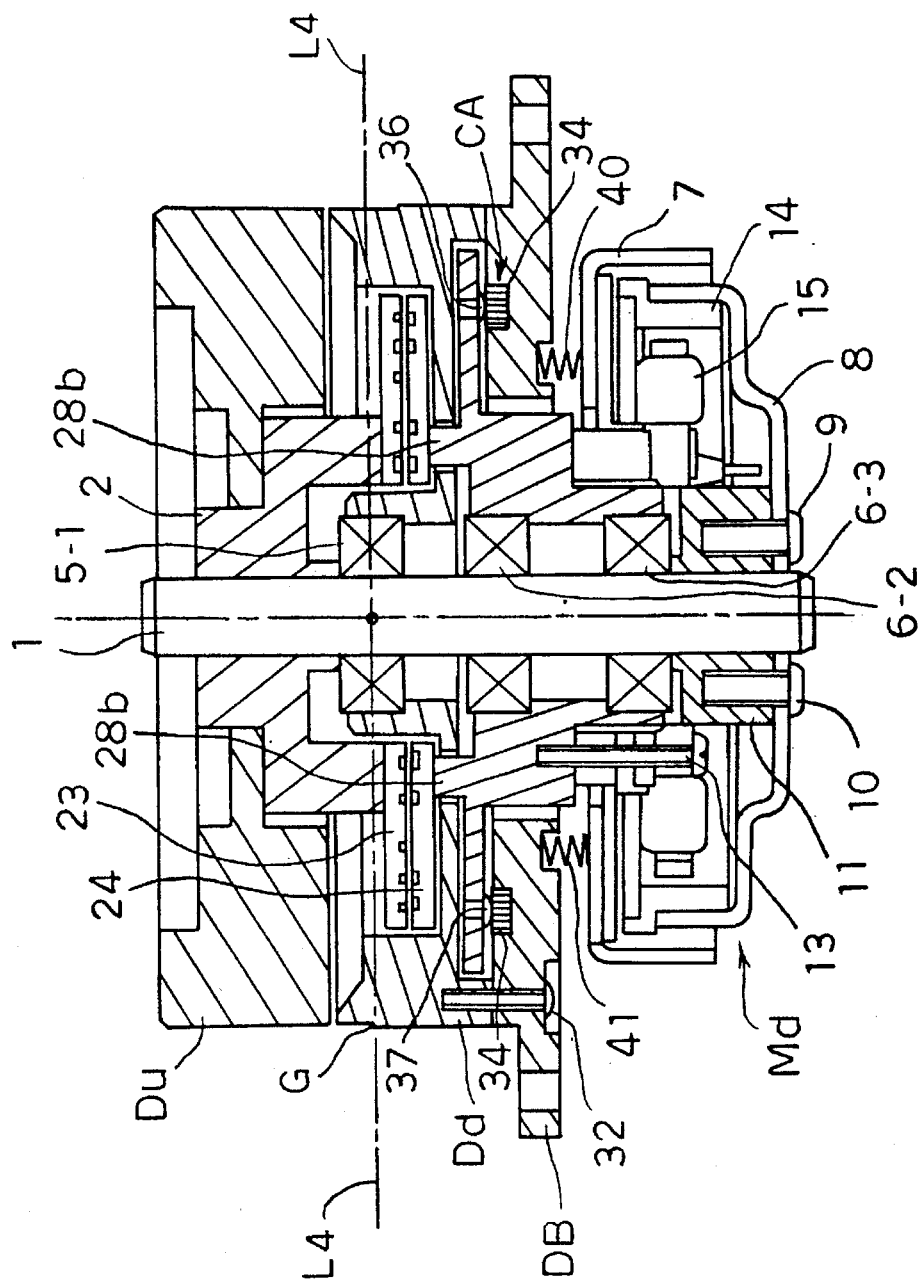
Figure 17D:
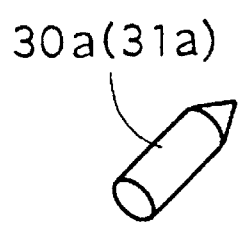
Figure 17E:
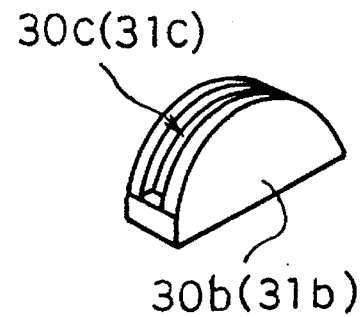
Figure 17F:
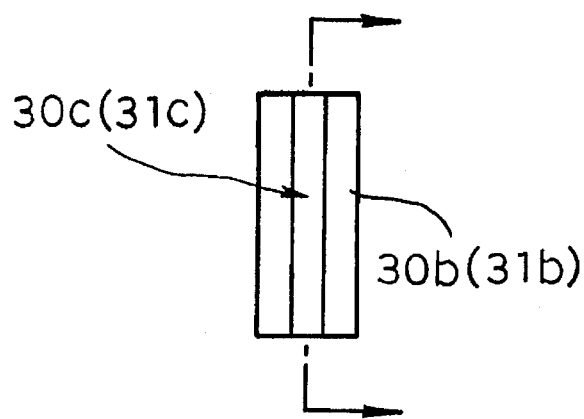
Figure 17G:
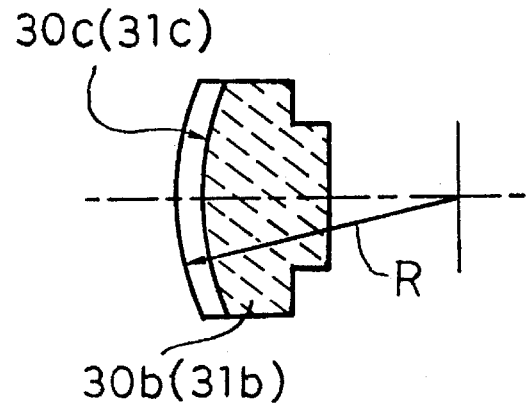

In FIG. 17, pins 30a and 31a are pressure-inserted into holes provided in an edge portion 28c of the intermediate member SA, respectively [FIG. 17(d)]. Substantially semi-cylindrical position limiting members 30b and 31b are formed with grooves 30c and 31c for guiding top end portions of the respective pins 30a and 31a [FIG. 17(e)]. The position limiting members 30b and 31b are pressure-inserted into the holes of the lower drum Dd with curved surfaces thereof being opposed to the edge portion 28c of the intermediate member SA at positions correspondin to the pins 30a and 31a pressure-inserted into the edge portion 28c of the intermediate member SA. The pins 30a and 31a engage with the grooves 30c and 31c of the respective position limiting members 30b and 31b to limit movement of the intermediate member SA with respect to the lower drum Dd in the plane of the drawing sheet [FIG. 17(a)]. On the other hand, the intermediate member SA is biased upwardly by springs 38 and 39, so that, when the intermediate member SA is tilted about the line L3, the edge portion 28c thereof is guided along the position limiting members 30b and 31b while contacting with the curved surfaces thereof. A center of curvature of the curved surface of the position limiting member 30b (31b) is positioned on the line L3 which is to be the rotation center of the intermediate member SA.

By constructing the pivot point members 30 and 31 as described, it becomes possible to set these members to be provided between the lower drum Dd and the intermediate member SA in positions remote from the line L3 which is the rotation center axis of the intermediate member SA.

That is, freedom of structural design of the lower drum and other portions related thereto is increased. It should be noted that the construction of the pivot point members 30 and 31 mentioned in this embodiment is also applicable to other embodiments including the fifth embodiment.

In the first to seventh embodiments described above, the magnetic recording/reproducing apparatus is of the first type in which the drum motor Md is provided below the lower drum Dd and the rotary shaft 1 is drive the upper drum Du mounted thereon, as described with reference to FIG. 1.

An eighth and ninth embodiments of the present invention will be described with reference to FIGS. 18 to 20. These embodiments are magnetic recording/reproducing apparatuses of the previously mentioned second type. That is, the present invention is applied to a magnetic recording/reproducing apparatus in which a rotor of a drum motor Md is directly mounted on an upper drum Du to rotate the latter and a shaft 1 itself is stationary. Since other portions than the mounting of the drum motor Md are similar to those in the previously mentioned embodiments, they are merely shown in FIGS. 18 to 20 without description thereof.

The eighth embodiment will be described with reference to FIGS. 19 and 20. FIG. 19(a) is a cross section of the portion including a drum pair DA of the second type previously described with reference to FIG. 18, taken along the 90°–270° line in FIG. 2. Similarly, FIG. 19(b) is a cross section thereof taken along the 0°–180° line in FIG. 2. FIG. 20 is a perspective view of various components shown in FIG. 19 in disassembled state, in which FIGS. 20(a), 20(c), 20(e) and 20(g) show the lower drum Dd, an intermediate member SA, an annular cam member CA and a drum base DB, respectively. FIGS. 20(b) and 20(d) are rear views of the lower drum Dd and the intermediate member SA shown in FIGS. 20(a) and 20(c), respectively. FIG. 20(f) is a side view of the annular cam member CA shown in FIG. 20(e) and FIG. 20(h) is an enlarged perspective view of pivot point members 30 and 31 shown in FIG. 20(c).

The lower drum Dd having a guide portion G is fixedly secured to the drum base DB by a plurality of screws 32.

The intermediate member SA provided within an inner space portion 29a formed in the lower drum Dd is provided with an edge portion 28 protruding from an upper end of an outer peripheral surface thereof and a top end of an edge portion 28 is fitted in the lower drum Dd with a small clearance with respect to an inner peripheral surface of the lower drum. That is, the edge portion 28 of the intermediate member SA has an outer diameter slightly smaller than an inner diameter of the inner space portion 29a of the lower drum Dd.

As mentioned in the first embodiment with reference to FIG. 4(b), it is also preferable to round the top end of the edge portion 28, curvature thereof being centered at a point Oc in FIG. 19(b).

As shown in FIG. 19, the drum motor Md is fixedly secured to the upper drum Du by means of screws 103 and 104. The upper drum Du is fitted on a fixing shaft 99 fixedly secured to the intermediate member SA through bearings 93 and 94. A drum motor mounting plate 95 is fixedly secured to a mounting member 106 fixedly fitted on the fixed shaft 99, by means of screws 96 and 97 and a stator 105 of the drum motor Md is mounted integrally to the drum motor mounting plate 95. Further, a rotary transformer 23 is fixedly secured to a lower end of the upper drum Du. Bearings 93 and 94 provided in the upper drum Du are fitted on the fixed shaft 99 on the intermediate member SA. Since the upper drum Du and the intermediate member SA have the fixed shaft 99 as a common center axis, a gap between the rotary transformer 23 on the side of the upper drum Du which rotates integrally with the rotor 92 and the rotary transformer 24 on the side of the intermediate member SA is kept constant even when the fixed shaft 99 is slanted.

Further, the intermediate member SA and the upper drum Du which are always held coaxially by means of the fixed shaft 99 on the intermediate member SA are supported to tilt with respect to the lower drum Dd by the pivot point members 30 and 31 provided at two positions on the straight line L3 in the vicinity of the locus plane of the rotary magnetic heads Ha and Hb. That is, the pivot point members 30 and 31 in the form of pins implanted in the upper end portion 28a of the intermediate member SA at the positions on the line L3 are received in two through-holes 29b provided in the edge portion 29 of the lower drum Dd, respectively, to form two pivot points. The intermediate member SA and the annular cam member CA are resiliently coupled to the drum base DB by springs 38 to 41. The springs 38 and 39 are inserted into the holes 44 and 45 formed in he drum base DB and holes 46 and 47 formed in the intermediate member SA, respectively, as shown in FIG. 19(a) and the springs 40 and 41 are provided in holes 101 and 102 formed in a restriction plate 100 mounted on the intermediate member SA by screws 107 and 108.

A ninth embodiment of the present invention will be described with reference to FIG. 21. The ninth embodiment differs from the eighth embodiment in that, in order to determine a rotation center of an intermediate member SA (straight line L3 or a point Oc), similar pivot point members 30 and 31 to those used in the fifth embodiment are used and that a fixed shaft 99 is rotatably supported by a bearing portion 98 provided in the lower drum Dd. Therefore, these different points will be described in detail and description of other points is omitted.

FIG. 21(a) is a cross section of the portion including a drum pair DA of the second type previously described with reference to FIG. 18, taken along the 90°–270° line in FIG. 2. Similarly, FIG. 21(b) is a cross section thereof taken along the 0°–180° line in FIG. 2.

The lower drum Dd having a guide portion G is fixedly secured to the drum base DB by a plurality of screws 32.

A fixed shaft 99 is fixedly fitted to the intermediate member SA provided within the inner space portion of the lower drum Dd.

Figure 21:
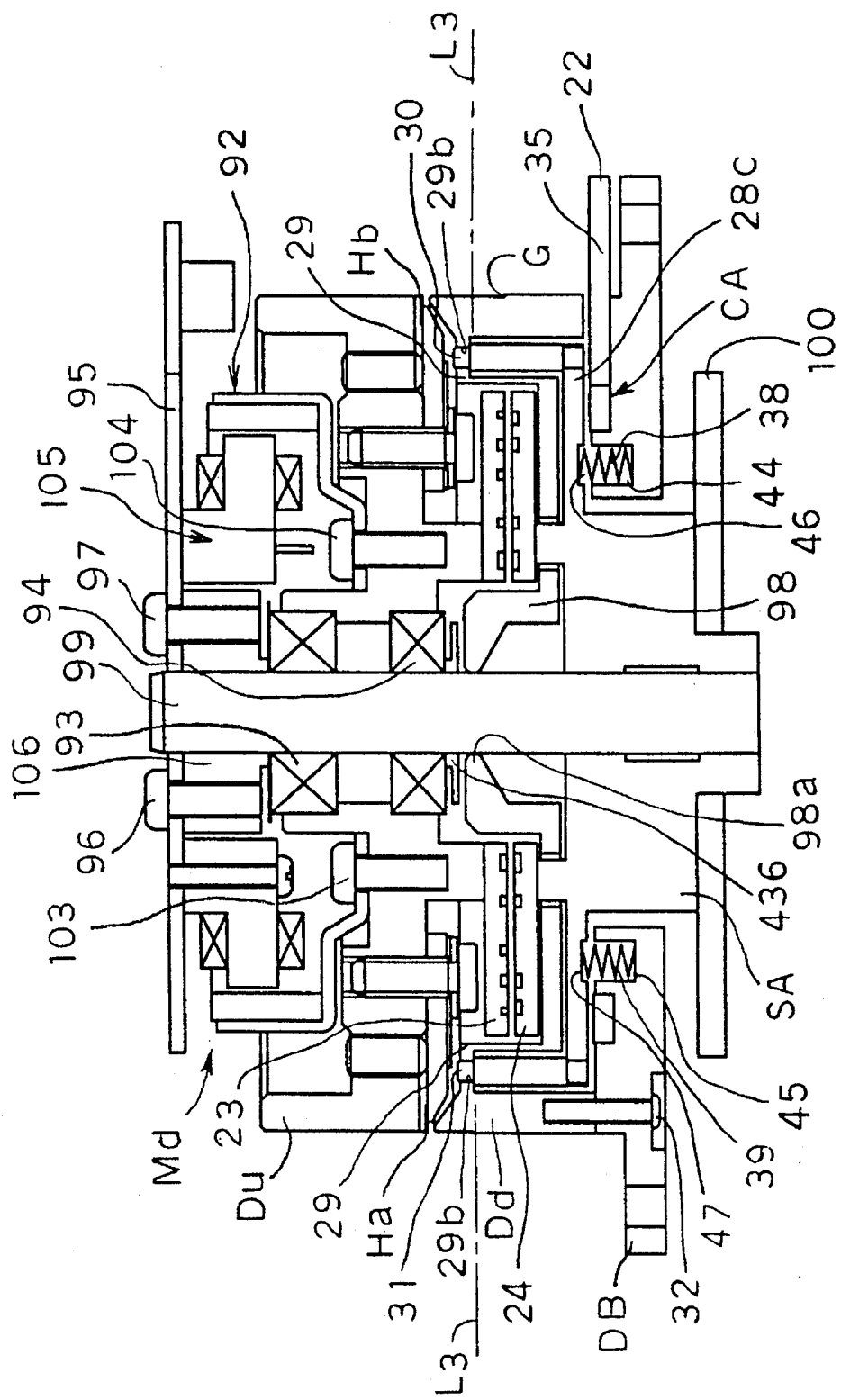
FIGS. 21(a) and 21(b) is a cross section of a portion of a drum pair which is a main portion of a magnetic recording/ reproducing apparatus according to a ninth embodiment of the present invention.
Figure 21:
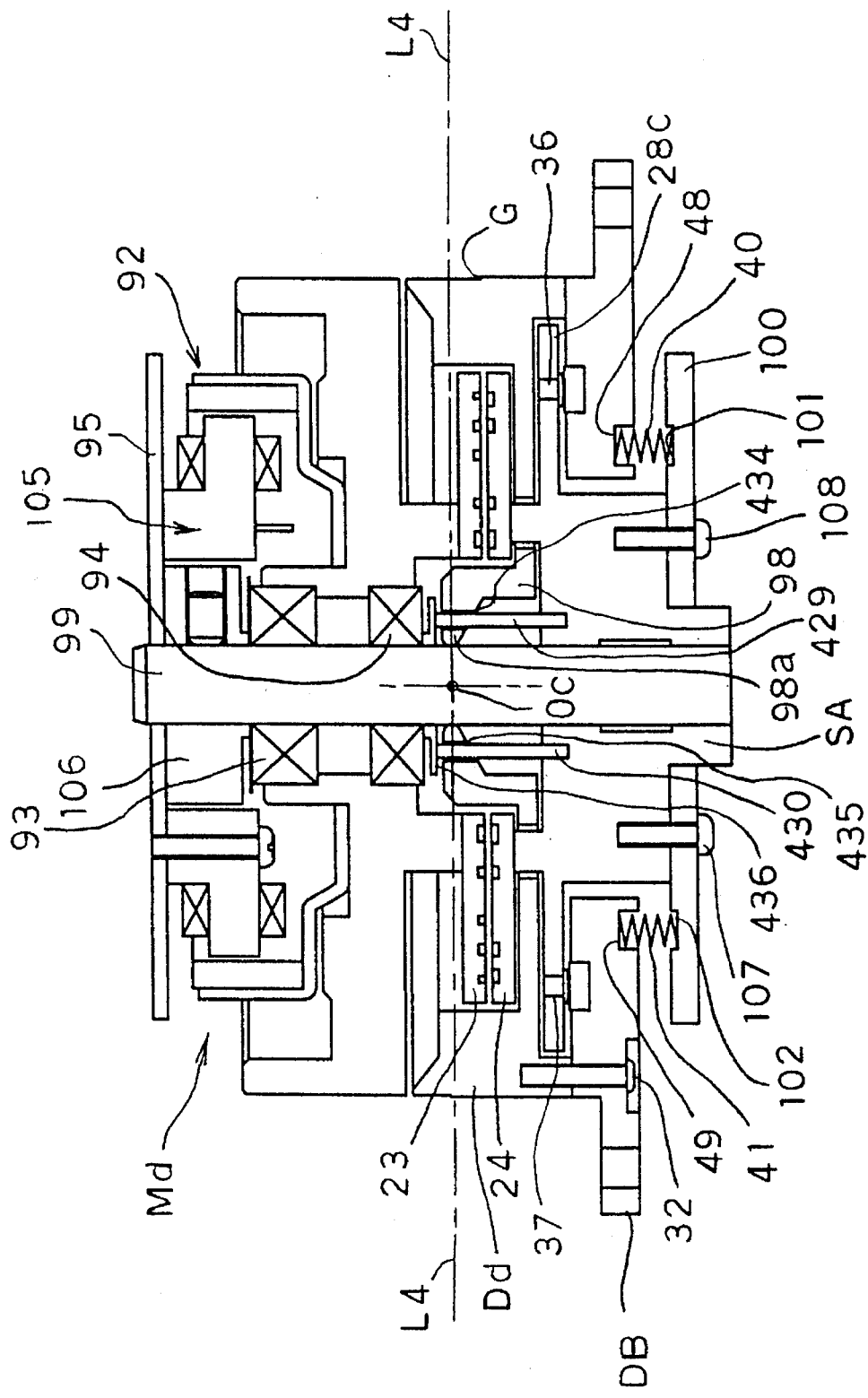

As shown in FIG. 21, a rotor 92 of the drum motor Md is fixedly secured to the upper drum Du by screws 103 and 104. The upper drum Du is fitted to the fixed shaft 99 with the bearings 93 and 94. A top end 98a of the bearing portion 98 provided on the lower drum Dd rotatably supports the fixed shaft 99 under the bearing 94.

The drum motor mounting plate 95 is fixedly secured to the mounting member 106 fitted on the fixed shaft 99, by means of screws 96 and 97 and a stator 105 of the drum motor Md is integrally mounted on the drum motor mounting plate 95. A rotary transformer 23 is fixedly secured to a lower end portion of the upper drum Du. Since the bearings 93 and 94 fixedly provided on the upper drum Du are supported by the fixed shaft 99 so that the upper drum Du and the intermediate member SA have the fixed shaft 99 as a common rotation axis, a gap between the rotary transformer 23 on the side of the upper drum Du which rotates together with the rotor 92 and the rotary transformer 24 on the side of the intermediate member SA is kept constant even when the fixed shaft 99 is slanted.

The intermediate member SA and the upper drum Du which are commonly supported by the fixed shaft 99 are supported to tilt with respect to the lower drum Dd by the pivot point members 30 and 31 provided at two points on the straight line L3 in the vicinity of the locus plane of the magnetic heads Ha and Hb. That is, the pivot point members 30 and 31 in the form of pins implanted in the edge portion 28c of the intermediate member SA at the positions on the line L3 are received in two through-holes 29b provided in the end portion 29 of the lower drum Dd, respectively, to form two pivot points. Pins 429 and 430 are fitted loosely in through holes 434 and 435 provided on the lower drum Dd. Tops of the pins 429 and 430 contact with a spacer 436 to support thereof. The spacer 436 has functions of adjusting a gap between the rotary transformer 23 mounted on the upper drum Du and the rotary transformer 24 mounted on the intermediate member SA, as well as of accepting at a lower side, a preload applied to the bearings 93 and 94.

The intermediate member SA and the annular cam member CA are resiliently coupled to the drum base DB by the springs 38 to 41. The springs 38 and 39 are provided in spaces defined by holes 44 and 45 formed in the drum base DB and holes 46 and 47 formed in the intermediate member SA, respectively, as shown in FIG. 21(a) and the springs 40 and 41 are provided in spaces defined by holes 48 and 49 formed in the drum base DB and holes 101 and 102 formed in a restricting plate 100 mounted on the intermediate member SA by screws 107 and 108, respectively, as shown in FIG. 21(b).

In the first to ninth embodiments of the present invention, the lower drum Dd having the guide G for the reference edge Te of the magnetic tape T is fixed on the drum base DB and the magnetic heads Ha and Hb scan the magnetic tape at a desired angle with respect to the reference edge Te of the magnetic tape T by slanting the locus plane of the magnetic heads Ha and Hb by tilting the rotary shaft 1 or the fixed shaft 99 of the upper drum Du which mounts the magnetic heads Ha and Hb about a predetermined rotation center with respect to the lower drum Dd fixed to the drum base DB, as mentioned hereinbefore.

That is, in these embodiments, it is the prerequisite that the magnetic tape T always runs stably with its reference edge Te being guided along a constant path of the guide portion G of the lower drum Dd, and the trick play, etc., having no noise bar is realized by correcting the locus plane of the magnetic heads Ha and Hb by slanting the latter with respect to the magnetic tape T transported as mentioned (this correction will be referred to as "track correction", hereinafter). This prerequisite is satisfied when the track width recorded on the magnetic tape T is relatively large, for example, during the SP mode operation of the VTR of VHS system.

However, during, for example, the EP mode operation of the VTR of VHS system in which the track width is as small as 19 μm, it may be difficult to remove noise bar during the trick play by merely performing the track correction as in the first to ninth embodiments.

In order to clarify this phenomenon, the inventors of this application have observed the tape running around the drum pair DA by means of an endoscope and found that, due to rotation of the upper drum Du during the FF reproduction or FB reproduction, the magnetic tape slightly floats up from the guide portion G or is pressed to the guide portion G. This phenomenon will be described with reference to FIGS. 49 and 50.

FIG. 49(a) shows a running state of the magnetic tape T during the normal reproduction. In this state, the center axes of the upper drum Du and the lower drum Dd are consistent and the reference edge Te of the tape T continuously runs along the guide portion 6 of the lower drum Dd without floating from or being pressed to the guide portion G.

On the other hand, in a tape running state during the FF reproduction, the rotary shaft of the upper drum Du is tilted clockwise direction with respect to the center axis Y—Y of the lower drum Dd as shown by a chain line in FIG. 49(b). Therefore, in the inlet side of the drum pair DA (in the guide roller SGR on the supply side), the magnetic tape T is pulled by the upper drum Du and thus the reference edge Te thereof tends to move away from the guide portion G of the lower drum Dd. On the other hand, in the exit side of the drum pair DA (in the side of the guide roller TGR on the take-up side), the magnetic tape T tends to be pressed to the guide portion G by the upper drum Du. As a result, the magnetic tape T is slanted by a small angle ($\Theta2$) with respect to the guide portion G of the lower drum Dd.

Therefore, the locus plane of the magnetic heads Ha and Hb can not exactly trace the track pattern on the tape T even if the track correction is performed by slanting the upper drum Du by an angle ($\Theta1$) corresponding to the FF reproduction at a predetermined speed with respect to the lower drum Dd.

In order to solve this problem, two methods may be considered which are shown in FIGS. 49(c) and 49(d), respectively. These methods may be referred as "lead correction" method, hereinafter. That is, in the method shown in FIG. 49(c), the guide portion G of the lower drum Dd is aligned with the reference edge Te of the magnetic tape T by further slanting the drum pair DA by ($\Theta2$) while relative angle ($\Theta1$) of the upper drum Du and the lower drum Dd is maintained constant. Incidentally, this method can be modified by separately providing the guide portion G from the lower drum Dd as will be described in detail with respect to a fourteenth embodiment.

In the method shown in FIG. 49(d), a guide roller SGR on the tape supply side and a guide roller TGR on the tape take-up side are movable in the tape width direction. During the FF reproduction, the tape running direction is corrected by moving the guide roller SGR downwardly while moving the guide roller TGR upwardly so that the tape follows the guide portion G of the lower drum Dd. FIG. 50 shows the above matters for the FB reproduction. From FIG. 50, it is clear that only the direction of slant of the magnetic tape and the operating direction of the members related to the lead correction are reversed to those in the FF reproduction.

Figure 22:
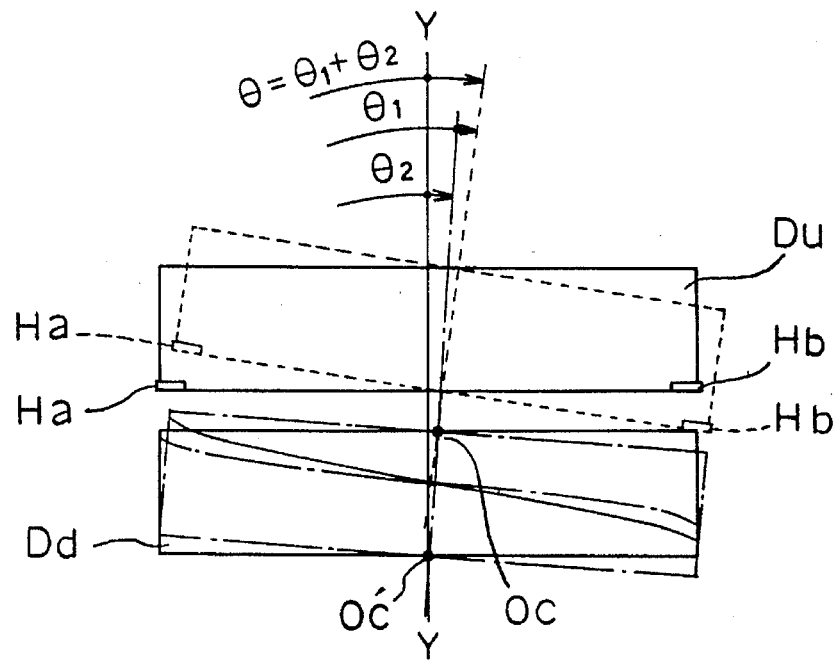
FIGS. 22(a) and 22(b) is a side view of the drum pair showing a constructive principle of the magnetic recording/ reproducing apparatus according to the present invention and an operational principle thereof.
Figure 22:
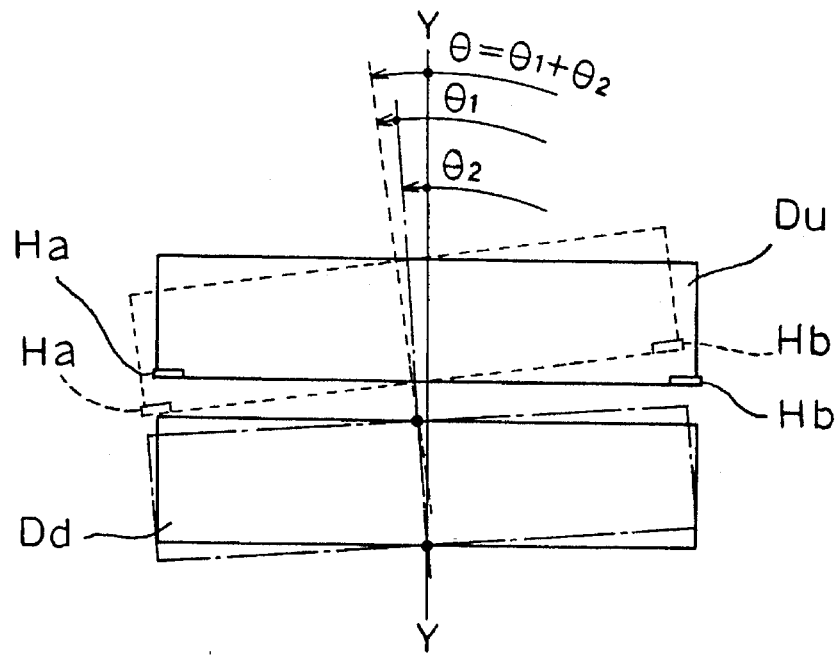
Figure 23:
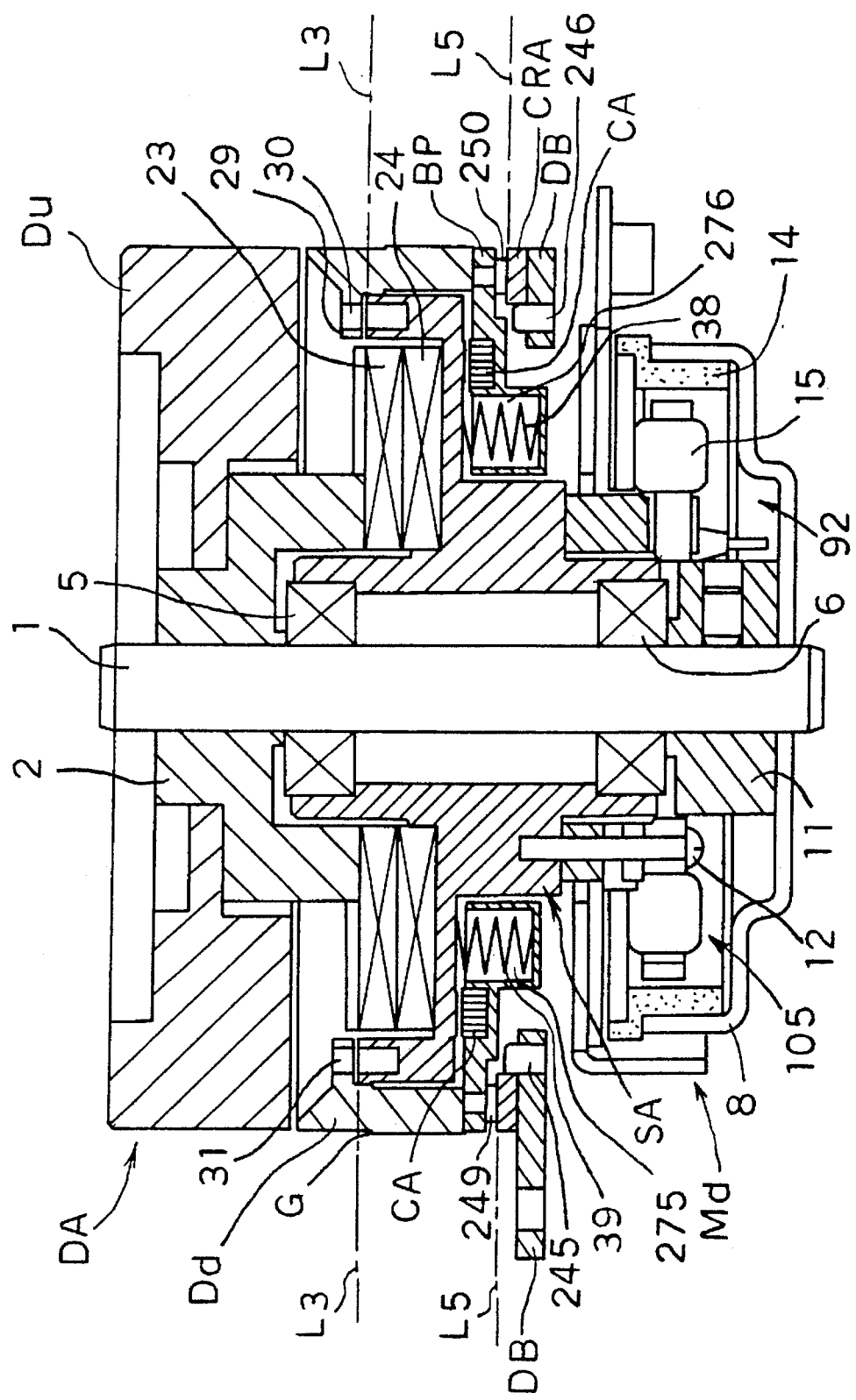
FIGS. 23(a) and 23(b) is a cross section of a portion of a drum pair which is a main portion of a magnetic recording/ reproducing apparatus according to a tenth embodiment of the present invention.
Figure 23:
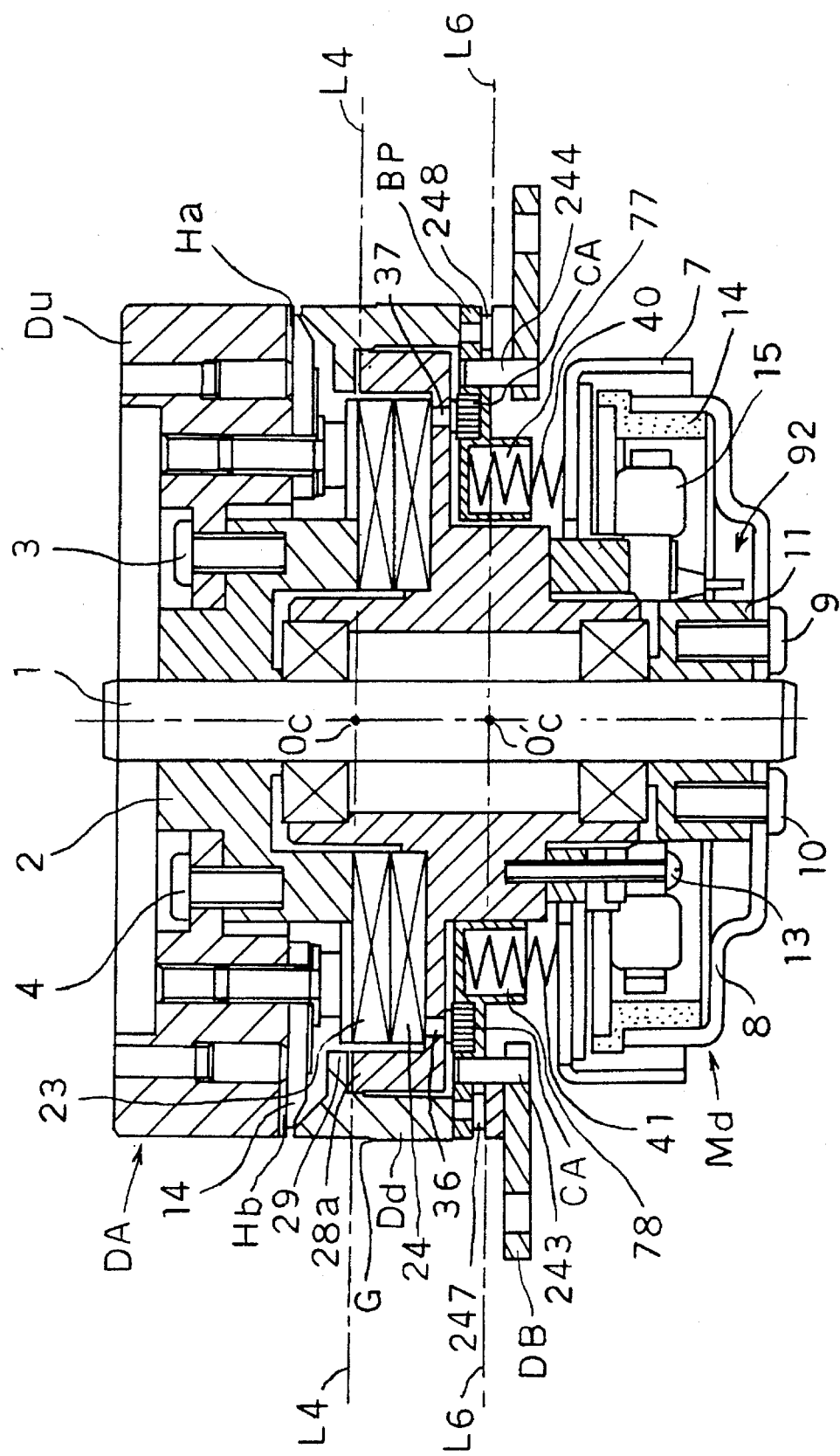

A relation between the lead correction and the track correction mentioned with respect to the FIG. 49(c) and 50(c) and their principles will be described in detail with reference to FIG. 22.

FIGS. 22(a) and 22(b) are side views of the drum pair DA when looked from the 90° direction in FIG. 2, showing the track correction and the lead correction for the FF reproduction and the FB reproduction, respectively. In these figures, a line Y—Y corresponds to the lines Y—Y in FIGS. 3, 49 and 50, etc., and, when there is no lead correction, that is, in the normal reproduction, indicates the direction of the center axis of the lower drum Dd.

In the FF reproduction, the track correction is made by tilting the upper drum Du with respect to the lower drum Dd by an angle $\Theta1$ in the clockwise direction about a straight line L3 passing through a point Oc perpendicularly to the drawing sheet (see the respective cross sections of the drum pair DA in the first to ninth embodiments), as shown in FIG. 49(a). Further, the lead correction is performed by tilting the upper drum Du and the lower drum Dd integrally by an angle $\Theta2$ about a straight line (parallel to the line L3) passing through a point Oc' perpendicularly to the drawing sheet. That is, a final inclination angle $\Theta$ of the center axis of the upper drum Du with respect to the line Y—Y becomes $\Theta1+\Theta2$ by this track correction and the lead correction. As mentioned previously, in order to maintain a favorable contact between the magnetic heads Ha and Hb and the magnetic tape, it is necessary to set the point Oc in the vicinity of the locus plane of the heads. However, for the points Oc', such condition is not always necessary. Further, since an operation in the FB reproduction is clearly understandable when reference is made to FIG. 49(b), details thereof is omitted.

Concrete constructions of magnetic recording/reproducing apparatuses employing the track correction and the lead correction will be described with reference to a tenth to fifteenth embodiments.

The tenth embodiment will be described first with reference to FIGS. 23 to 27.

Figure 24:
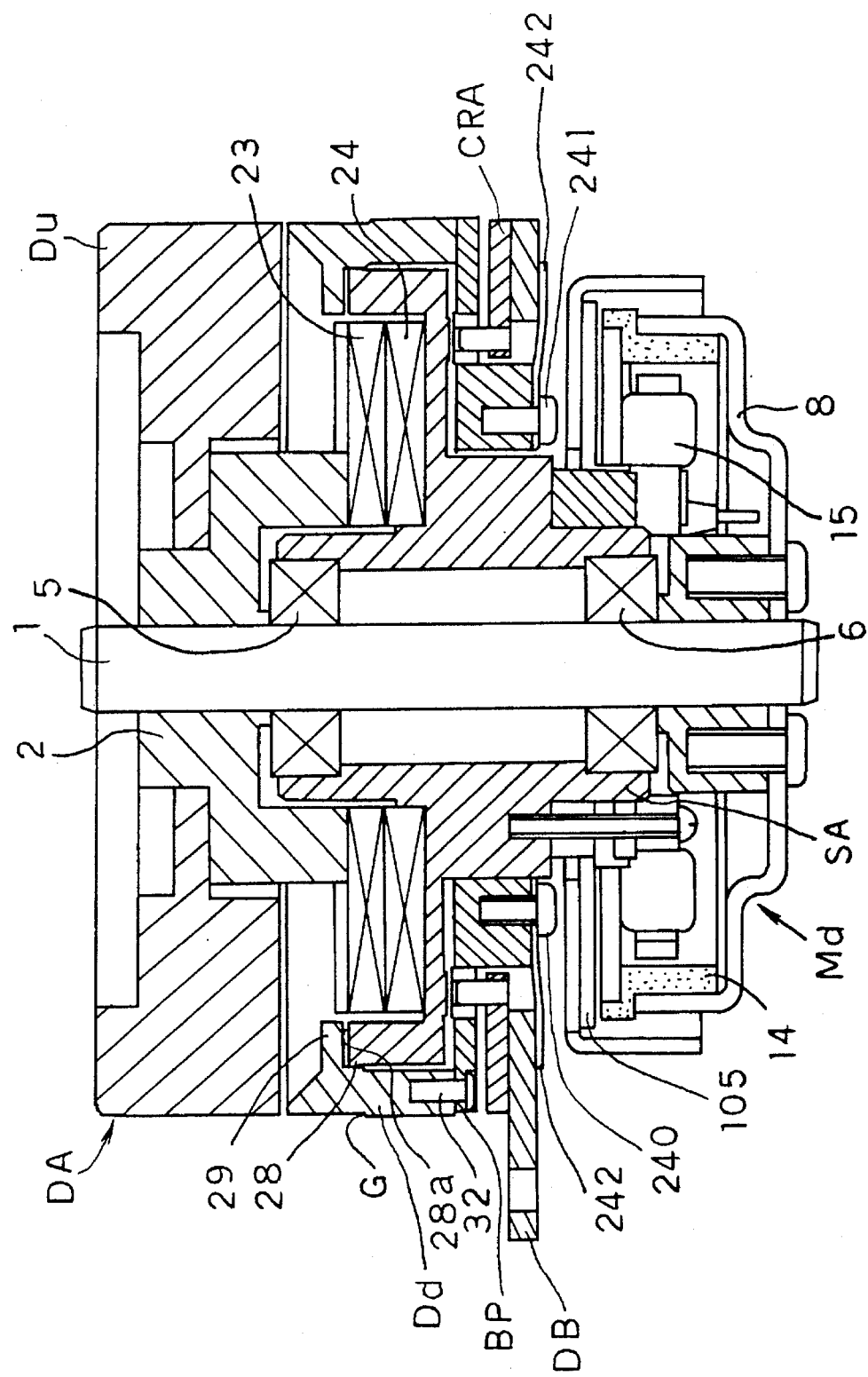
FIG. 24 is another cross section of a portion of a drum pair which is a main portion of a magnetic recording/reproducing apparatus according to the tenth embodiment of the present invention.
Figure 27A:
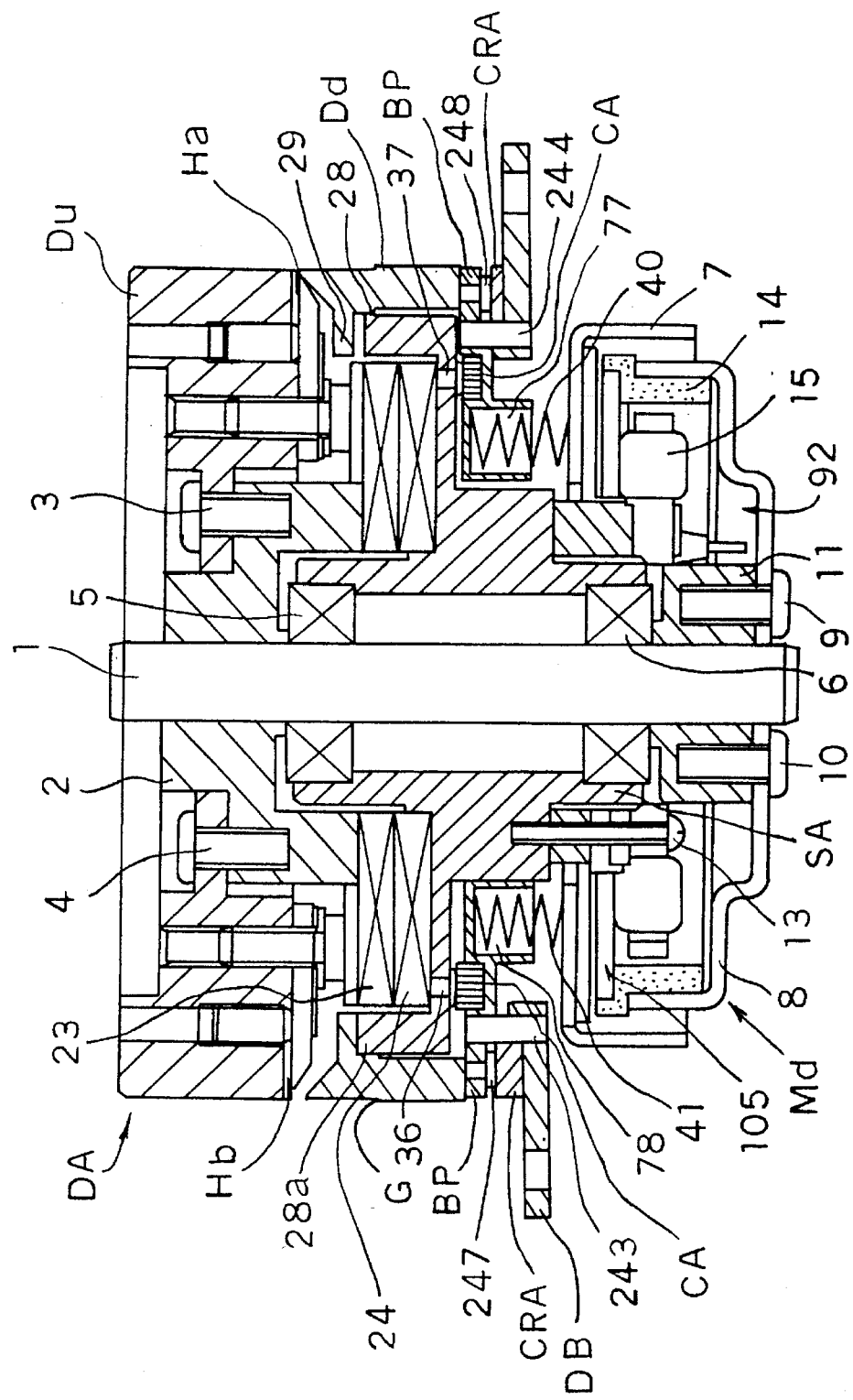
FIGS. 27(a) and 27(b) is a cross sectional side view of the tenth embodiment shown in FIGS. 23(a) and (b) or 24, for explanation of an operation thereof.
Figure 27B:
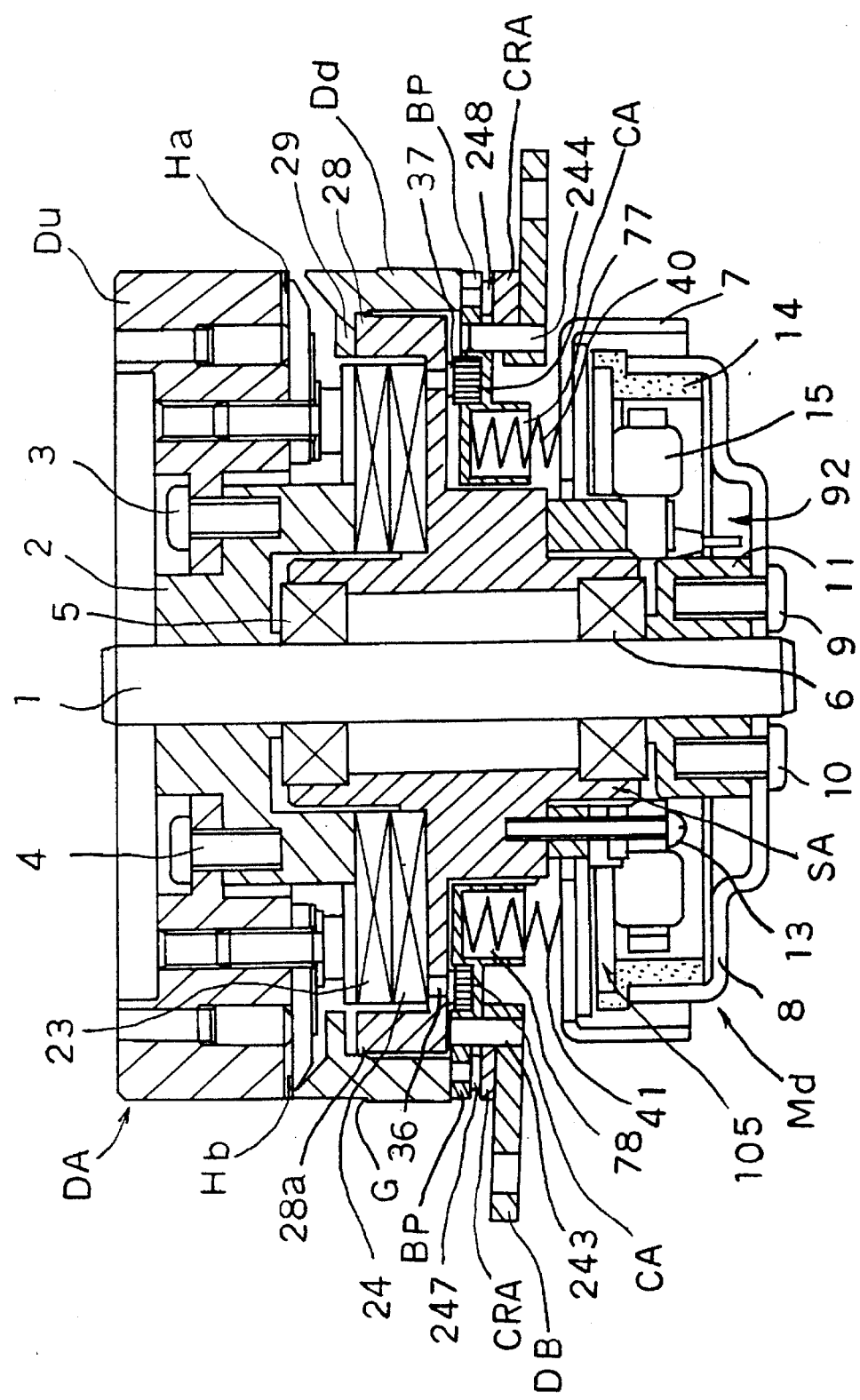

FIG. 23(a) is a cross section of a portion including a drum pair taken along the 90°–270° line in FIG. 2. Similarly, FIG. 23(b) is a cross section thereof taken along the 0°–180° line in FIG. 2. FIG. 24 is a cross section of the same taken along a different line from those in the FIGS. 23(a) and 23(b). Further, FIG. 27 is a cross section taken along the 0°–180° line in FIG. 2 for operational explanation.

An upper drum Du is fixedly secured to an upper drum fixing member 2 which is fixedly secured to a rotary shaft 1 of a drum motor Md by screws 3 and 4. When the drum motor Md rotates at a predetermined speed, magnetic heads Ha and Hb mounted on the upper drum Du rotate integrally with the rotary shaft 1 supported rotatably by bearings 5 and 6 mounted on an intermediate member SA. Rotary transformers 23 and 24 are mounted on the upper drum fixing member 2 and the intermediate member SA, respectively.

A stator 105 of the drum motor Md is fixedly secured to the intermediate member SA by screws 12 and 13 and the rotor 92 including a permanent magnet 14 is mounted on the fixing member 11 fixed to the rotary shaft 1, by means of screws 9 and 10. A coil 15 is mounted on the stator 105.

The intermediate member SA is arranged such that an upper portion thereof is positioned in an inner space portion of the lower drum Dd. Pivot point members 30 and 31 similar to those shown in FIG. 5 or 20 are provided in an area of the drum pair DA between an upper end portion 28a of the intermediate member SA and an edge portion 29 of the fixed drum Dd at positions in the 90°–270° line. Further, intermediate member SA includes an edge portion 28 protruding from an upper end of its outer peripheral surface, an outer end of the edge portion 28 being faced to an inner peripheral surface of the lower drum Dd with a small clearance. That is, the edge portion 28 of the intermediate member SA has an outer diameter slightly smaller than an inner diameter of the inner space portion of the lower drum Dd.

Figure 26:
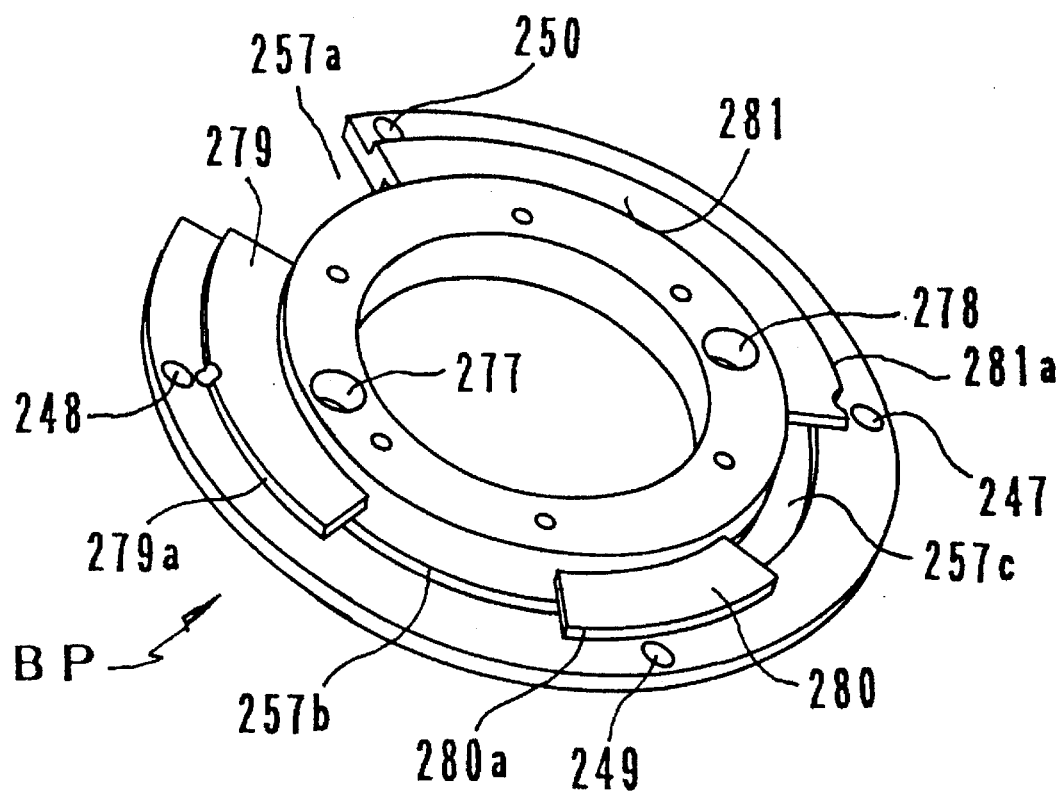
FIG. 26 is a perspective view of a rear side of a base plate shown in FIG. 25.

Further, springs 38 and 39 are provided between an upper surface of a base plate BP fixed to a lower end portion of the lower drum Dd by screws 32 (FIG. 24) and a lower surface of the intermediate member SA and springs 40 and 41 are provided between the lower surface of the base plate BP and a drum motor mounting plate 7 integrally coupled to the intermediate member SA. FIG. 26 is a perspective rear view of the base plate BP and FIG. 25 is a perspective rear view of the base plate BP.

A root end portion of a leaf spring 242 (a shape of the leaf spring 242 is shown in FIG. 25) is fixed to the base plate BP by screws 240 and 241 as shown in FIG. 24 such that the base plate BP can be deviated slightly vertically with respect to the drum base BD by pressure contacting a top end portion of the leaf spring 242 to a lower surface of the drum base DB. The base plate BP is positioned with respect to the drum base DB by inserting positioning pins 243 and 244 provided on the drum base DB in the 0°–180° direction in the drum pair DA into holes provided in the base plate BP [FIG. 23(b)].

An annular cam member CA for regulating slant of the rotary shaft 1 is provided between the upper surface of the base plate BP and the lower surface of the intermediate member SA and an annular cam member CRA serving as slant regulation means for the center axis of the lower drum Dd is provided between the lower surface of the base plate BP and the upper surface of the drum base DB. The annular cam member CRA is positioned with respect to the drum base DB by contact of positioning pins 245 and 246 provided on the drum base DB in the 90°–270° direction in the drum pair DA with an inner edge of the annular cam member CRA (FIG. 23(a) and FIG. 25).

Cam followers 36 and 37 provided on the intermediate member SA contact with cam profiles 258 to 263 formed on an upper surface of the annular cam member CA. That is, when the annular cam member CA is rotated by driving force given from a drive source which is not shown, a portion including the upper drum Du, the intermediate member SA and the drum motor Md all of which are supported through the rotary shaft 1 is slanted in right or left direction with respect to the center axis of the lower drum Dd about a point Oc in the drawing sheet of FIG. 23(b) by a predetermined angle with the straight line L3 connecting the pivot point members 30 and 31 being a center axis of rotation.

Further, cam profiles 251 to 256 formed on an upper surface of the annular cam member CRA provided between the lower surface of the base plate BP and the upper surface of the drum base DB are to be in contact with cam followers 247 and 248 formed on the base plate BP. The annular cam member CRA has pivot point face portions 238 and 239 formed thereon. The pivot point face portions 238 and 239 are to be in contact with pivot point protrusions 249 and 250 provided on a rear surface of the base plate BP. That is, when the annular cam member CRA is rotated by driving force given from a drive source which is not shown, the lower drum Dd which is fixed to the base plate BP is slanted in right or left direction with respect to the drum base DB about a point Oc' in the drawing sheet of FIG. 23(b) by a predetermined angle with the straight line L5 connecting the protrusions 249 and 250 being a center axis of rotation.

FIG. 25 is a perspective view showing the drum base DB, the annular cam member CRA, the base plate BP and the annular cam member CA in disassembled state with their stacking order being unchanged. The annular cam member CRA is put on the drum base DB with its bottom surface being rotatable with respect to an upper surface of the drum base DB. The cam profiles 251 to 256 which engage with the cam followers 247 and 248 provided on the rear surface of the base plate BP and the pivot point face portions 238 and 239 which are in contact with the pivot point protrusions 249 and 250 formed on the rear surface of the base plate BP are formed. The pivot point face portions 238 and 239 are identical in height from the surface of the drum base DB on which the annular cam member CRA is mounted, when assembled.

The annular cam member CA engages with a guide groove 257 formed in the upper surface of the base plate BP and is rotatably guided thereby. A top end of a connecting portion 164 is provided with a sector shaped gear 265.

When the annular cam member CA is rotated within the guide groove 257 by driving the sector shaped gear 265 with driving force from a drive source which is not shown through a pinion which is not shown, the cam followers 36 and 37 protruding from the intermediate member SA are brought into contact with the cam profiles 258 to 263 formed on the annular cam member CA and thus it becomes possible to slant the rotary shaft 1 rotatably supported by the bearings 5 and 6 mounted on the intermediate member SA. With such slant of the shaft 1, the upper drum Du, the intermediate member SA and the drum motor Md can be slanted together with respect to the center axis of the lower drum Dd by a predetermined angle in the 0°–180° direction of the drum pair DA [right and left direction on the drawing sheet of FIG. 23(b)].

The guide groove 257 in the upper surface of the base plate BP is formed with a recess portion 257a and through-holes 257b and 257c, through which pins 266 to 268 for connecting the annular cam member CRA to the annular cam member CA can pass. These pins 265 to 268 have one ends pressure-inserted into holes 269 to 271 formed in the annular cam member CA, respectively. The other ends of these pins 265 to 268 pass through the recess portion 257a and the through-holes 257b and 257c and are pressure-inserted into through-holes 272 to 274 provided in the annular cam member CRA, respectively. Holes 275 and 276 formed in the base plate BP in FIG. 25 and holes 277 and 278 formed in the base plate BP in FIG. 26 define spaces in which the springs 38, 39, 40 and 41 shown in FIGS. 23(a) and 23(b) are housed.

Sector members 279 to 281 shown in FIG. 26 have outer peripheral surfaces 279a, 280a and 281a which restrict a position of an inner peripheral surface 282 of the annular cam member CRA. As mentioned previously, the annular cam member CA provided above the base plate BP for regulating slant of the rotary shaft 1 and the annular cam member CRA provided below the base plate BP for regulating slant of the center axis of the lower drum Dd are coupled together by the pins 266 to 268. Therefore, when the annular cam member CA is rotated within the guide groove 257 by driving the sector shaped gear 285 with driving force from a drive source which is not shown, the annular cam member CRA is also rotated while being guided by the outer peripheral surfaces of the sector members 279 to 281 on the upper surface of the drum base DB. Since the annular cam members CA and CRA can be rotated with a single driving source, it is possible to simplify a driving mechanism. It is of course possible to drive them by separate driving sources.

Operations of the annular cam members CA and CRA when the magnetic recording/reproducing apparatus according to this embodiment is operating in the respective reproduction modes will be described.

In the normal reproduction mode, the cam followers 36 and 37 provided on the intermediate member SA are in contact with the cam profiles 262 and 259 of the annular cam member CA, respectively. On the other hand, the cam followers 247 and 248 provided on the base plate BP are in contact with the cam profiles 255 and 252 of the annular cam member CRA, respectively.

Figure 52:
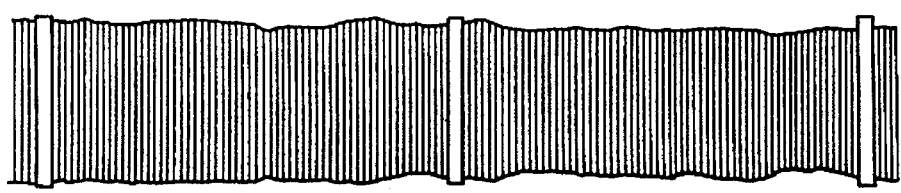
FIGS. 52(a) and 52(b) shows waveform of FM reproduced signal.
Figure 52:
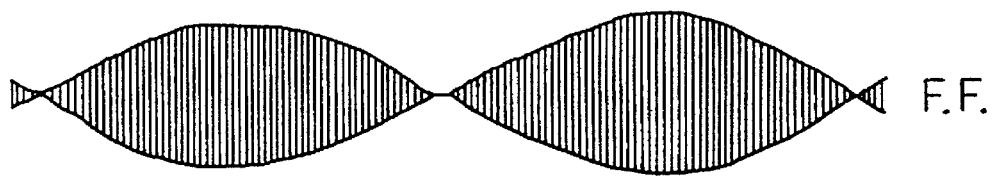

Since the cam profiles 259 and 262 of the annular cam member CA are identical in height and the height of the cam profiles 255 and 252 of the annular cam member CRA is the same as that of the pivot point face portions 238 and 239, the center axes of the upper drum Du and the lower drum Dd are the same in the normal reproduction mode. Therefore, the magnetic tape T is transported at a predetermined speed stably with the reference edge Te thereof being correctly guided by the guide portion G formed in the outer peripheral surface of the lower drum Dd, resulting in a reproduced signal having an excellent envelope such as shown in FIG. 52(*a*).

In the FF reproduction mode, the cam followers 36 and 37 provided on the intermediate member SA are in contact with the cam profiles 261 and 258 of the annular cam member CA, respectively. Since the cam profile 261 is higher than the cam profile 258, the center axes (rotary shaft 1) of the upper drum Du and the intermediate member SA is slanted rightwardly with respect to the lower drum Dd as shown in FIG. 27(*a*) to perform the track correction.

In this case, the cam followers 247 and 248 provided on the base plate BP fixed to the lower drum Dd are in contact with the cam profiles 254 and 251 of the annular cam member CRA coupled to the annular cam member CA by the pins 266 to 268, respectively.

Since the cam profile 254 is higher than the cam profile 251 and the pivot point protrusions 249 and 250 provided on the base plate BP are in contact with the respective pivot point face portions 238 and 239 of the annular cam member CRA, the lower drum Dd fixed to the base plate BP is slanted about a straight line L5 connecting the pivot point protrusions 249 and 250 as a rotation center axis by an angle corresponding to a difference in height between the cam profiles 256 and 253. Therefore, the center axis of the lower drum Dd is slanted toward the slanting direction of the center axes of the upper drum Du and the intermediate member SA by a predetermined small angle to perform the lead correction and the magnetic tape T is transported at a predetermined speed stably with the reference edge Te thereof being correctly guided by the guide portion G formed in the outer peripheral surface of the lower drum Dd.

An eleventh embodiment of the present invention will be described with reference to FIGS. 28 to 32. This embodiment differs from the tenth embodiment in the method of mounting the intermediate member SA on the lower drum Dd and in the shapes of annular cam members for tilting the intermediate member SA and the lower drum Dd. Since other portions are similar to those in the tenth embodiment, only the difference will be described in detail.

Figure 28:
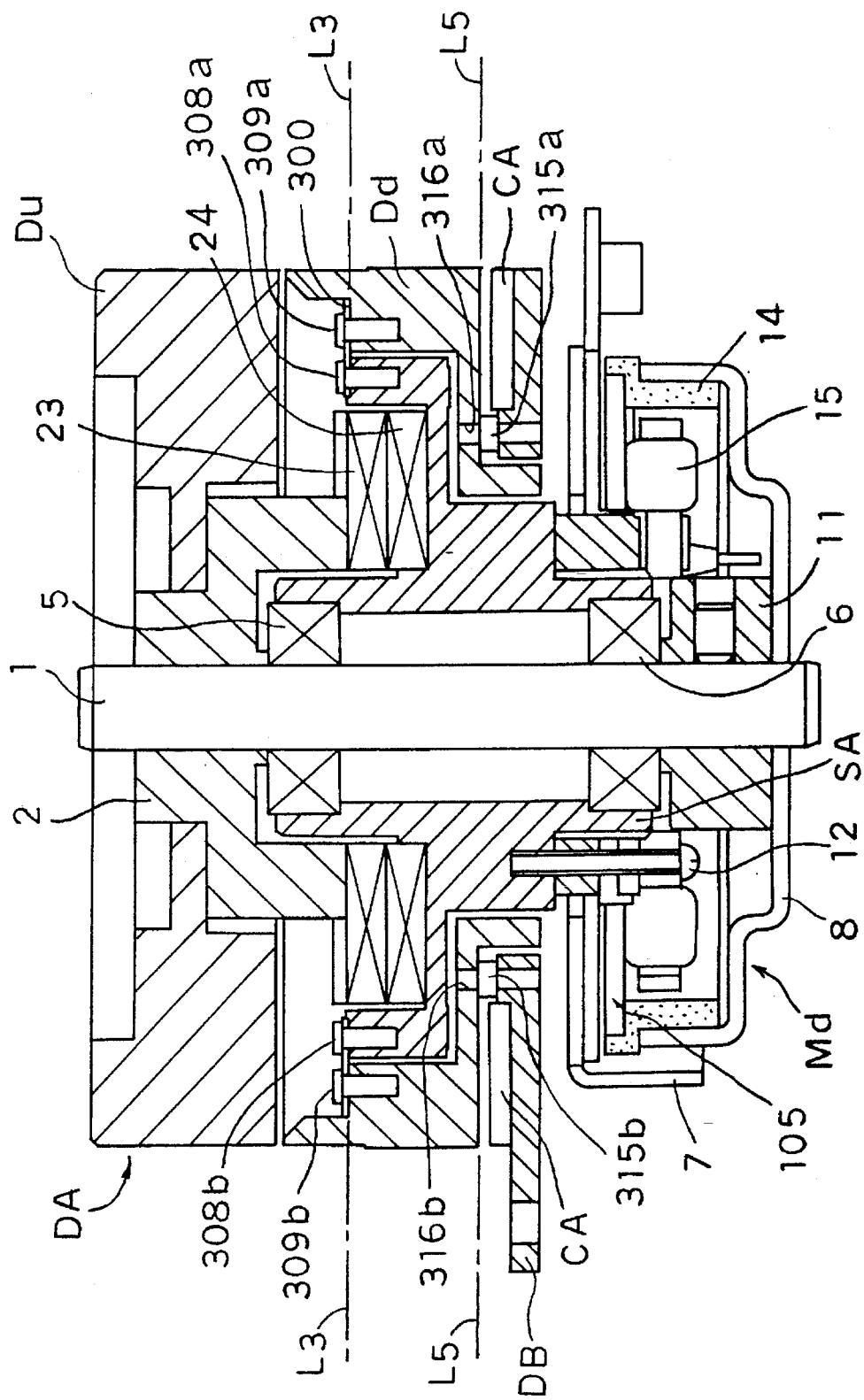
FIGS. 28(a) and 28(b) is a cross section of a portion of a drum pair which is a main portion of a magnetic recording/reproducing apparatus according to an eleventh embodiment of the present invention.
Figure 30:
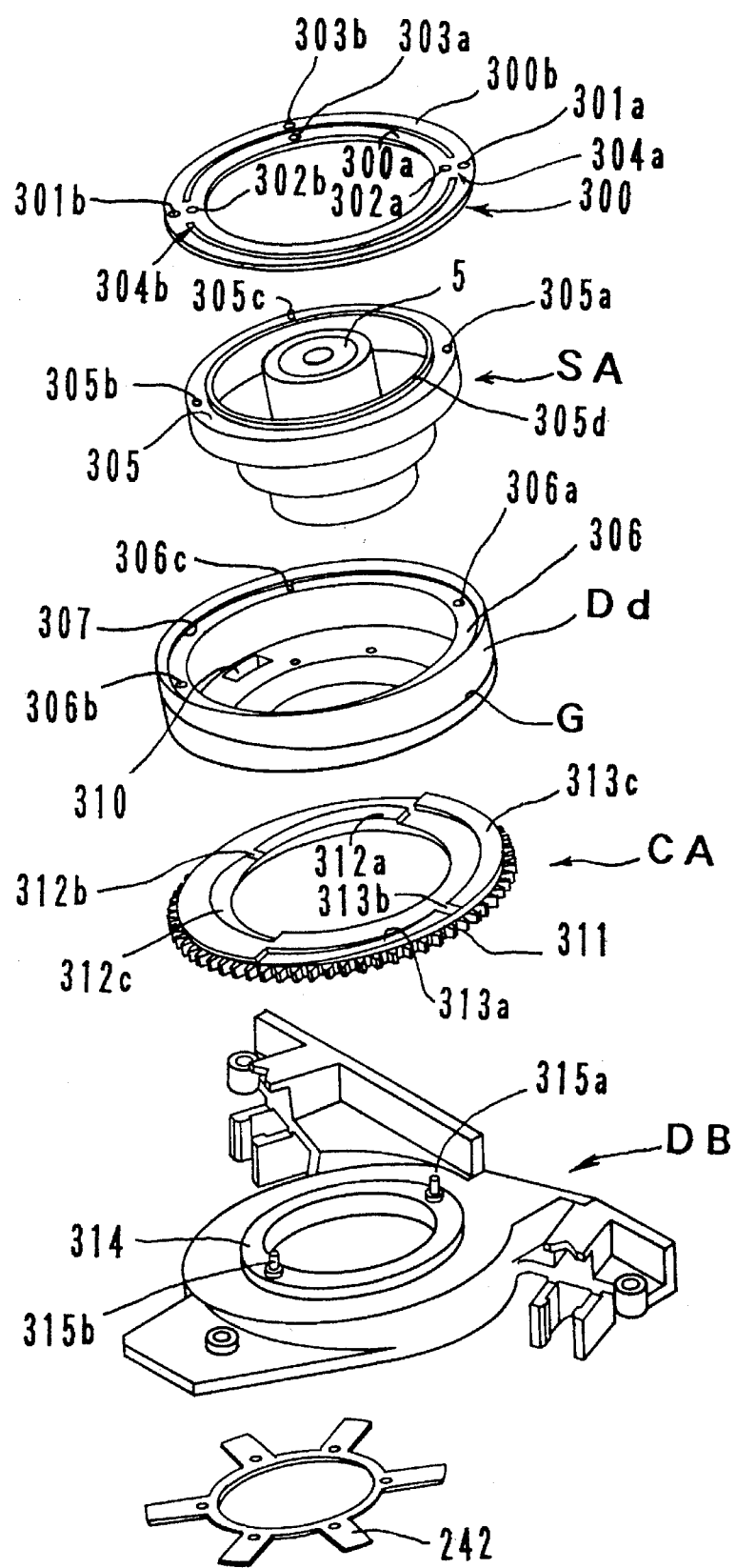
FIG. 30 is a disassembled perspective view of the drum pair shown in FIGS. 28(a) and (b) or 29.

FIG. 28(*a*) is a cross section of a portion including a drum pair taken along the 90°–270° line in FIG. 2. Similarly, FIG. 28(*b*) is a cross section thereof taken along the 0°–180° line in FIG. 2. FIG. 24 is a cross section of the same taken along a different line from those in the FIGS. 29(*a*) and 29(*b*). Further, FIG. 30 is an enlarged perspective view showing components in disassembled state. FIG. 31 is a cross section taken along the 0°–180° line in FIG. 2 for operational explanation.

It is the same as in the tenth embodiment that the upper drum Du is fixedly secured to an upper drum fixing member 2 which is fixedly secured to the rotary shaft 1 of the drum motor Md and the rotary shaft 1 support the intermediate member SA rotatably through bearings 5 and 6, etc.

In this embodiment, the intermediate member SA is mounted on the lower drum Dd by a leaf spring 300 in the shape of a ring. The leaf spring 300 includes a circular inner ring portion 300*a*, an outer ring portion 300*b* coaxial with the inner ring portion 300*a* and connecting portions 304*a* and 304*b* provided at two points on a diameter line to connect the both, as shown in FIG. 30. The connecting portions 304*a* and 304*b* are formed with holes 301*a* and 301*b* and holes 302*a* and 302*b*, respectively, and the inner and outer ring portions 300*a* and 300*b* are formed with positioning holes 303*a* and 303*b*, respectively.

On one hand, screw holes 305*a* and 305*b* are provided in an upper surface 305 of the intermediate member SA at positions corresponding to the holes 302*a* and 302*b* of the leaf spring 300, respectively, and a positioning pin 305*c* is implanted at a position of the upper surface 305 corresponding to the positioning hole 303*a*. Further, a rib 305*d* which fits in an inner periphery of the inner ring portion 300*a* of the leaf spring 300 is formed on the upper surface 305 of the intermediate member SA.

On the other hand, screw holes 306*a* and 306*b* are provided in an end portion 306 of the lower drum Dd at positions corresponding to the holes 301*a* and 301*b* of the leaf spring 300, respectively, and a positioning pin 306*c* is implanted at a position of the end portion 306 corresponding to the positioning hole 303*b*. Further, a wall face 307 which fits on an outer periphery of the outer ring portion 300*b* of the leaf spring 300 is formed on the end portion 306 of the lower drum Dd.

Therefore, the intermediate member SA is mounted on the lower drum Dd as follow: First, the inner ring portion 300*a* is fitted in the rib 305*b* of the leaf spring 300 with the positioning hole 303*a* of the leaf spring 300 being aligned with the positioning pin 305*c* of the intermediate member SA and then the leaf spring 300 is fixedly secured to the intermediate member SA by means of screws 308*a* and 308*b*. Then, the outer ring portion 300*b* is fitted in the wall face 307 of the lower drum Dd while the positioning hole 303*b* of the leaf spring 300 being aligned with the positioning pin 306*c* of the lower drum Dd and the leaf spring 300 is fixedly secured to the lower drum by screws 309*a* and 309*b*. In this case, the connecting portions 304*a* and 304*b* are provided on a straight line L3 as shown in FIG. 28(*a*), providing pivot points of the intermediate member SA for the lower drum Dd.

As mentioned, in this embodiment, the intermediate member SA is mounted on the lower drum Dd by using the leaf spring 300 and, since there is no direct contact fitting relation (for example, the first and tenth embodiments) between the intermediate member SA and the lower drum Dd, there is no variation of load due to friction during rotation of the intermediate member SA and a smooth driving becomes possible.

In the first and tenth embodiments, the pivot points of the intermediate member SA for the lower drum Dd are formed by inserting the small diameter portions 30a and 31a of the pivot point members 30 and 31 into the through-holes 29b of the lower drum Dd. With such construction, however, a clearance is necessary between the small diameter portions 30a and 31a and the respective through-holes 29b and therefore some play must be allowed between the lower drum Dd and the intermediate member SA. Such play is one of sources of jitter noise. In the eleventh embodiment, there is inherently no such play.

The annular cam member for tilting the intermediate member SA and the lower drum Dd about the straight line L3 (point Oc) and the straight line L5 (point Oc') will be described.

The annular cam member CA has a gear 311 formed on an outer peripheral surface thereof and sloped cam profiles 312a, 312c, 313a and 313c and flat cam profiles 312b and 313b are formed on a surface thereof. The annular cam member CA is fitted on an annular protrusion 314 formed on a surface of the drum base DB and driven by a motor which is not shown.

On the other hand, collared pins 315a and 315b are implanted in the surface of the protrusion 314 at positions on the straight line L5 (FIG. 28(a)] which are fitted in holes 316a and 316b formed in the lower drum Dd, respectively, to form the pivot points for the lower drum Dd. A compression spring 319 is provided between the lower drum Dd and the mounting plate 7 of the drum motor Md to produce, in the example shown in FIG. 28(b), a clockwise moment for the lower drum Dd and a counterclockwise moment for the intermediate member SA. On the other hand, a leaf spring 242 is provided in a bottom surface of the lower drum Dd for resiliently support the lower drum Dd with respect to the drum base DB.

Further, the cam profiles 313a, 313b and 313c of the annular cam member CA are in contact with a cam follower 317 provided on the bottom surface of the lower drum Dd and the cam profiles 312a, 312b and 312c thereof are in contact with a cam follower 318 provided on the bottom surface of the intermediate member SA.

Figure 28B:
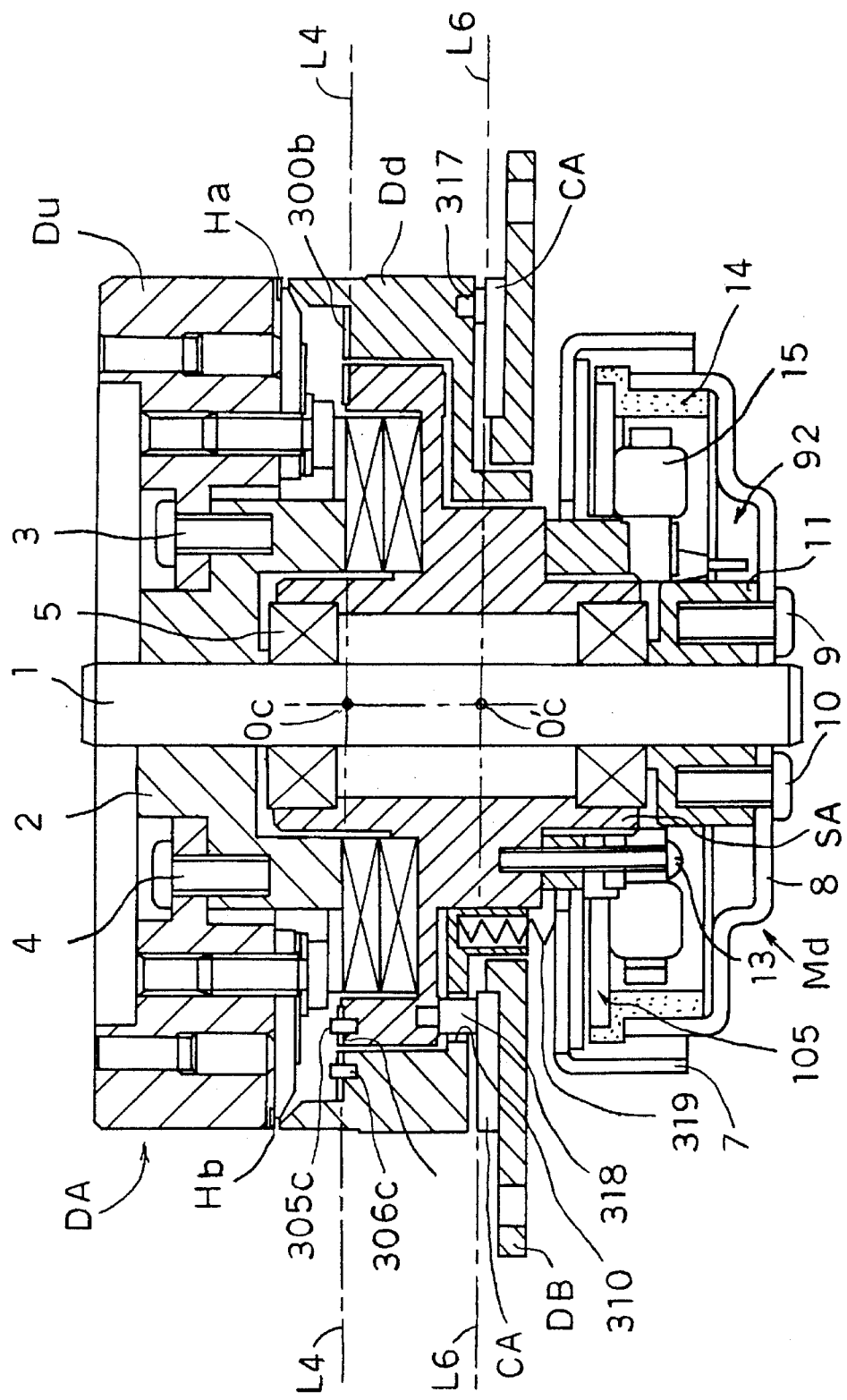
Figure 29:
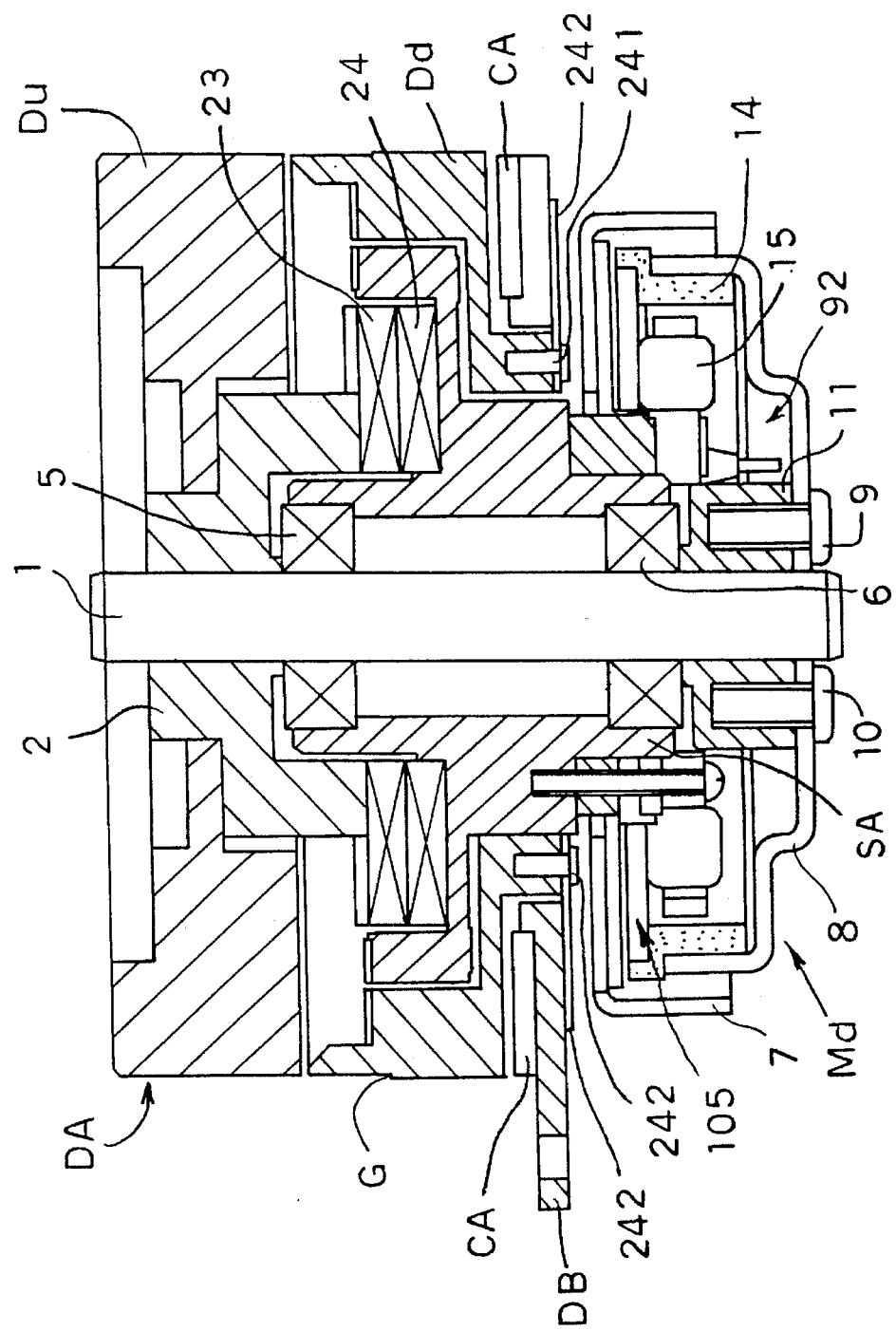
FIG. 29 is another cross section of a portion of a drum pair which is a main portion of a magnetic recording/reproducing apparatus according to the eleventh embodiment of the present invention.

The cam follower 318 of the intermediate member SA and the cam follower 317 of the lower drum Dd are arranged at positions separated by 180° in a rotational direction of the annular cam member CA as shown in FIG. 28(b), so that they are in contact with the cam profiles 312a, 312b and 312c and the cam profiles 313a, 313b and 313c, respectively.

That is, when this magnetic recording/reproducing apparatus is in the normal reproduction mode, the cam follower 318 of the intermediate member SA contacts with the flat cam profile 312b and the cam follower 317 contacts with the flat cam profile 313b. Since the cam profile 312b is the same in height as the cam profile 313b, the intermediate member SA and the lower drum Dd are supported in parallel to the drum base DB.

When the apparatus is in the FF reproduction mode, the cam follower 318 contacts with the sloped cam profile 312a and the cam follower 317 contacts with the sloped cam profile 313a.

Figure 31A:
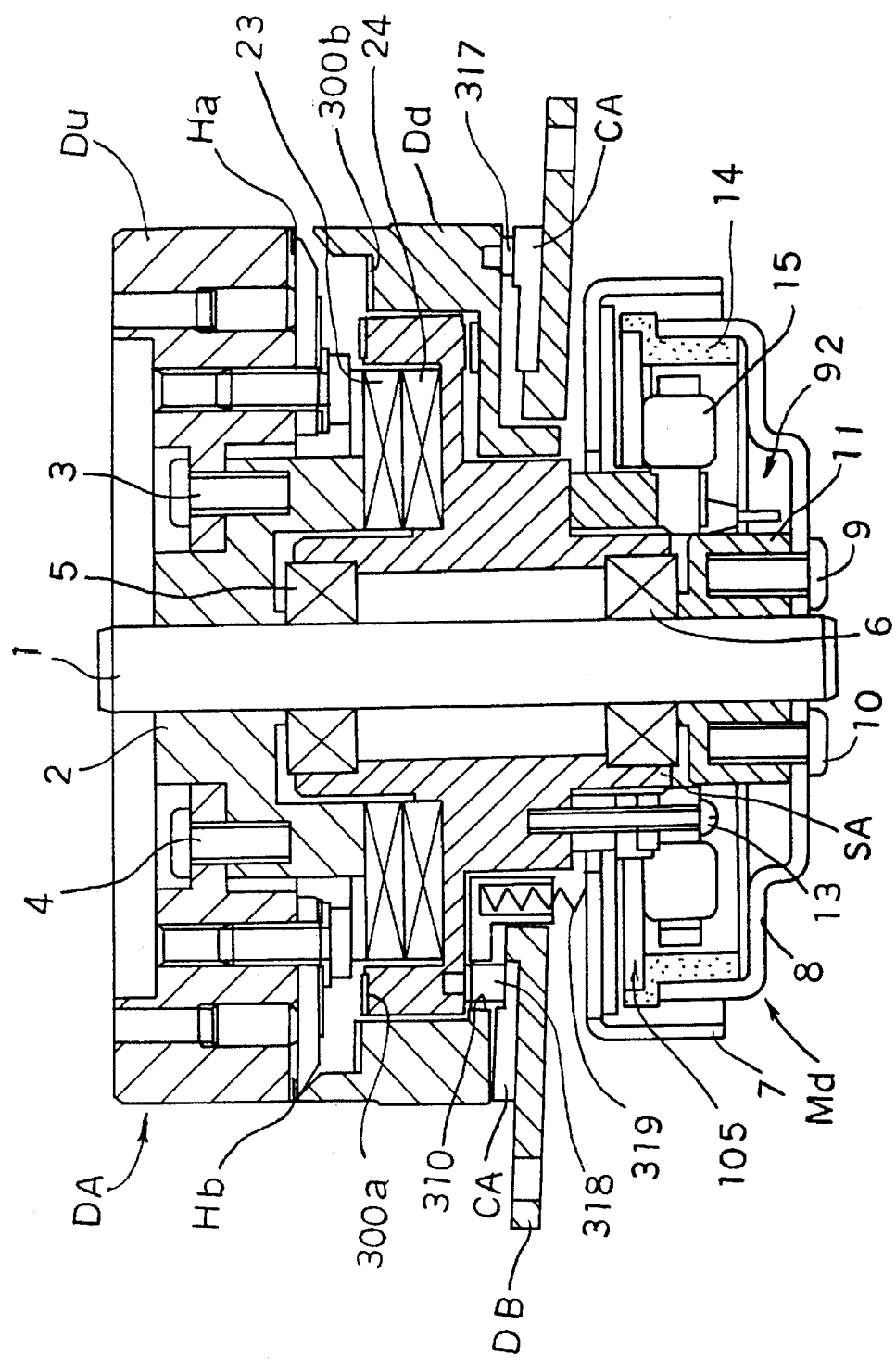
FIGS. 31(a) and 31(b) is a cross sectional side view of the eleventh embodiment shown in FIGS. 28(a) and (b) or 29, for explanation of an operation thereof.

Since the cam follower 318 of the intermediate member SA is pressed by the cam profile 312a which provides a surface higher than the cam profile 312b, it rotates in a clockwise direction as shown in FIG. 31(a) by the compression spring 319 and the leaf spring 242, achieving the track correction. On the other hand, since the cam follower 317 of the lower drum Dd contacts with the cam profile 313a constituting a surface lower than the cam profile 313b, it rotates counter-clockwise direction by the compression spring 319 and the leaf spring 242 as shown in FIG. 31(a), achieving the lead correction.

Figure 31B:
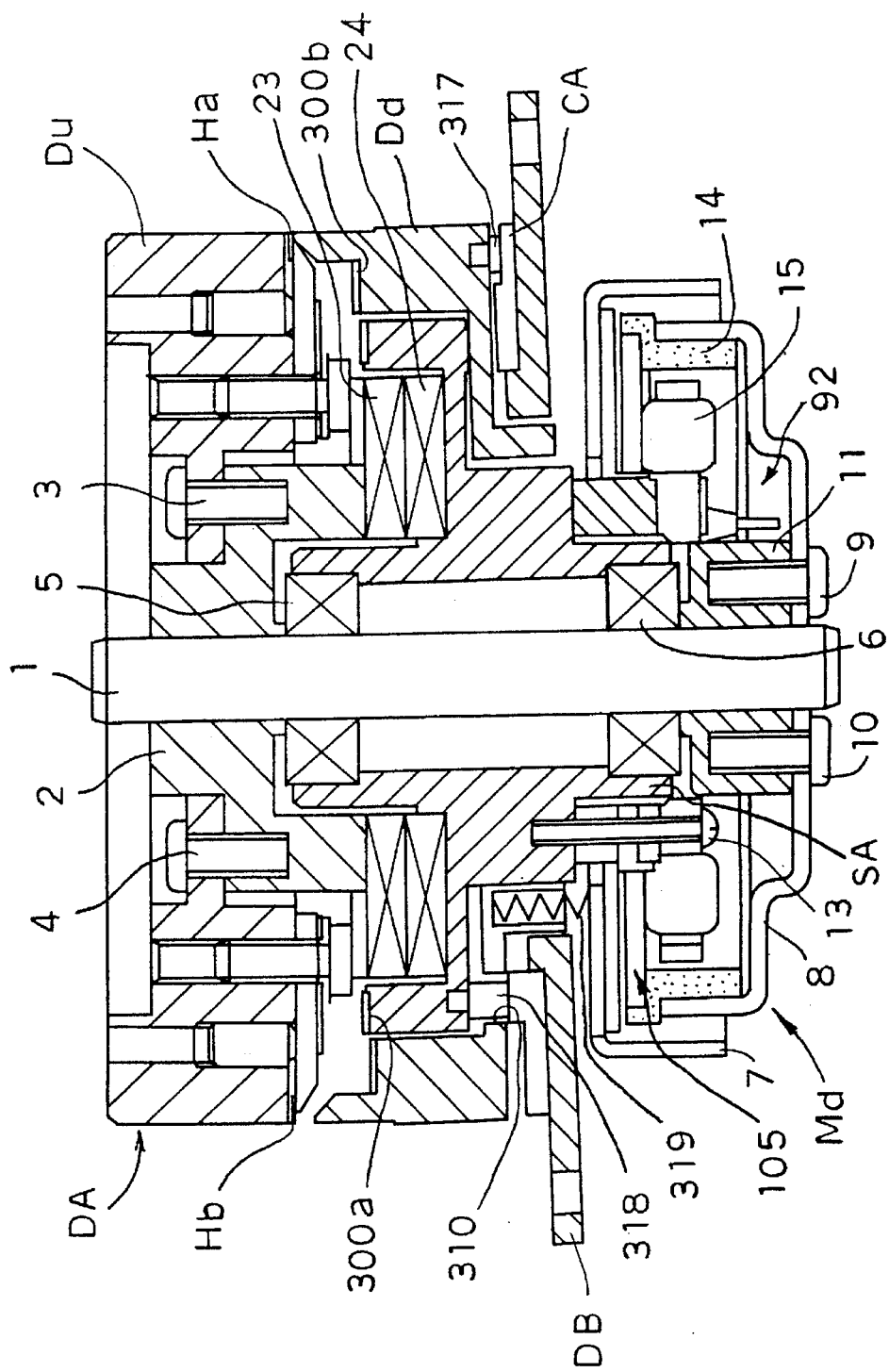

Further, when the magnetic recording.reproducing apparatus according to this embodiment is in the FB reproduction mode, the cam follower 318 contacts with the sloped cam profile 312c and the cam follower 317 contacts with the sloped cam profile 313c. Since the cam follower 318 of the intermediate member SA is pressed by the cam profile 312c which provides a surface lower than the cam profile 312b, it rotates in a counterclockwise direction as shown in FIG. 31(b) by the compression spring 319 and the leaf spring 242, achieving the track correction. On the other hand, since the cam follower 317 of the lower drum Dd contacts with the cam profile 313c constituting a surface higher than the cam profile 313b, it rotates counter-clockwise direction by the compression spring 319 and the leaf spring 242 as shown in FIG. 31(b), achieving the lead correction.

Figure 32:
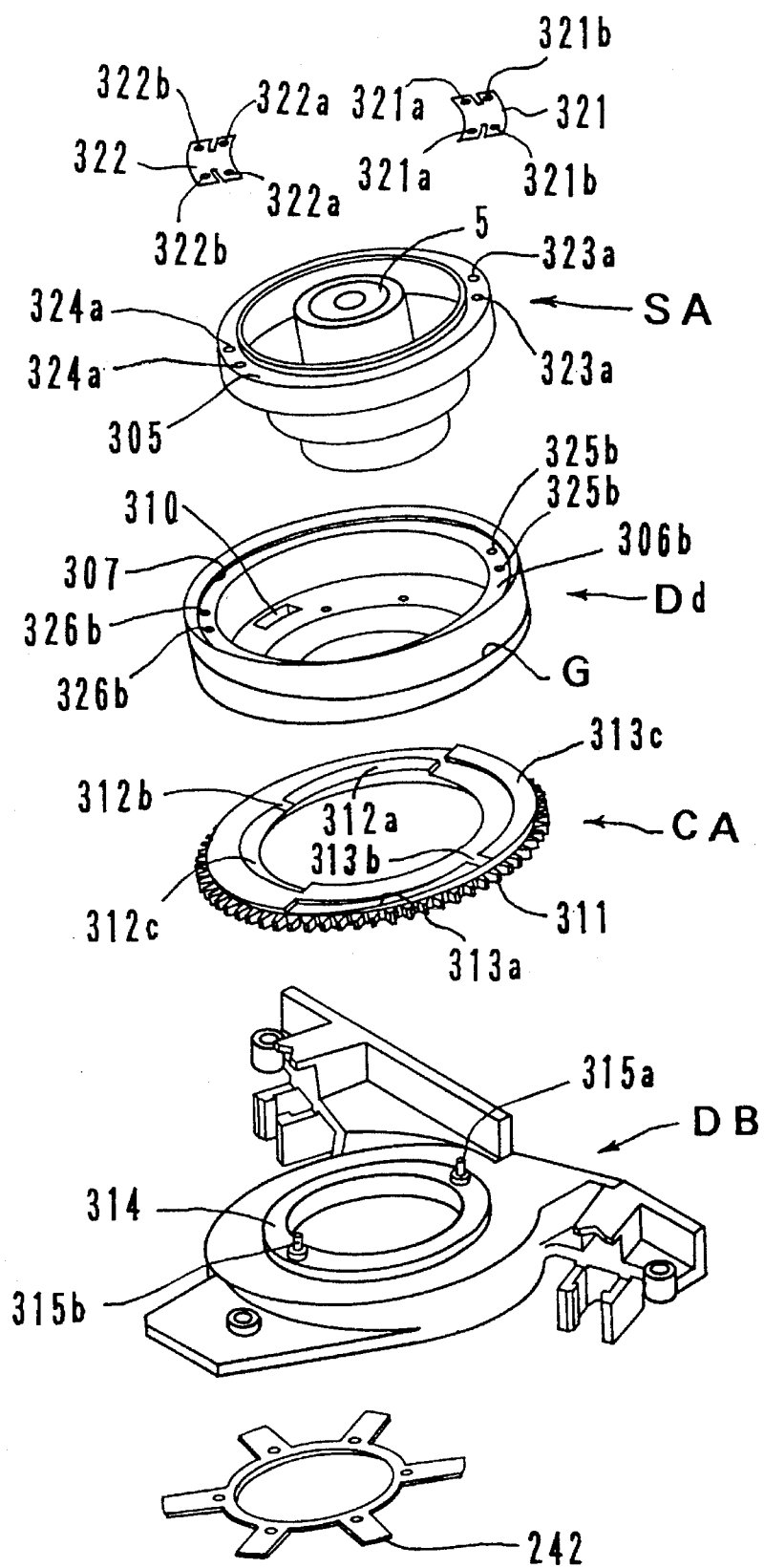
FIG. 32 is a disassembled perspective view of another drum pair shown in FIGS. 28(a) and (b) or 29.

Although, in this embodiment, the intermediate member SA is mounted on the lower drum Dd by using the ring shaped leaf spring 300, the leaf spring is not always ring shaped. For example, as shown in FIG. 32, it is possible to use a pair of leaf springs 321 and 322 each having a shape like the ring shaped leaf spring 300 a portion of which is cut away. That is, holes 321a and 322a of the leaf springs 321 and 322 are fixed to screw holes 323a and 324a of the intermediate member SA by screws, respectively, and holes 321b and the 322b of the leaf springs 321 and 322 are fixed to screw holes 323a and 326b of the lower drum Dd by screws, respectively, while the intermediate member SA and the lower drum Dd are supported coaxially by using a jig, etc.

A twelfth embodiment of the present invention will be described with reference to FIGS. 33 to 36. This embodiment is a combination of the magnetic recording/reproducing apparatuses according to the eighth or ninth embodiment in which the rotor of the drum motor Md is directly mounted on the upper drum Du to drive the latter while the shaft 1 itself does not rotate and the mounting method employed in the eleventh embodiment.

Figure 33A:
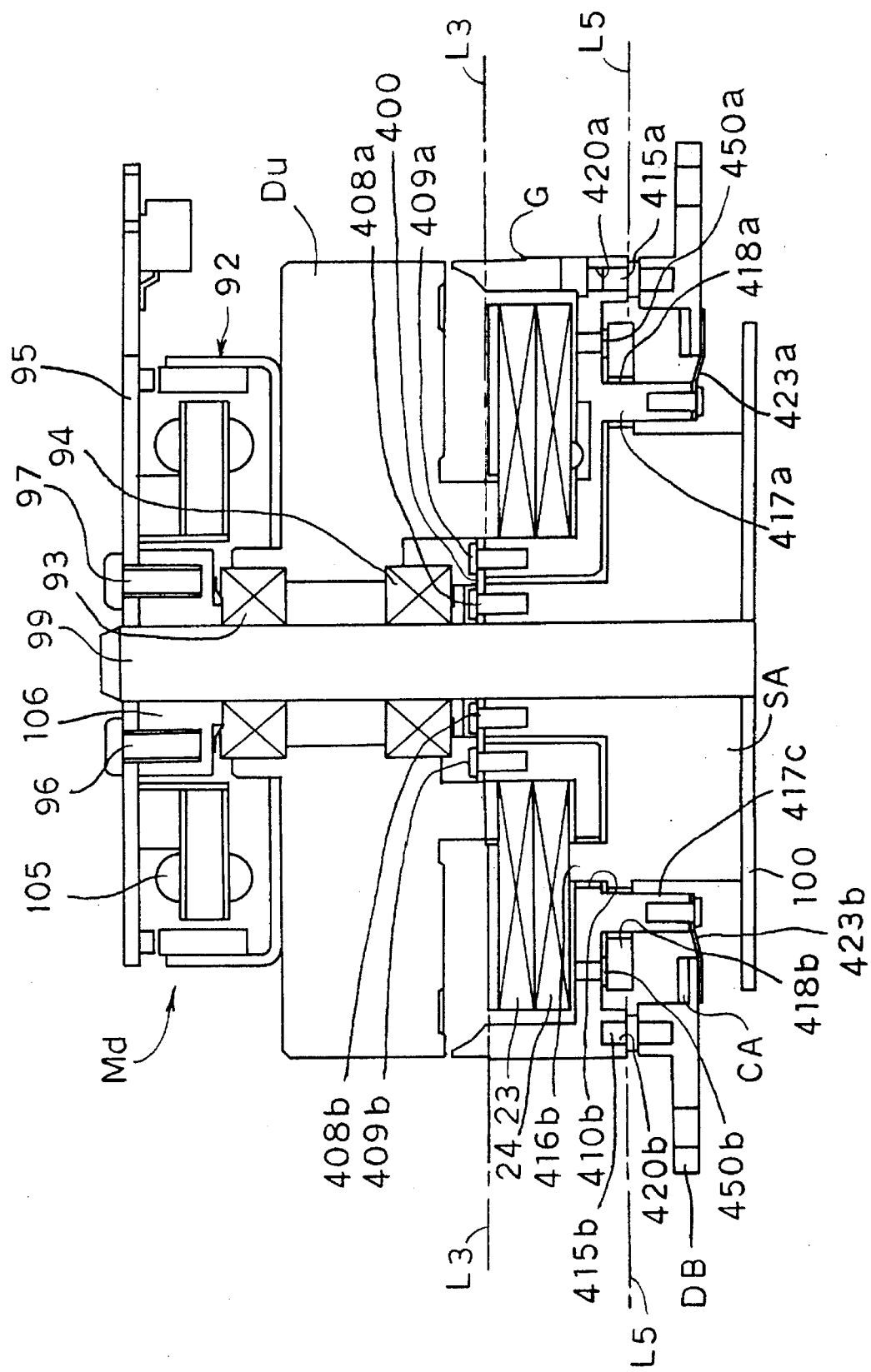
FIGS. 33(a) and 33(b) is a cross section of a portion of a drum pair which is a main portion of a magnetic recording/reproducing apparatus according to a twelfth embodiment of the present invention.
Figure 33:
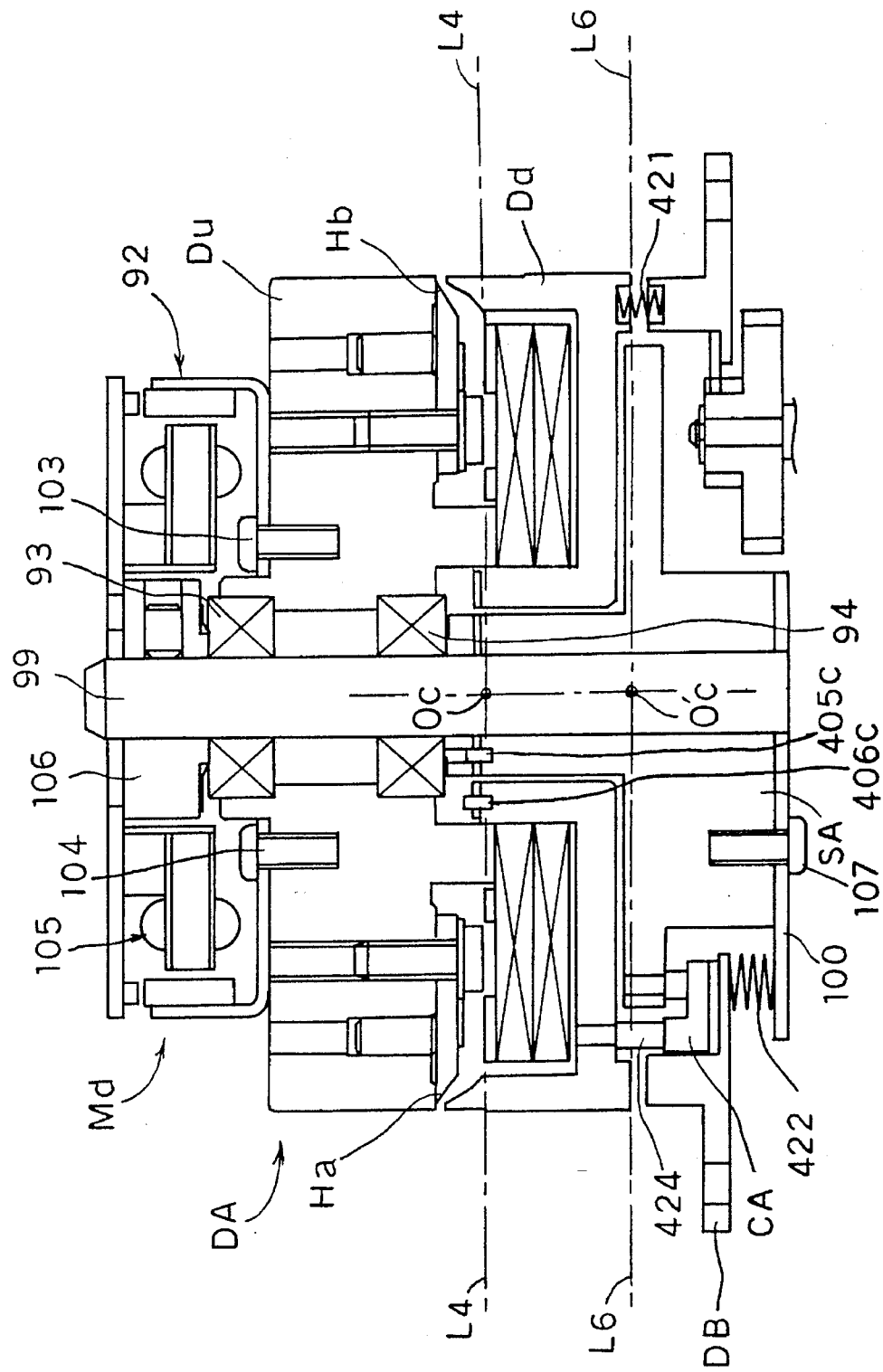
Figure 34:
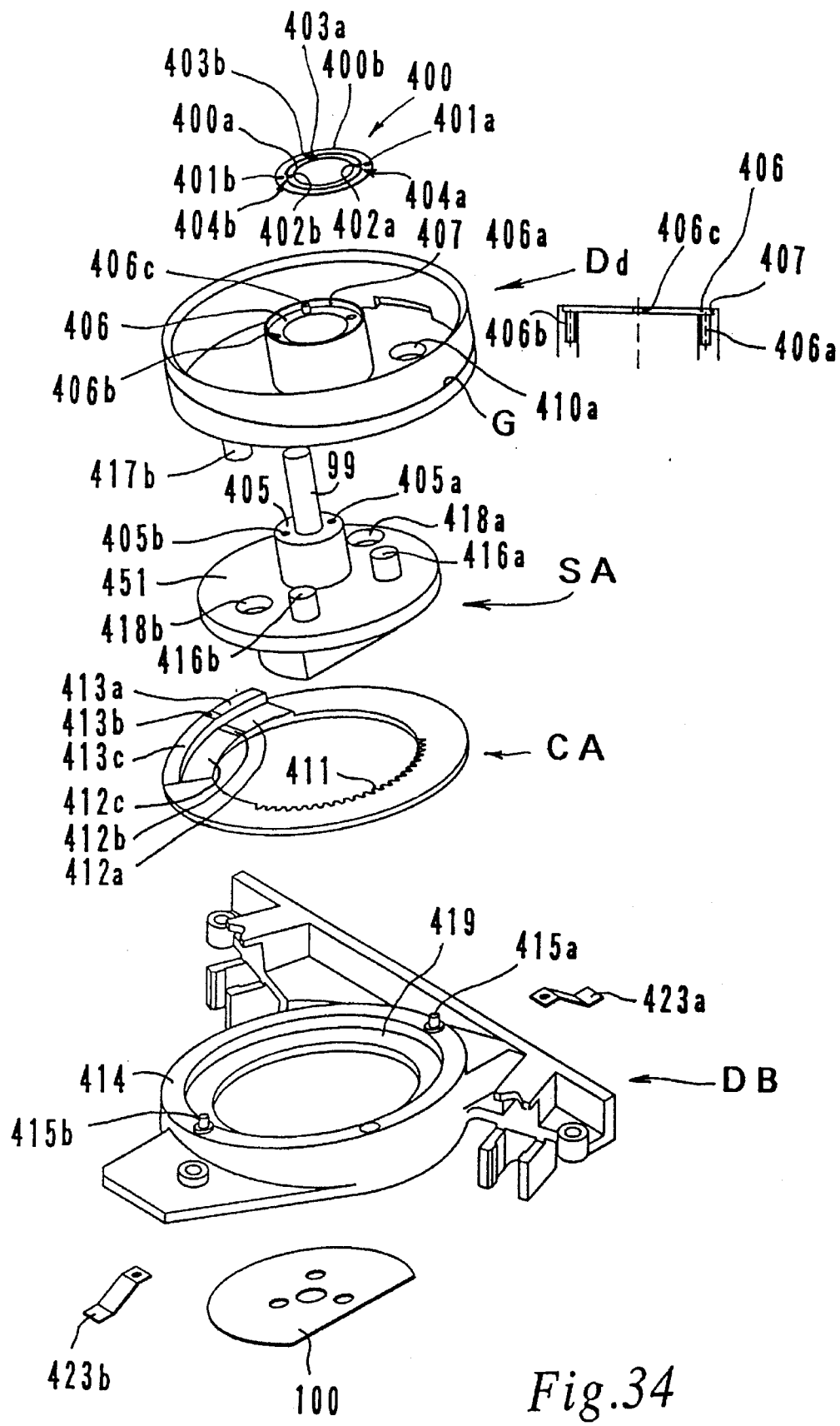
FIG. 34 is a disassembled perspective view of another drum pair shown in FIGS. 33(a) and 33(b)
Figure 35:
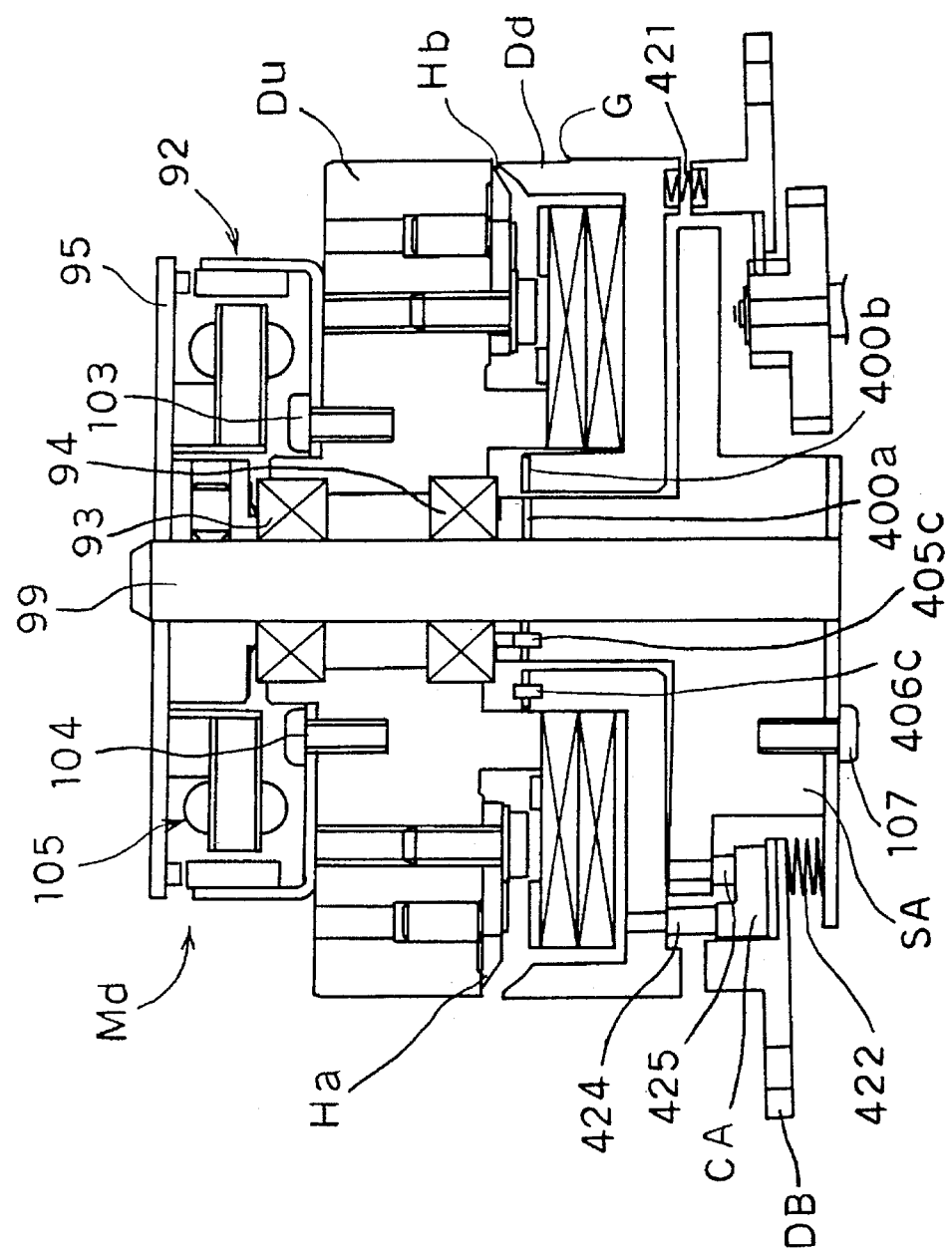
FIGS. 35(a) and 35(b) is a cross sectional side view of the eleventh embodiment shown in FIGS. 33(a) and (b), for explanation of an operation thereof.
Figure 35:
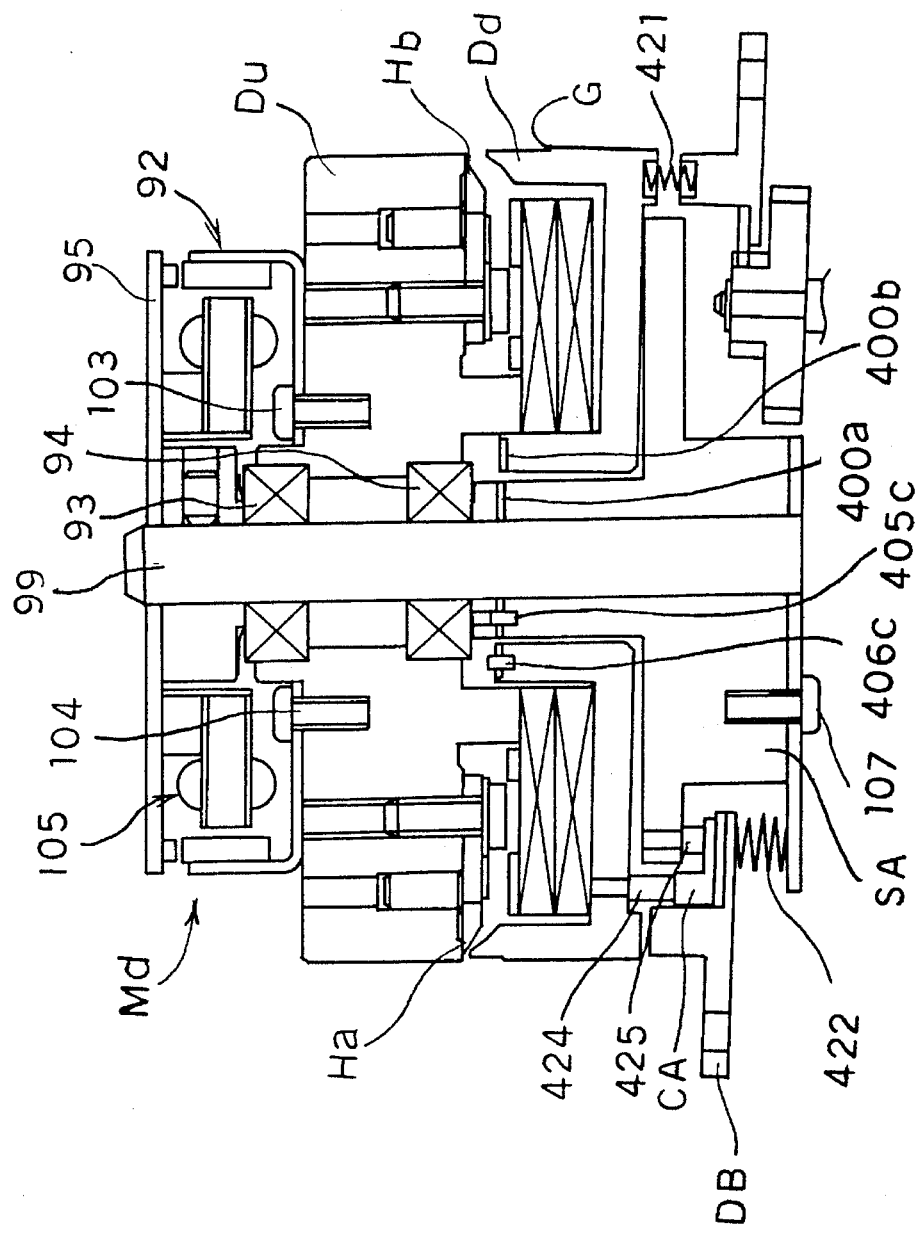

FIG. 33(a) is a cross section of a portion including a drum pair taken along the 90°–270° line in FIG. 2. Similarly, FIG. 33(b) is a cross section thereof taken along the 0°–180° line in FIG. 2. FIG. 24 is a cross section of the same taken along a different line from those in the FIGS. 33(a) and 33(b). Further, FIG. 34 is a perspective view showing components in disassembled state. FIG. 35 is a cross section taken along the 0°–180° line in FIG. 2 for operational explanation.

In this embodiment, the intermediate member SA is mounted on the lower drum Dd in the vicinity of a fixed shaft 99 by a leaf spring 400 in the shape of a ring. The leaf spring 400 is smaller than the leaf spring 300 described with reference to FIG. 30 and has substantially analogous shape to the spring 300. Therefore, various corresponding portions thereof are indicated by corresponding numerals in 400 order, respectively, and detailed description thereof is omitted.

Screw holes 405a and 405b are provided in an upper surface 405 of the intermediate member SA into which the fixed shaft 99 is pressure-inserted, at positions corresponding to holes 402a and 402b of the leaf spring 400, respectively, and a positioning pin 405c is implanted at a position of the upper surface 405 corresponding to the positioning hole 403a.

On the other hand, screw holes 406a and 406b are provided in an end portion 406 of the lower drum Dd at positions corresponding to the holes 401a and 401b of the leaf spring 400, respectively, and a positioning pin 406c is implanted at a position of the end portion 406 corresponding to the positioning hole 403b. Further, a wall face 407 which fits on an outer periphery of the outer ring portion 400b of the leaf spring 400 is formed on the end portion 406 of the lower drum Dd.

Therefore, the intermediate member SA is mounted on the lower drum Dd as follow: First, the inner ring portion 400b is fitted in the wall face 407 and the leaf spring 400 is fixed to the lower drum Dd by screws 409a and 409b with the positioning hole 403a of the leaf spring 400 being aligned with the positioning pin 406c of the lower drum Dd. Then, the leaf spring 400 and the intermediate member SA having the fixed shaft 99 pressure-inserted thereinto and fitted in the inner ring portion 400a thereof are supported below the lower drum Dd, and the leaf spring 400 is fixedly secured to the intermediate member SA by means of screws 408a and 408b, while the positioning hole 403b of the leaf spring 400 being aligned with the positioning pin 406c of the lower drum Dd. In this case, rotary transformer mounting portions 416a and 416b provided on the intermediate member SA protrude through through-holes 410a and 410b into the lower drum Dd, on which the rotary transformer 24 is mounted.

The connecting portions 404a and 404b connecting the inner ring portion 400a to the outer ring portion 400b are provided on a straight line L3 as shown in FIG. 33(a), providing pivot points of the intermediate member SA for the lower drum Dd, as in the eleventh embodiment described previously.

As mentioned, in this embodiment, the intermediate member SA is mounted on the lower drum Dd by using the leaf spring 400 and, since there is no direct contact fitting relation (for example, the first and tenth embodiments) between the intermediate member SA and the lower drum Dd, there is no variation of load due to friction during rotation of the intermediate member SA and a smooth driving becomes possible.

The annular cam member for tilting the intermediate member SA and the lower drum Dd about the straight line L3 (point Oc) and the straight line L5 (point Oc') will be described.

The annular cam member CA has a sear 311 formed on an inner peripheral surface thereof and slope cam profiles 412a, 412c, 413a and 413c and flat cam profiles 412b and 413b are formed on a surface thereof. The annular cam member CA is fitted in an annular recess 419 formed in a surface of the drum base DB and driven by a motor which is not shown. On the other hand, collared pins 415a and 415b are implanted in the surface of a protrusion 414 provided on the drum base DB at positions on the straight line L5 [FIG. 33(a)] which are fitted in holes 420a and 420b formed in the lower drum Dd, respectively, to form the pivot points for the lower drum Dd. A compression spring 421 is provided between the lower drum Dd and the drum base DB to produce, in the example shown in FIG. 33(b), a counterclockwise moment for the lower drum Dd. Further, a compression spring 422 is provided between a restricting plate 100 provided on a bottom surface of the intermediate member SA and the drum base DB to produce, in the example shown in FIG. 33(b), a counterclockwise moment to the intermediate member SA. On the other hand, leaf springs 423a, 423b are provided on posts 417a, 417b protruding downwardly from the bottom surface of the lower drum Dd through through-holes 418a, 418b formed in the intermediate member SA, respectively, to resiliently support the lower drum Dd with respect to the drum base DB.

Further, the cam profiles 413a, 413b and 413c of the annular cam member CA are in contact with a cam follower 424 provided on the bottom surface of the lower drum Dd and the cam profiles 412a, 412b and 412c thereof are in contact with a cam follower 425 provided on the bottom surface of the intermediate member SA.

The cam follower 425 of the intermediate member SA and the cam follower 424 of the lower drum Dd are arranged at positions separated by 180° in a rotational direction of the annular cam member CA as shown in FIG. 33(b), so that they are in contact with the cam profiles 412a, 412b and 412c and the cam profiles 413a, 413b and 413c, respectively.

That is, when this magnetic recording/reproducing apparatus is in the normal reproduction mode, the cam follower 425 of the intermediate member SA contacts with the flat cam profile 412b and the cam follower 424 contacts with the flat cam profile 413b. Therefore, the intermediate member SA and the lower drum Dd are supported in parallel to the drum base DB.

When the apparatus is in the FF reproduction mode, the cam follower 425 contacts with the slope cam profile 412a and the cam follower 424 contacts with the slope cam profile 413a.

Since the cam follower 425 of the intermediate member SA is pressed by the cam profile 412a which provides a surface higher than the cam profile 412b, it rotates in a clockwise direction as shown in FIG. 35(a) by the compression spring 422 and the leaf springs 423a, 423b, achieving the track correction. On the other hand, since the cam follower 424 of the lower drum Dd contacts with the cam profile 413a constituting a surface lower than the cam profile 413b, it rotates in a clockwise direction by the compression spring 421 and the leaf springs 423a, 423b as shown in FIG. 35(a), achieving the lead correction.

Further, when the magnetic recording.reproducing apparatus according to this embodiment is in the FB reproduction mode, the cam follower 425 contacts with the slope cam profile 412c and the cam follower 424 contacts with the slope cam profile 413c.

Since the cam follower 425 of the intermediate member SA is pressed by the cam profile 412c which provides a surface lower than the cam profile 412b, it rotates in a counterclockwise direction as shown in FIG. 35(b) by the compression spring 422 and the leaf springs 423a, 423b, achieving the track correction. On the other hand, since the cam follower 424 of the lower drum Dd contacts with the cam profile 413c constituting a surface lower than the cam profile 413b, it rotates in a counterclockwise direction by the compression spring 421 and the leaf springs 423a, 423b as shown in FIG. 35(b), achieving the lead correction.

Figure 36:
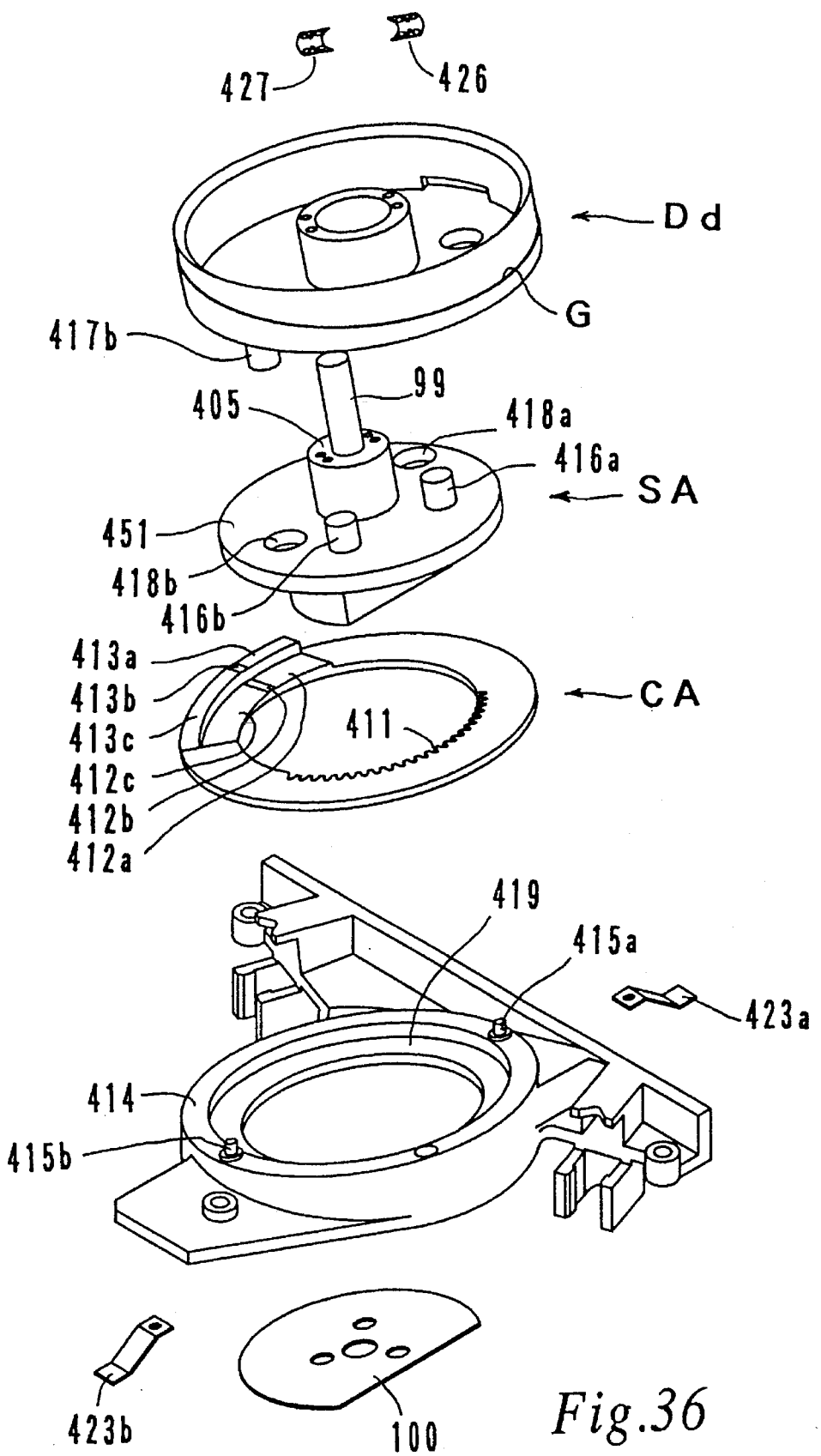
FIG. 36 is a disassembled perspective view of another drum pair shown in FIGS. 33(a) and (b)

Although, in this embodiment, the intermediate member SA is mounted on the lower drum Dd by using the ring shaped leaf spring 400, the leaf spring is not always ring shaped. For example, as shown in FIG. 36, it is possible to use a pair of leaf springs 426 and 427 as in the eleventh embodiment. Therefore, detailed description thereof is omitted.

Figure 37:
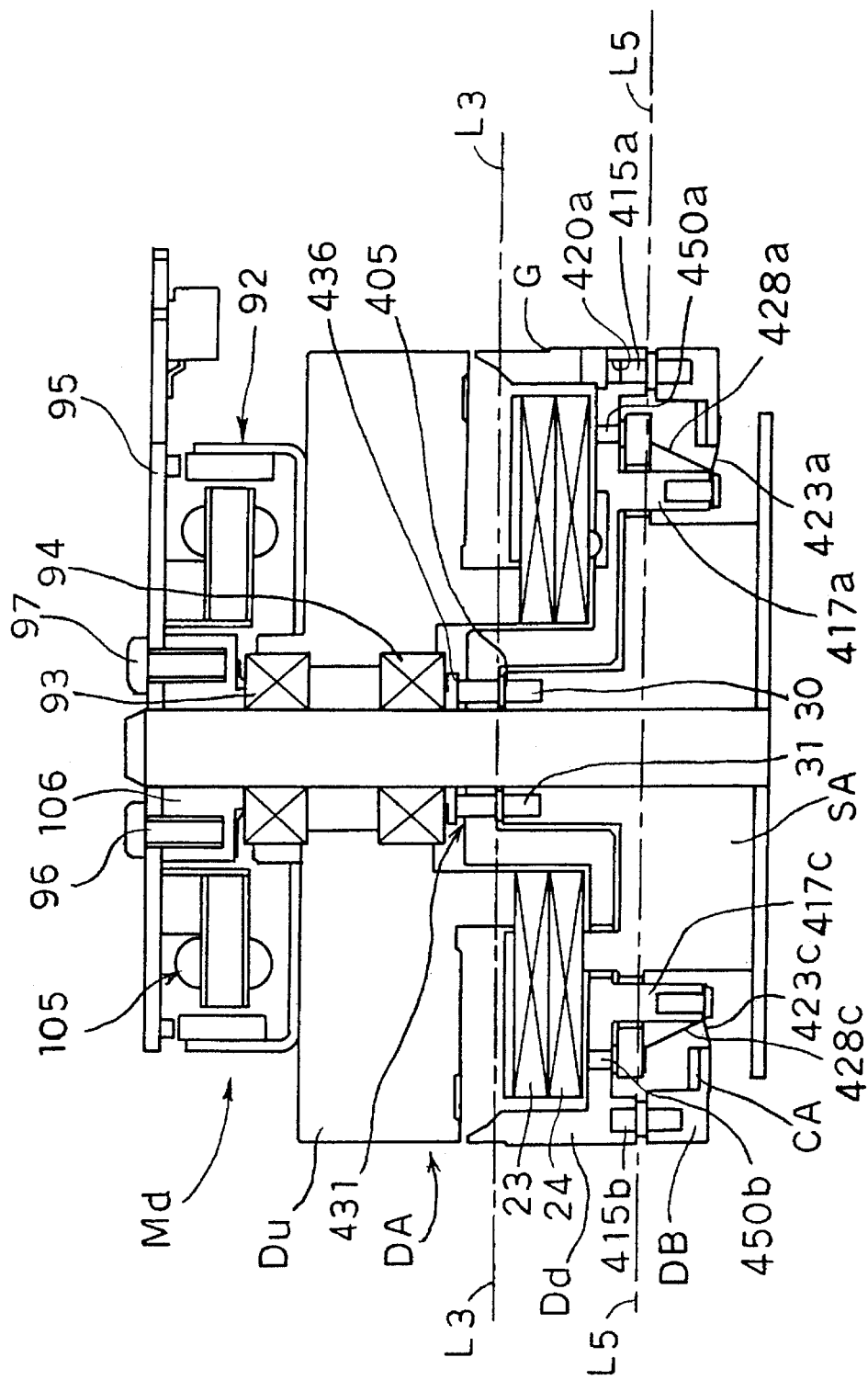
FIGS. 37(a) and 37(b) is a cross section of a portion of a drum pair which is a main portion of a magnetic recording/reproducing apparatus according to a thirteenth embodiment of the present invention.
Figure 37:
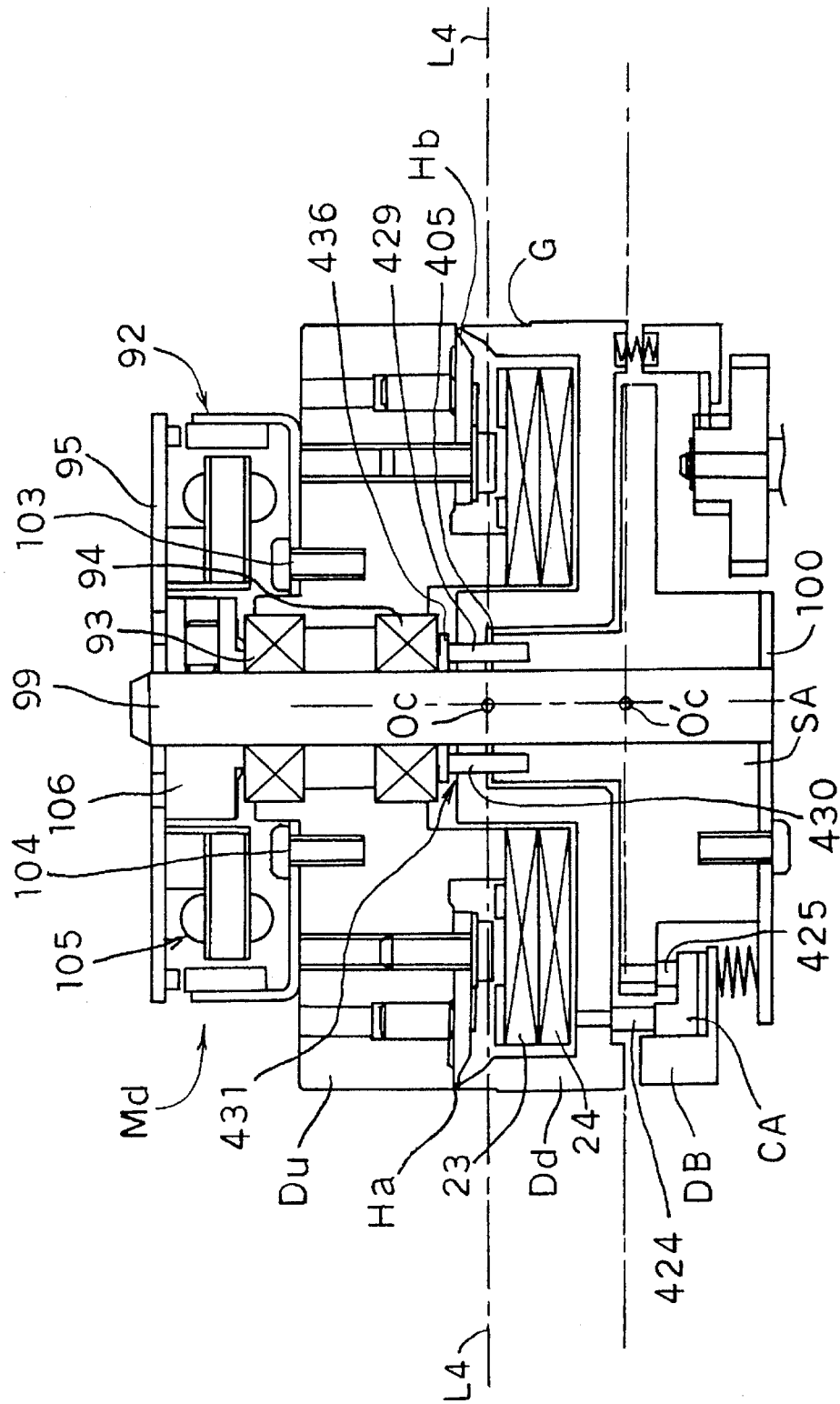
Figure 38:
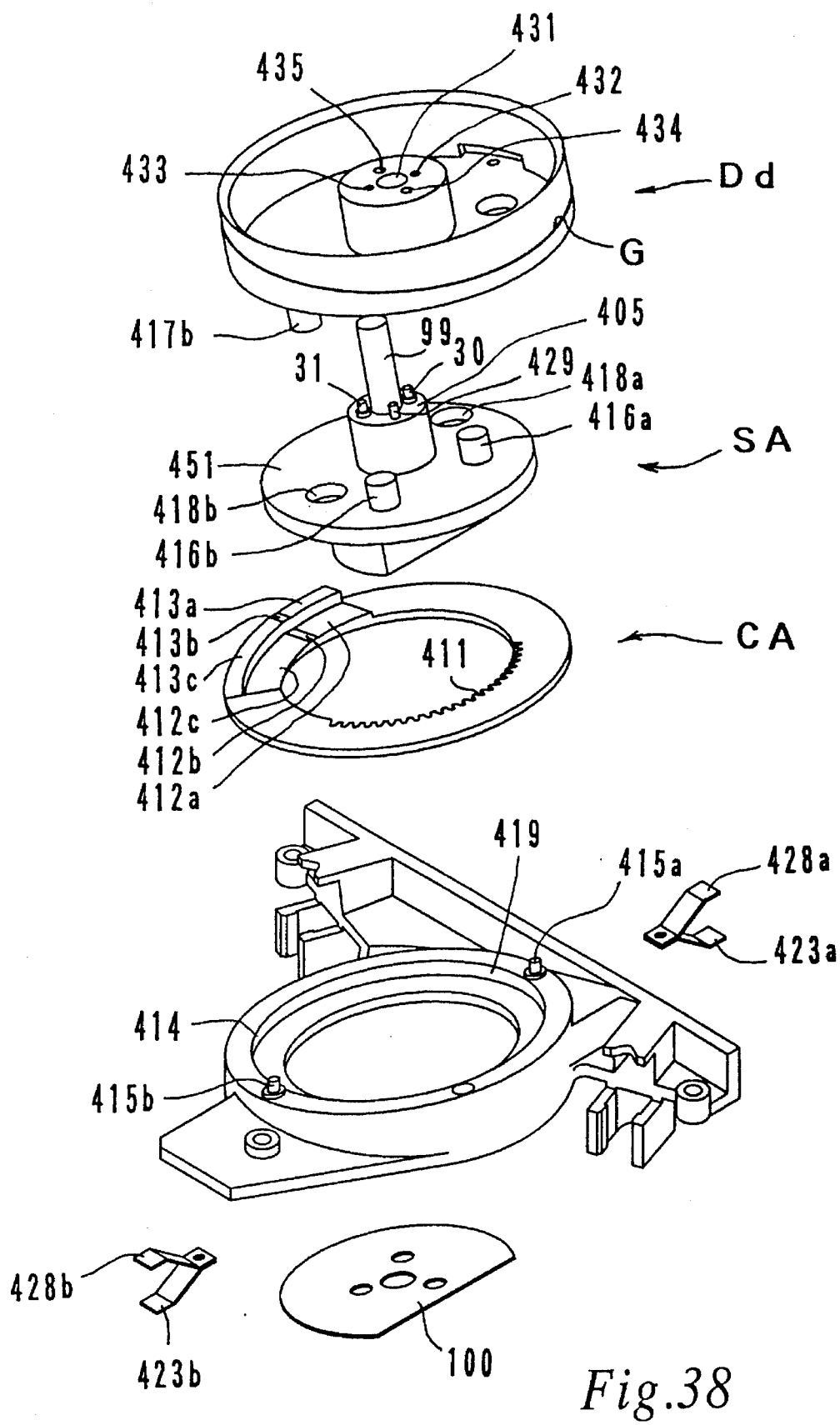
FIG. 38 is a disassembled perspective view of a drum pair shown in FIGS. 37(a) and (b)
Figure 39A:
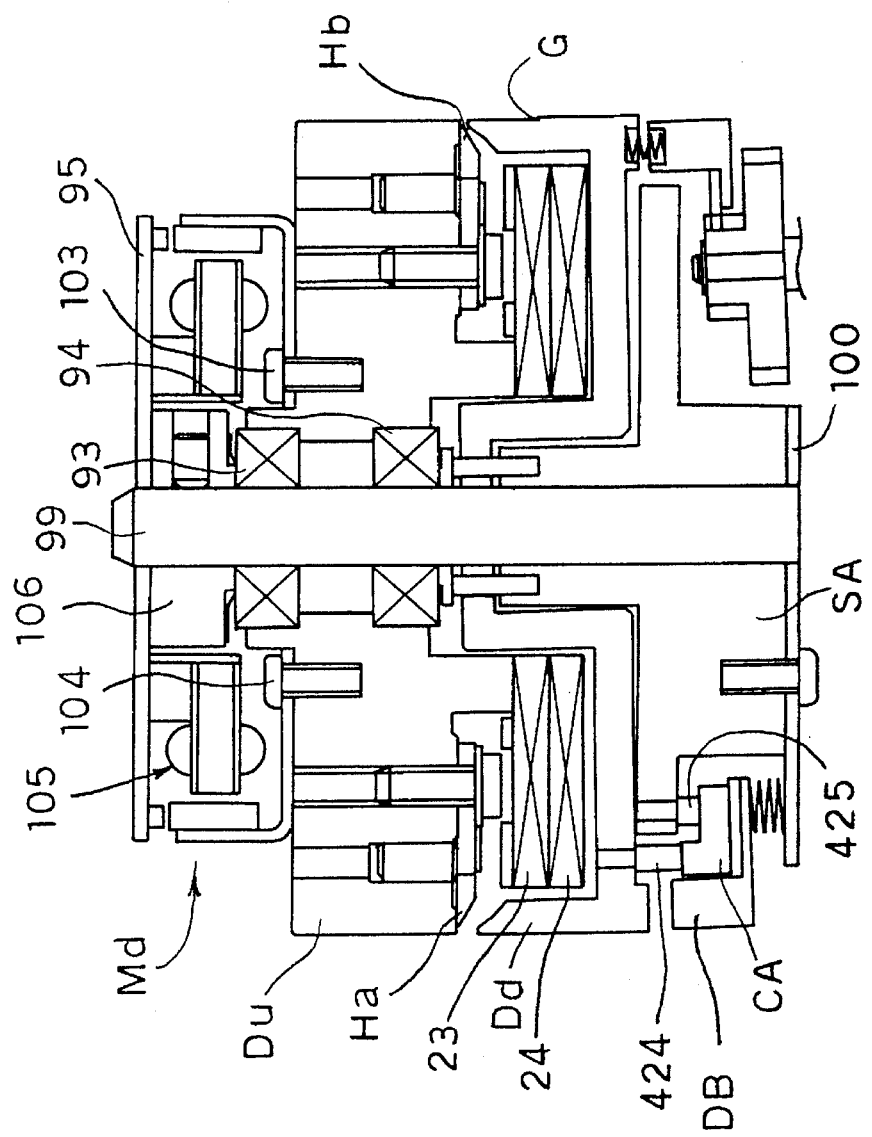
FIGS. 39(a) and 39(b) is a cross sectional side view of the thirteenth embodiment shown in FIGS. 37(a) and (b), for explanation of an operation thereof.
Figure 39:
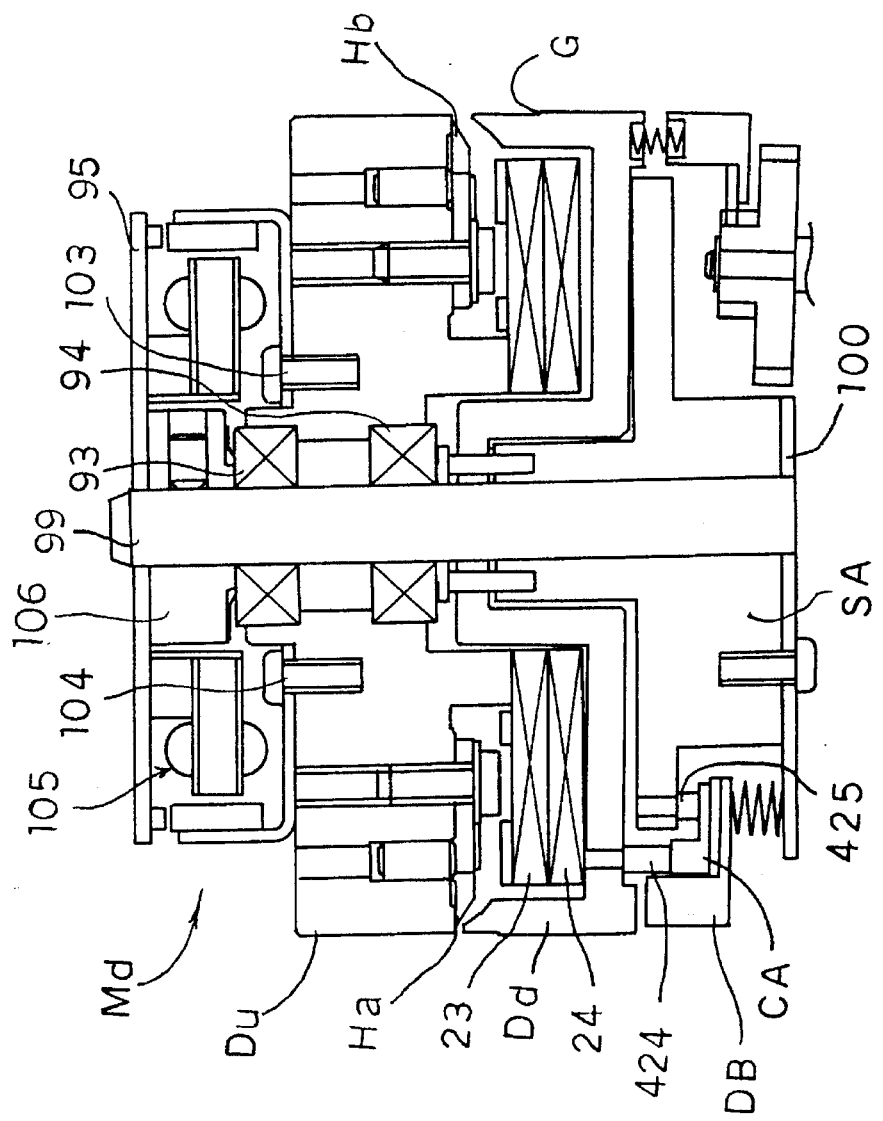

A thirteenth embodiment of the present invention will be described with reference to FIGS. 37 to 39. This embodiment differs from the ninth embodiment in that the pivot points of the intermediate member SA with respect to the lower drum Dd in the ninth embodiment are provided on an inner surface close to the fixed shaft 99 so that the lead correction is performed by tilting the lower drum Dd. In other words, this embodiment differs from the twelfth embodiment in only a method of coaxially suspending the intermediate member SA with respect to the lower drum Dd and a construction of the pivot points of the intermediate member SA with respect to the lower drum Dd. Therefore, the method of suspension and the construction of the pivot points will be described in detail without details of other portions.

FIG. 37(a) is a cross section taken along the 90°–270° line in FIG. 2, showing a construction of a portion including the drum pair, FIG. 37(b) is a cross section taken along the 0°–180° line in FIG. 2. FIG. 38 is a perspective view of main portions including the drum pair in disassembled state. FIG. 39 is a cross sectional side view taken along the 0°–180° line in FIG. 2.

A fixed shaft 99 is pressure-inserted into an intermediate member SA and an upper drum Du is rotatably supported by the fixed shaft 99 through bearings 93 and 94 as in the twelfth embodiment.

A pair of pivot point members 30 and 31 (FIG. 5(h) or FIG. 20) are implanted in an upper end surface 405 of the intermediate member SA around its center axis and pins 429 and 430 are implanted on a straight line L4 orthogonal to a straight line L3 connecting these pivot point members 30 and 31.

On the other hand, through-holes 432–435 are formed in a periphery of a bearing portion 431 of the lower drum Dd. The pivot point members 30 and 31 implanted in the intermediate member SA are loosely fitted in the through-holes 432 and 433, respectively, to form pivot points of the intermediate member SA with respect to the lower drum Dd and top ends thereof abut a spacer 436 provided beneath the bearing 94 to support the spacer. The pins 429 and 430 implanted in the intermediate member SA are loosely fitted in the through-holes 434 and 435, respectively, and their top ends abut the spacer 436 to support it like the pivot point members 30 and 31. The spacer 436 serves to regulate a gap between rotary transformers 23 and 24 mounted on the upper drum Du and on the intermediate member SA, respectively, and to receive pressure applied to the bearings 93 and 94.

An inner surface of the bearing portion 431 of the lower drum Dd is convex in cross section as shown in FIGS. 37(a) and 37(b) and receives the fixed shaft 99 with a small clearance to form a substantial line contact therewith, so that the intermediate member SA is allowed to rotate with respect to the lower drum Dd about a point Oc (line L3) in FIG. 37(b) and the coaxial relation between the lower drum Dd and the intermediate member SA (that is, the upper drum Du) shown in FIG. 37(a) is maintained.

On the other hand, leaf springs 423a, 423b, 428a, 428b are provided on bosses 417a, 417b protruding from a bottom surface of the lower drum Dd downwardly through through-holes 418a, 418b of the intermediate member SA, respectively. The leaf springs 423a, 423b bias the lower drum Dd to a drum base DB and the leaf springs 428a, 428b bias the intermediate member SA to the bottom surface of the lower drum Dd to thereby resiliently support the lower drum Dd and the intermediate member SA with respect to the drum base DB.

Since, in this embodiment, the lower drum Dd is fitted on the fixed shaft 99 which can be machined precisely very easily, it is easy to obtain a preferable fitting condition and, since load variation due to friction during rotation of the intermediate member SA is very small, a smooth rotation can be realized. Further, since both the fitting portion and the pivot points are provided on the inner surface side, it is possible to reduce thickness of a wall of the lower drum Dd which constitutes a slide surface with respect to a magnetic tape T and therefore to increase a diameter of the rotary transformer, resulting in a possibility of multi-channel system.

Now, a fourteenth embodiment of the present invention will be described with reference to FIGS. 40 to 42.

In each of the tenth to thirteenth embodiments, the track correction is performed by tilting the upper drum Du and the lead correction is performed by tilting the lower drum Dd having the guide portion G for guiding the magnetic tape T integrally formed therewith so that the guide portion G coincides with the reference edge Te of the magnetic tape T.

In the fourteenth embodiment, however, the track correction is performed by tilting an upper drum Du and a lower drum Dd together and the lead correction is performed by tilting a guide portion GA which is provided separately from the lower drum Dd to guide a reference edge Te of a magnetic tape T.

Therefore, the above corrections will be described in detail without details of other portions.

Figure 40:
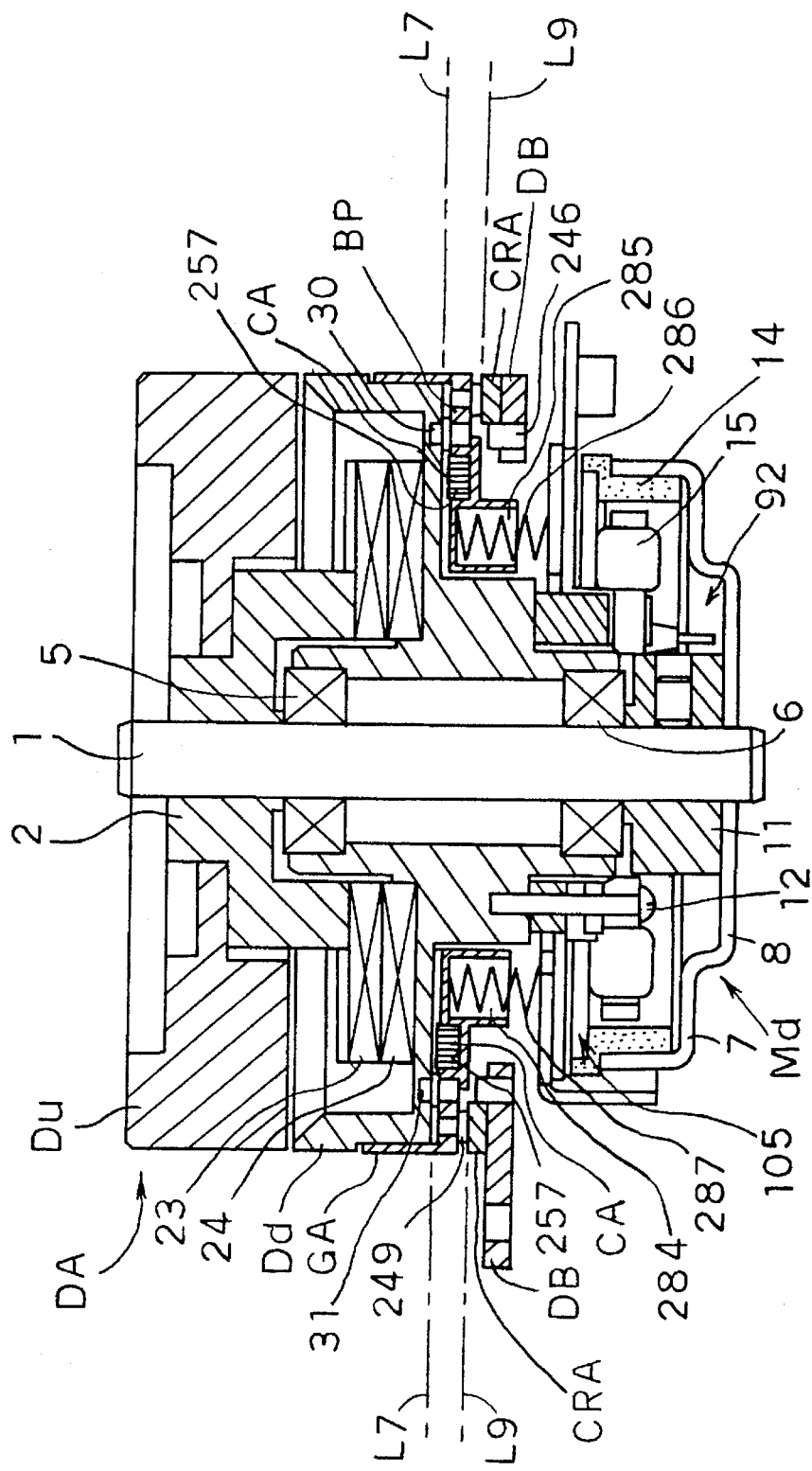
FIGS. 40(a) and 40(b) is a cross section of a portion of a drum pair which is a main portion of a magnetic recording/reproducing apparatus according to a fourteenth embodiment of the present invention.
Figure 40B:
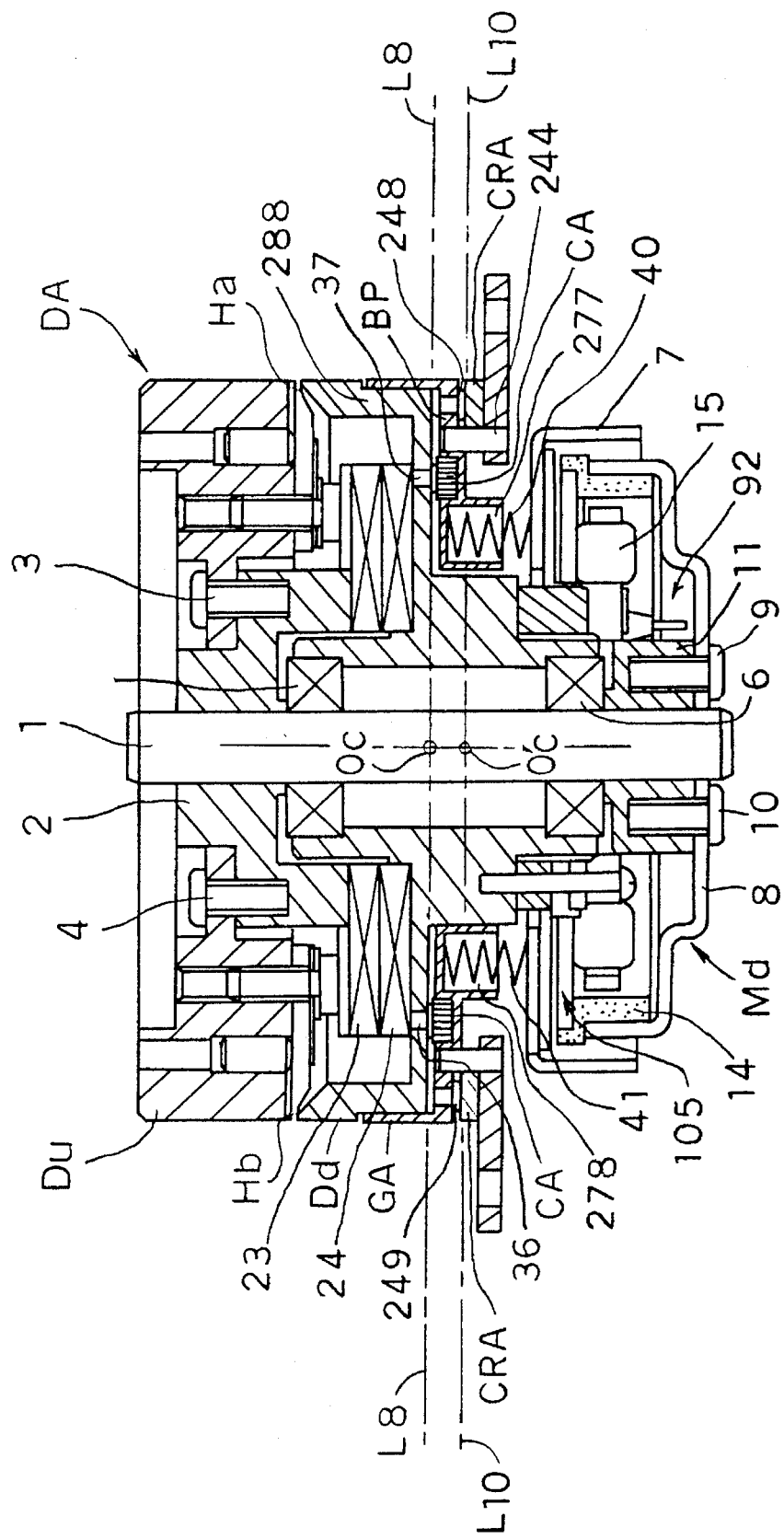

FIG. 40(a) is a cross section taken along the 90°–270° line in FIG. 2, showing a construction of a portion including the drum pair, FIG. 40(b) is a cross section taken along the 0°–180° line in FIG. 2. FIG. 41 is a perspective view of main portions including the drum pair in disassembled state. FIG. 42 is a cross sectional side view taken along the 0°–180° line in FIG. 2.

The upper drum Du is fixedly secured to an upper drum fixing member 2 fixed to a rotary shaft 1 of a drum motor Md by screws 3 and 4. When the drum motor Md rotates at a predetermined speed, rotary magnetic heads Ha and Hb mounted on the upper drum Du rotates together with the rotary shaft 1 which is rotatably supported by bearings 5 and 6 mounted on the stationary drum Dd. Reference numerals 23 and 24 depict rotary transformers fixedly mounted on the upper drum fixing member 2 and on the lower drum Dd, respectively.

A stator 105 of the drum motor Md is fixedly secured to the lower drum Dd by screws 12 and 13 and a rotor 92 thereof is mounted on a shaft fixing member 11 fixedly secured to the rotary shaft 1 by screws 9 and 10. The stator 105 of the drum motor Md is equipped with a coil 15 and the rotor 92 thereof is equipped with a permanent magnet 14.

The guide portion GA for guiding the reference edge Te of the magnetic tape T is separate from the upper drum Du and the lower drum Dd and is constituted integrally with a base plate BP. The guide portion GA is loosely fitted on a small diameter portion 288 of the lower drum Dd and mounted on a drum base DB through an annular cam member CRA used for slant regulation of a center axis.

Pivot point members 30 and 31 shown in FIG. 40(a) are provided on a portion of the drum pair DA between a bottom portion 283 of the small diameter portion 288 of the lower drum Dd and the base plate BP which is integral with the guide portion GA at positions on the 90°–270° line. Further, an annular cam member CA is provided between an upper surface of the base plate BP and the bottom portion 283 of the small diameter portion 288 of the lower drum Dd for slant regulation of the rotary shaft 1.

That is, when the annular cam member CA is rotated as to be described later, the upper drum Du, the lower drum Dd and the drum motor Md which have a common rotational center axis along a line L7 connecting the pivot point members 30 and 31 will be slanted together left and right on the drawing sheet about a point Oc in FIG. 40(b) with respect to a center axis of the guide portion GA by a predetermined angle.

Holes 284 and 285 [FIG. 40(a)] and holes 277 and 278 [FIG. 40(b)] are formed in a lower surface of the base plate BP and springs 286, 287, 40 and 41 are provided in spaces defined between the holes 284, 285, 277 and 278 and a mounting plate 7 of the drum motor Md integrally coupled to the lower drum Dd, respectively.

Figure 41:
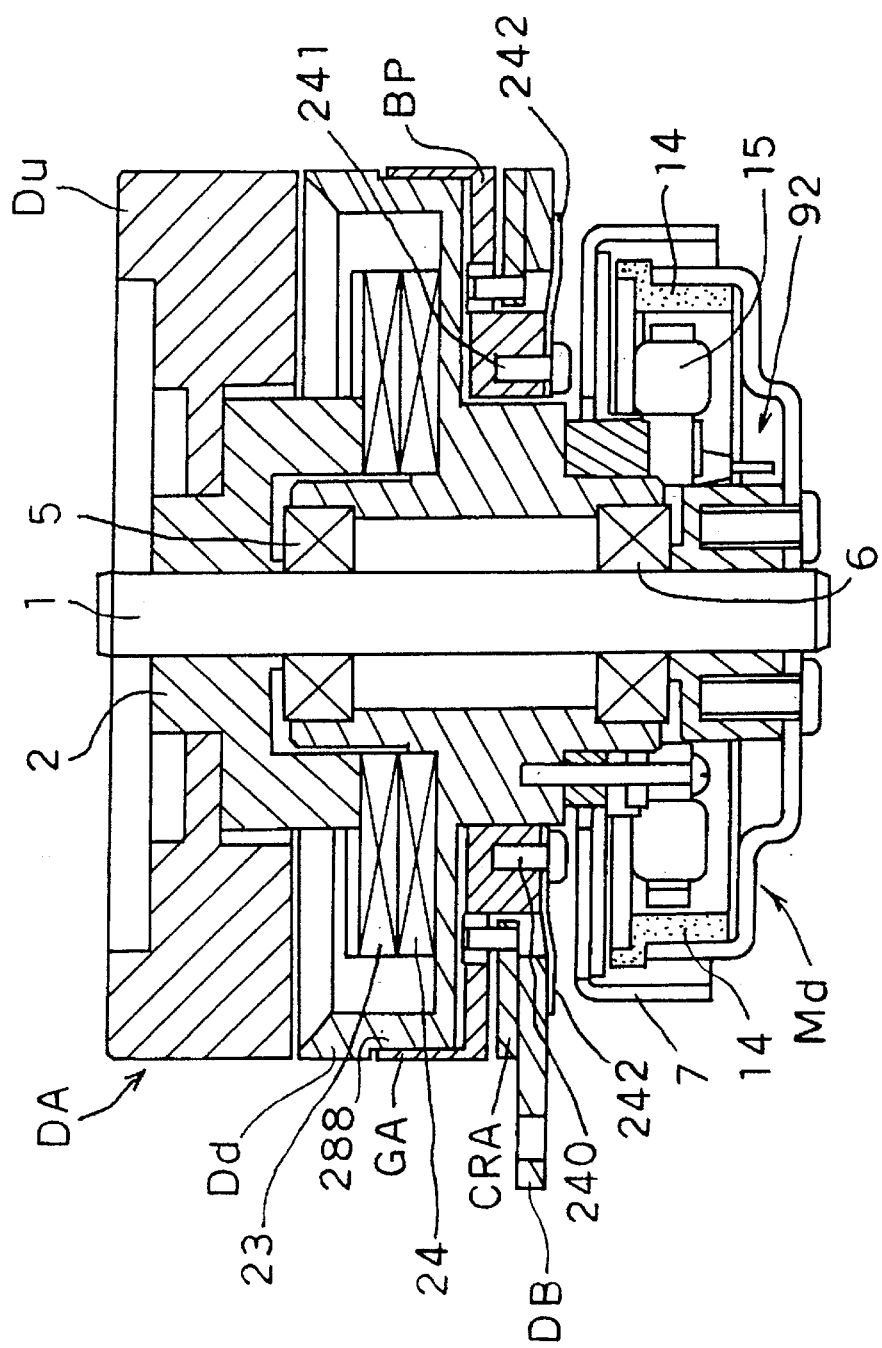
FIG. 41 is another cross section of a portion of a drum pair which is a main portion of a magnetic recording/reproducing apparatus according to the fourteenth embodiment of the present invention.

A root end portion of a leaf spring 242 (configuration of the leaf spring 242 is shown in FIG. 25) is fixedly secured to the base plate BP by screws 240 and 241 as shown in FIG. 41 and the base plate BP which is integral with the guide portion GA can be slightly displaced vertically with respect to the drum base DB by pressure-contact of a free end of the leaf spring 242 against the lower surface of the drum base DB.

The base plate BP is positioned with respect to the drum base DB by fitting positioning pins 243 and 244 provided on the drum base DB on the 0°–180° line of the drum pair DA in a hole provided in the base plate BP [see FIG. 40(b)].

The base plate BP of this embodiment differs from that shown in FIGS. 23 to 26 in only that it is constituted integrally with the guide portion GA and that the holes 284, 285, 277 and 278 are formed in the lower surface of the base plate BP (in the base plate BP of the tenth embodiment shown in FIGS. 23 to 26, two holes 275 and 276 of the four holes for mounting the springs are formed in the upper surface of the base plate and the remaining two holes 277 and 278 are formed in the lower surface of the base plate) and the construction and operation of this embodiment can be easily understood by referencing FIGS. 23 to 26. Therefore, detailed description of the base plate BP of this embodiment are omitted.

As mentioned previously, the annular cam member CA serving as the slant regulation means for the rotary shaft 1 is provided between the upper surface of the base plate BP constituted integrally with the guide portion GA and the bottom surface 283 of the small diameter portion 288 of the lower drum Dd and the annular cam member CRA serving as the slant regulation means for the center axis of the guide portion GA constituted integrally with the base plate BP is provided between the lower surface of the base plate BP and the upper surface of the drum base DB. The annular cam member CRA is positioned with respect to the drum base DB by abutting positioning pins 245 and 246 (see FIGS. 40(a) and 25) provided on the drum base DB on the 90°–270° line of the drum pair DA against an inner periphery of the annular cam member CRA.

In this embodiment, the annular cam member CA for slant regulation of the rotary shaft 1 and the annular cam member CRA for slant regulation of the center axis of the guide portion GA may have similar constructions to those shown in FIG. 25, respectively.

Cam followers 36 and 37 provided on the lower drum Dd abut against cam profiles 258 to 263 (see FIG. 25) formed on an upper surface of the annular cam member CA.

That is, when the annular cam member CA is rotated by driving force transmitted from a drive source which is not shown, the upper drum Du, the lower drum Dd and the drum motor Md which are ganged with each other through the rotary shaft 1 and have a common rotational center axis along a line L7 connecting the pivot point members 30 and 31 will be slanted together left and right on the drawing sheet about a point Oc in FIG. 40(b) with respect to a center axis of the guide portion GA by a predetermined angle, to thereby perform the track correction.

The annular cam member CRA provided between the lower surface of the base plate BP and the upper surface of the drum base DB has cam profiles 251 to 256 (see FIG. 25) on the upper surface thereof which are in contact with the cam followers 247 and 248 provided on the base plate BP. Further, the annular cam member CRA is formed with pivot point plane portions 238 and 239 which are in contact with pivot point protrusions 249 and 250 provided on the rear surface of the base plate BP, respectively. That is, when the annular cam member CRA is rotated by driving force transmitted from a drive source which is not shown, the center axis of the guide portion GA fixedly secured to the base plate BP is slanted in left and right directions on the rawing sheet about a point Oc' in FIG. 40(b) with respect to a center axis of the drum base DB by a predetermined angle, with a rotational center axis along a line L9 connecting the pivot point protrusions 249 and 250, to thereby perform the lead correction.

As mentioned, in this embodiment, it is not always necessary to provide the pivot point members 30 and 31 which are pivot points of a locus plane of the rotary magnetic heads Ha and Hb in the vicinity of the locus plane. This is because, in this embodiment, the upper drum Du and the lower drum Dd rotate together to perform the track correction and thus there is no change in the contact of the magnetic tape T with magnetic gaps of the rotary magnetic heads Ha and Hb regardless of positions of the pivot points. In this embodiment, it is rather important to select the positions of the pivot points 30 and 31 such that they are close to each other in relation to the pivot point protrusions 249 and 250 provided on the rear surface of the base plate BP.

Now, the annular cam members CA and CRA when the magnetic recording/reproducing apparatus is operating in the respective reproduction modes will be described.

In the normal reproduction mode, the cam followers 36 and 37 provided on the lower drum Dd are in contact with the cam profiles 262 and 259 of the annular cam member CA, respectively. On the other hand, the cam followers 247 and 248 provided on the base plate BP are in contact with the cam profiles 255 and 252 of the annular cam member CRA, respectively.

Since the cam profiles 259 and 262 of the annular cam member CA are the same in height and the cam profiles 255 and 252 of the annular cam member CRA are the same in eight as the pivot point plane portions 238 and 239, the center axes of the upper drum Du and the lower drum Dd and the center axis of the guide portion GA coincide with each other in a predetermined direction suitable for the normal reproduction mode when the magnetic recording/reproducing apparatus is operating in the normal reproduction mode. Therefore, in this operating state, the magnetic tape T runs at a predetermined speed while being stably held in the correct position with the reference edge Te thereof being in correct contact with the guide portion GA provided separately from the lower drum Dd over the whole region of the guide portion GA, resulting in a reproduced signal having a preferable envelope such as shown in FIG. 52(a).

Figure 42A:
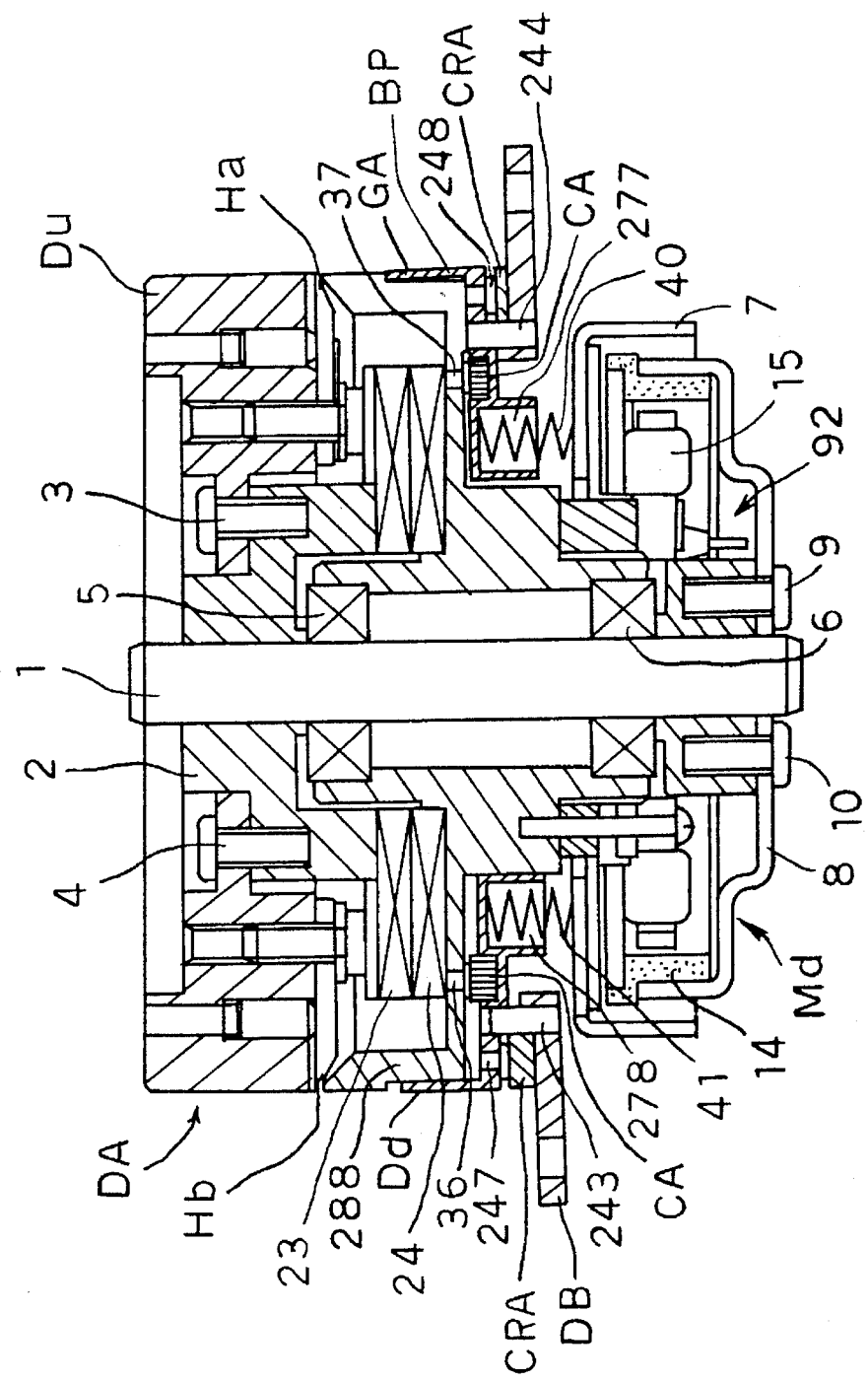
FIGS. 42(a) and 42(b) is a cross sectional side view of the fourteenth embodiment shown in FIGS. 40(a) and (b) or 41, for explanation of an operation thereof.

In the FF reproduction mode, the cam followrrs 36 and 37 provided on the lower drum Dd are in contact with the cam profiles 261 and 258 of the annular cam member CA, respectively. Since the cam profile 261 of the cam member CA is higher than the cam profile 258, the center axes of the upper drum Du and the lower drum Dd are slanted rightwardly with respect to the guide portion GA as shown in FIG. 42(a) to perform the track correction.

Also in this time, the cam followers 247 and 248 provided on the base plate BP provided separately from the lower drum Dd are in contact with the cam profiles 254 and 251 of the annular cam member CRA which is connected to the annular cam member CA by the pins 266–268, respectively.

Since the cam profile 254 of the annular cam member CRA is higher than the cam profile 251 and the pivot point protrusions 249 and 250 provided on the base plate BP are in contact with the pivot point plane portions 238 and 239 of the annular cam member CRA, respectively, the guide portion GA formed integrally with the base plate BP is slanted by an angle corresponding to a difference in height between the cam profiles 254 and 251 with the straight line L9 connecting the pivot point plane portions 249 and 250 as a rotation center axis. Upon this, the center axis of the guide portion GA is slanted toward the slanting direction of the center axis of the upper and lower drums by a predetermined small angle to perform the lead correction and thus the magnetic tape T can run at a predetermined speed while being stably held in the correct position with the reference edge Te thereof being in correct contact with the guide portion GA provided separately from the lower drum Dd over the whole region of the guide portion GA.

In the FB reproduction mode, the cam followers 36 and 37 provided on the lower drum Dd are in contact with the cam profiles 263 and 260 of the annular cam member CA, respectively.

Figure 42B:
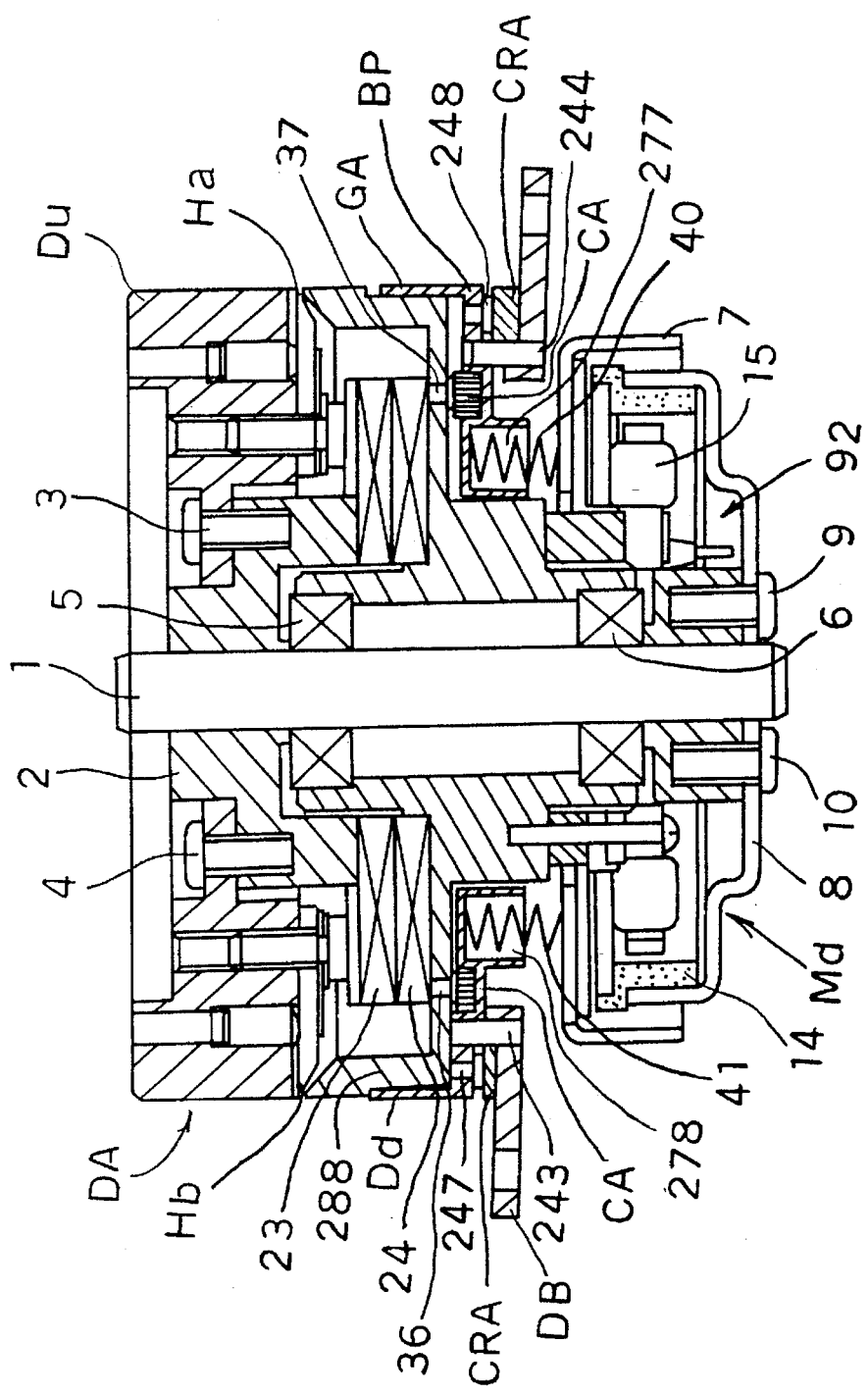

Since the cam profile 263 of the annular cam member CA is lower than the cam profile 260, the center axes of the upper and lower drums are slanted leftwardly with respect to the guide portion GA as shown in FIG. 42(b), to thereby perform the track correction.

In this case, the cam followers 247 and 248 provided on the base plate BP provided separately from the lower drum Dd are in contact with the cam profiles 256 and 253 of the annular cam member CRA which is connected to the annular cam member CA by the pins 266–268, respectively.

Since the cam profile 256 of the annular cam member CRA is lower than the cam profile 253 and the pivot point protrusions 249 and 250 provided on the base plate BP are in contact with the pivot point plane portions 238 and 239 of the annular cam member CRA, respectively, the guide portion GA formed integrally with the base plate BP is slanted by an angle corresponding to a difference in height between the cam profiles 256 and 253 with the straight line L9 connecting the pivot point plane portions 249 and 250 as a rotation center axis. Upon this, the center axis of the guide portion GA is slanted toward the slanting direction of the center axis of the upper and lower drums by a predetermined small angle to perform the lead correction and thus the magnetic tape T can run at a predetermined speed while being stably held in the correct position with the reference edge Te thereof being in correct contact with the guide portion GA provided separately from the lower drum Dd over the whole region of the guide portion GA.

Next, a fifteenth embodiment of the present invention will be described with reference to FIGS. 4 and 43 to 48.

Each of the tenth to fourteenth embodiments employs the lead correction described with reference to FIGS. 49(c) and 50(c). That is, the track correction is performed by slanting the locus plane of the magnetic heads Ha and Hb by the rotation of the upper drum Du or the combination of the upper drum and the lower drum Dd while the lead correction is performed by tilting the guide portion G integral with the lower drum Dd or the guide portion GA separately provided from the lower drum Dd.

Contrary thereto, this embodiment performs the lead correction previously described with reference to FIGS. 49(d) and 50(d). That is, the track correction is performed by slanting the locus plane of the magnetic heads Ha and Hb by the rotation of the upper drum Du or the combination of the upper drum and the lower drum Dd while the lead correction is performed by displacing a supply side guide roller SGR and a take-up side guide roller TGR with respect to a drum pair DA in a widthwise direction of a magnetic tape so that a reference edge Te thereof coincides with the guide portion G formed on the lower drum Dd or the guide portion GA provided separately from the lower drum Dd.

Figure 47A:
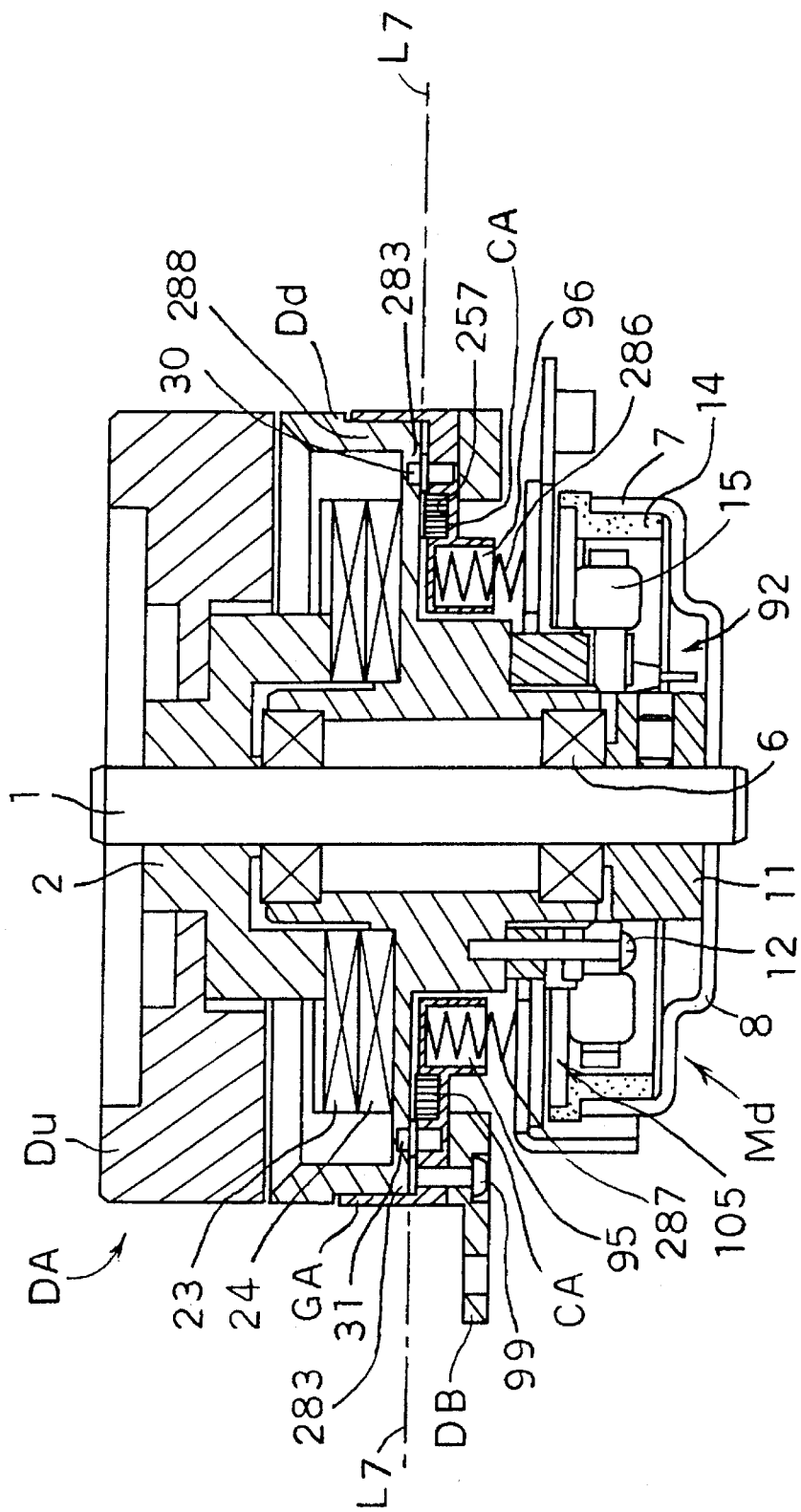
FIGS. 47(a) and 47(b) is a cross section of a portion of a drum pair which is a main portion of a magnetic recording/reproducing apparatus according to a fifteenth embodiment of the present invention.
Figure 47B:
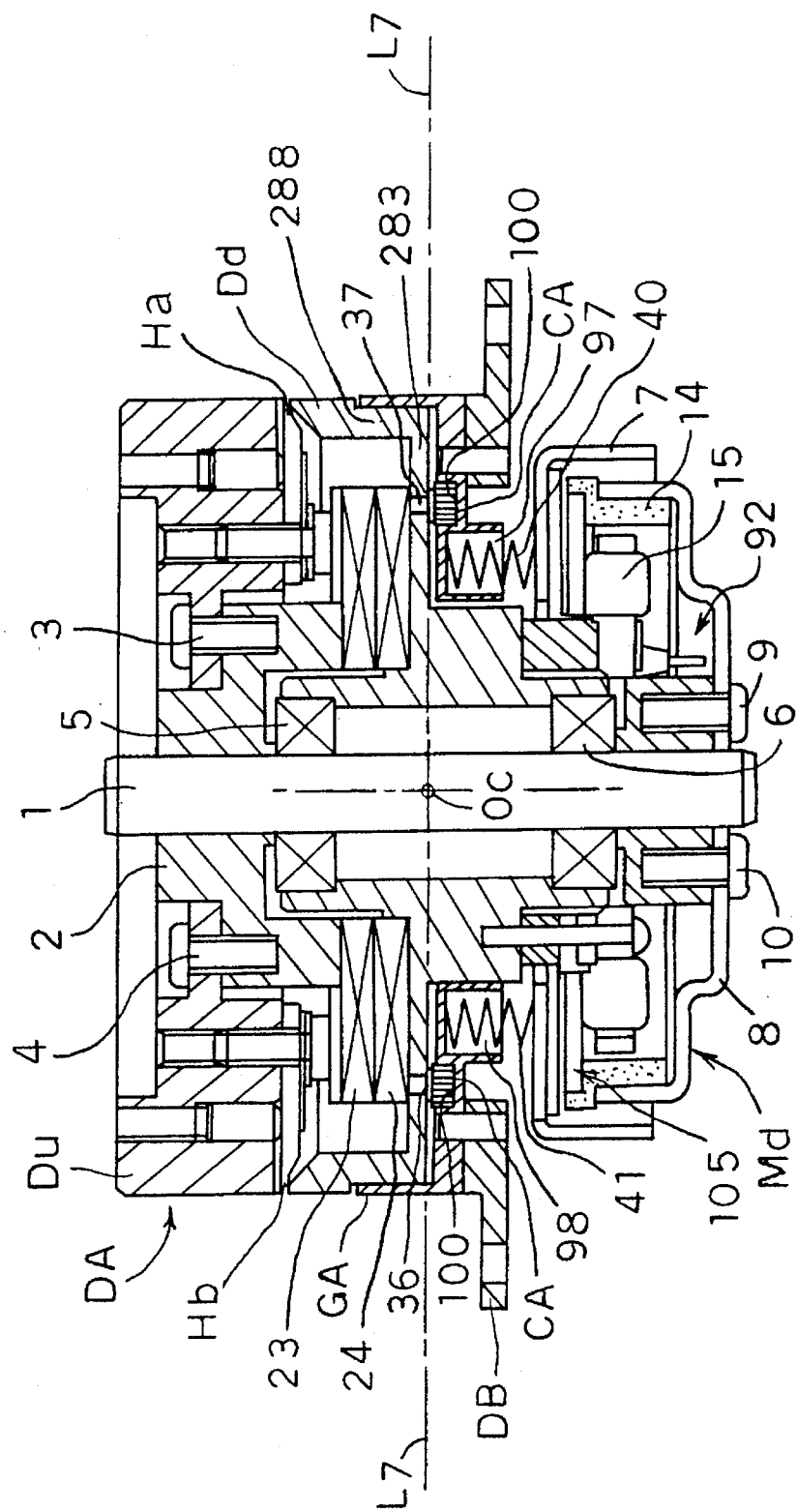

FIG. 47(a) is a cross section taken along the 90°–270° line in FIG. 2, showing a construction of a portion including the drum pair, FIG. 47(b) is a cross section taken along the 0°–180° line in FIG. 2. FIG. 48 is a cross sectional side view taken along the 0°–180° line in FIG. 2.

Figure 45:
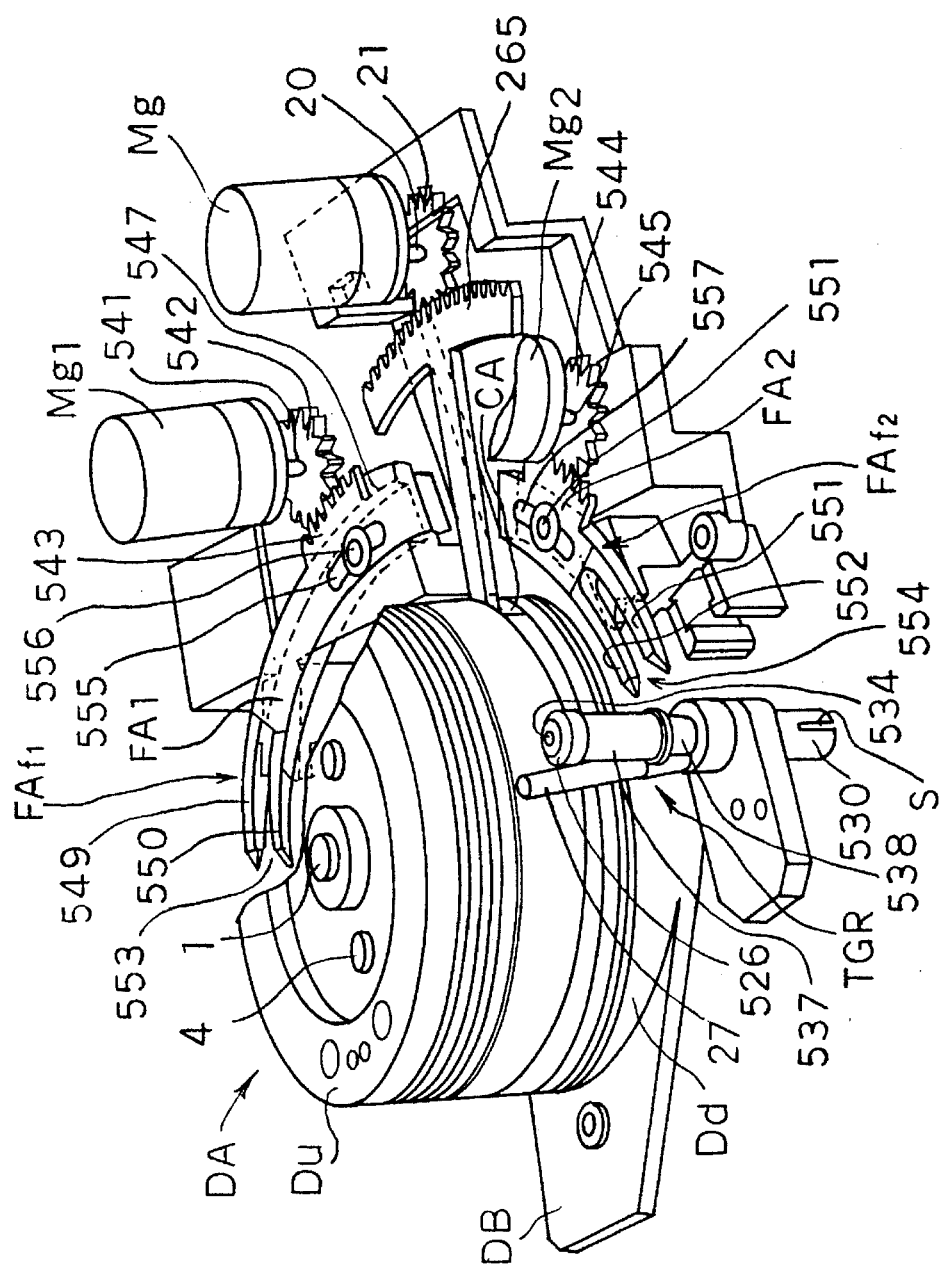
FIG. 45 is a perspective view of a further construction of a drum pair which is a main portion of a magnetic recording/reproducing apparatus, showing a drum motor arranged above an upper drum.

In FIG. 43(a) or 45, a drum pair DA may be one shown in, for example, FIG. 4 or 47. Since the drum pair DA shown in FIG. 4 was described in the first embodiment, details thereof are omitted here. However, its operation will be described later with description of the drum pair DA shown in FIG. 47 in relation to FIG. 43(a) or 45.

First, a construction of the drum pair and other portion associated therewith which are shown in FIG. 47 will be described briefly. The drum pair DA shown in FIG. 47 differs from the construction of the fourteenth embodiment described with reference to FIGS. 40 and 41 in substantially that the pivot point protrusions 249 and 250, the cam followers 247 and 248 and the annular cam member CRA, etc., of the fourteenth embodiment are removed and a base plate BP is fixedly secured to a drum base DB.

Such difference of the drum pair DA will be easily understood since corresponding portions of the drum pairs DA shown in FIG. 47 and in FIG. 40 are depicted by same reference numerals, respectively.

That is, in case where the annular cam member CA shown in FIG. 25 is used as the slant regulation means for a rotary shaft 1 of the drum pair DA shown in FIG. 47, cam followers 36 and 37 provided on a bottom portion 283 of a small diameter portion 288 of a lower drum Dd will be in contact with cam profiles 258 to 263 of the annular cam member CA sequentially when an sector shaped gear 265 is driven by a pinion which is not shown to rotate within a guide groove 257 formed in an upper surface of a drum base DB.

When a magnetic recording/reproducing apparatus using the drum pair DA shown in FIG. 47 is operating in, for example, the normal reproduction mode, the cam follower 36 provided on the bottom portion 283 of the small diameter portion 288 of the lower drum Dd contacts with the cam profile 262 of the annular cam member CA and the cam follower 37 contacts with the cam profile 259 thereof.

When it is operating in the FF reproduction mode, the cam followers 36 and 37 contact with the cam profiles 261 and 158, respectively.

Figure 48A:
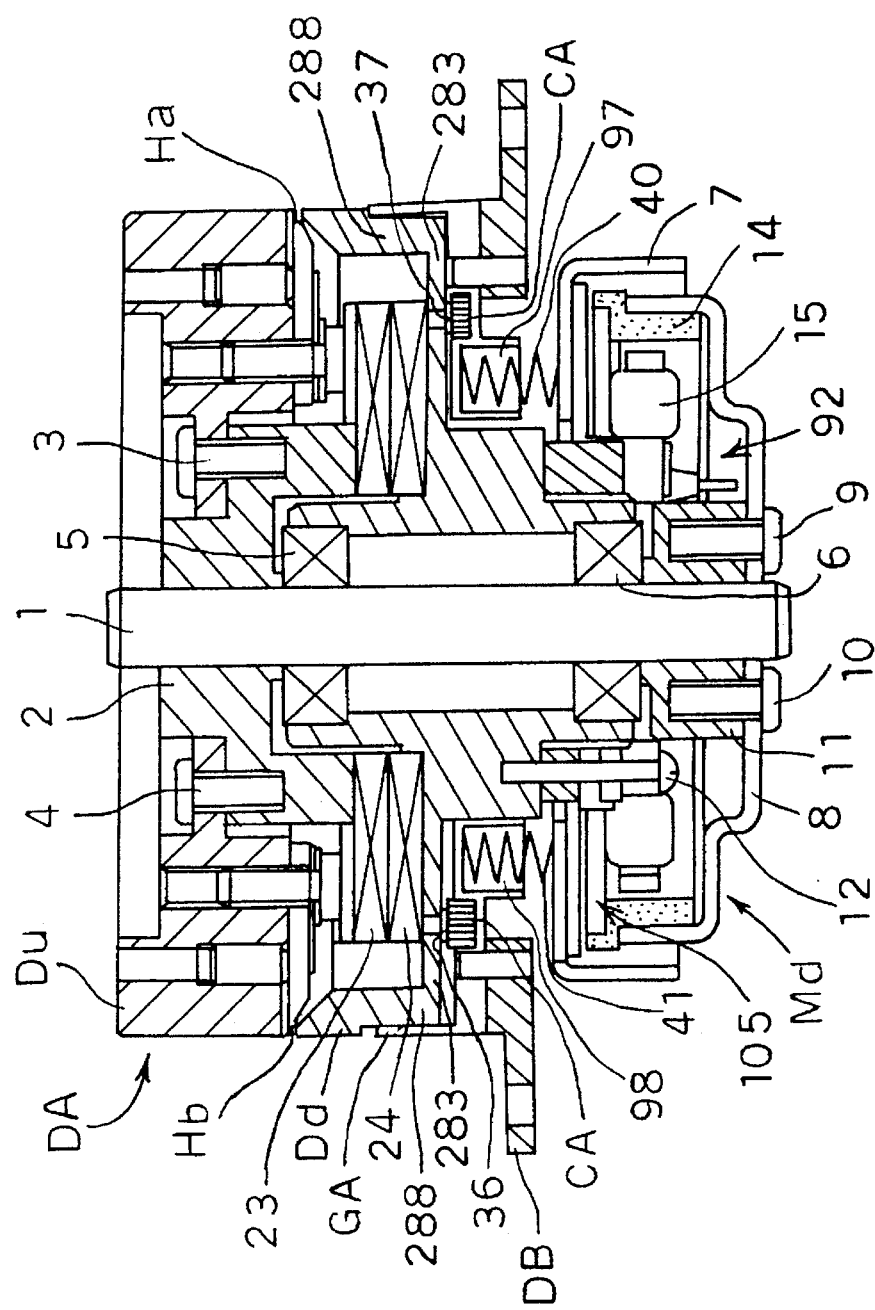
FIGS. 48(a) and 48(b) is a cross sectional side view of a portion of the construction shown in FIG. 47(a) and (b)
Figure 48B:
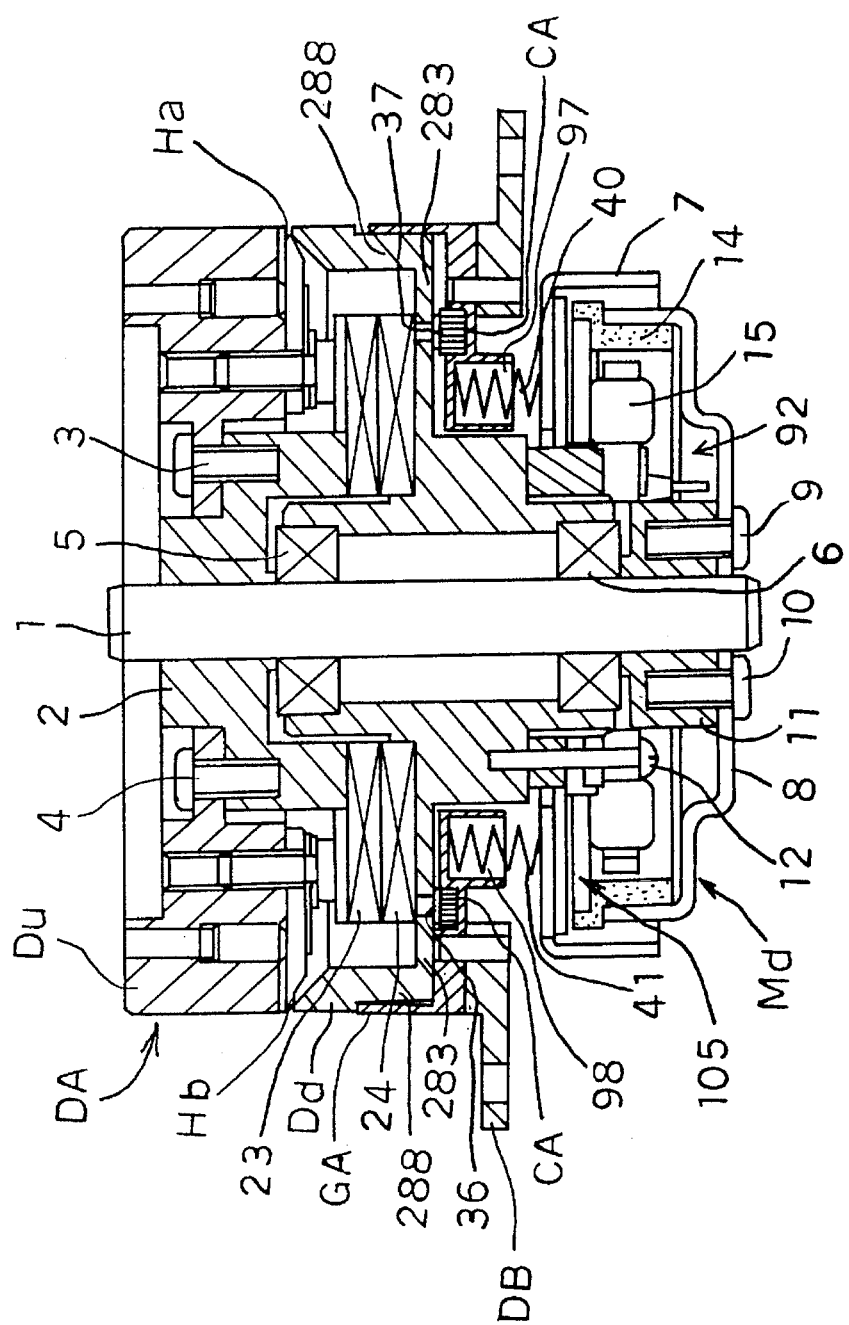

As mentioned previously, since the cam profile 261 of the annular cam member CA is higher than the cam profile 258, a center axis of the upper drum Du and the lower drum Dd is tilted in a clockwise direction about a straight line L7 connecting pivot point members 30 and 31 as shown in FIG. 48(a) to perform the track correction.

When the apparatus is operating in the FB reproduction mode, the cam followers 36 and 37 contact with the cam profiles 263 and 260 of the annular cam member CA, respectively. Since the cam profile 263 of the annular cam member CA is lower than the cam profile 260, the center axis of the upper drum Du and the lower drum Dd is tilted in a clockwise direction about a straight line L7 connecting pivot point members 30 and 31 as shown in FIG. 48(*b*) to perform the track correction.

Although the drum pair DA used in the magnetic recording/reproducing apparatus shown in FIG. 43(*a*) or 45 as a portion of its construction is similar to that described with reference to FIG. 4 or 47, its construction is not limited thereto. That is, it is of course possible to use the drum pair DA mentioned in the second to ninth embodiments or other drum pair whose center axis slant angle is changed according to a change of recording/reproducing mode.

Figure 43:
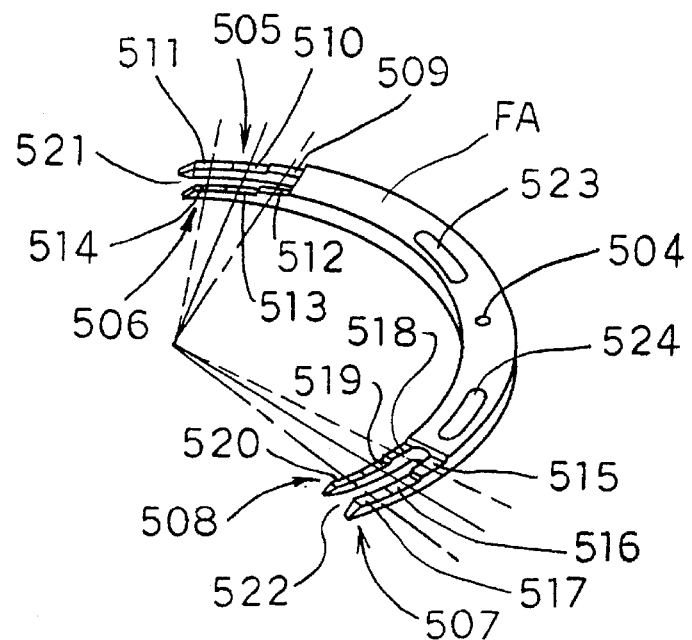
FIGS. 43(a) and 43(b) is a perspective view of another construction of a drum pair which is a main portion of a magnetic recording/reproducing apparatus, showing a drum motor arranged above an upper drum.
Figure 43:
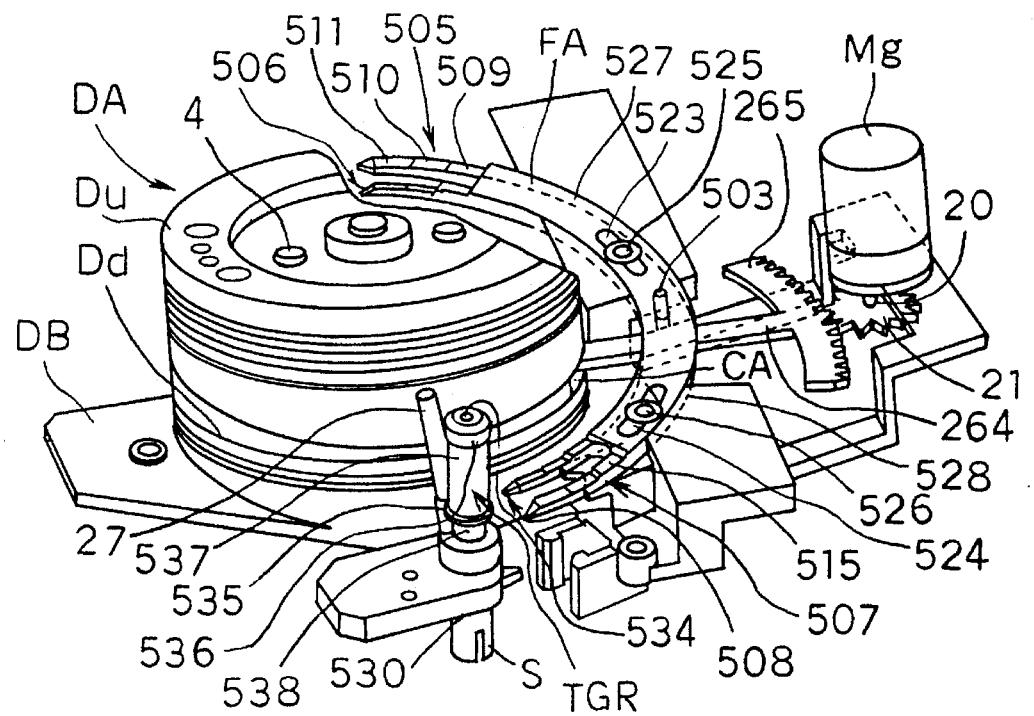

In FIG. 43(*a*), a pinion 21 is fixedly secured to an output shaft 20 of a geared motor Mg. The pinion 21 meshes with an sector shaped gear 265 provided on the annular cam member CA through a connecting portion 264. When drive power of the motor Mg which is driven by a control portion which is not shown is transmitted to the annular cam member CA through the output shaft 20, the pinion 21 and the connecting portion 264, the annular cam member CA is operated to slant the rotary shaft 1 as mentioned previously.

A connecting pin 503 is implanted on the connecting portion 264 and passes through a hole 504 formed in an intermediate portion of an arc shaped actuator member FA. The arc shaped actuator member FA is provided at both end portions thereof with two pairs of actuators 505, 506 and 507, 508.

The respective actuators 505 to 508 are formed with a plurality of cam profiles 509 to 520 as shown in FIG. 43(*b*). These cam profiles 509 to 520 are in contact with cam followers which comprise lower surfaces of lower flanges 535 of a supply side guide roller SGR and a take-up side guide roller TGR which are displacable in width direction of the magnetic T as will be described in detail later.

Cylindrical portions 540 enclosing shafts 534 (see FIG. 44) are provided below the lower flanges 535 of the guide rollers SGR and TGR, respectively. Slots 521 and 522 are provided between the actuators 505 and 506 and between the actuators 507 and 508, in which the cylindrical portions 540 can be received, respectively. The arc shaped actuator member FA is formed with long slots 523 and 524 in which guide pins 525 and 526 implanted in guide grooves 527 and 528 formed in a drum base DB are received, respectively.

That is, when the guide rollers SGR and TGR mounted on a loading mechanism are in their correct places during a recording/reproducing operation, respectively, the actuator member FA is guided along the guide grooves 527 and 528, with the cylindrical portions 540 provided below the lower flanges 535 of the guide rollers SGR and TGR being received in the respective slots 521 and 522 provided between the actuators 505 and 506 and between the actuators 507 and 508 of the arc shaped actuator member FA. When the arc shaped actuator member FA is rotated in this manner, the cam profiles 509 to 520 formed on the actuators 505, 506, 507 and 508 are brought into contact with the lower surfaces of the respective lower flanges of the guide rollers SGR and TGR which serve as cam followers, sequentially.

The concrete construction of the supply side guide roller SGR and the take-up side guide roller TGR which are displaceable in width direction of the magnetic tape T will be described in detail with reference to FIG. 44.

The supply side guide roller SGR and the take-up side guide roller TGR are displaceable in width direction of the magnetic tape (vertical direction in FIG. 7) with respect to a support portion PS mounted on a base plate 529 of the loading mechanism.

The support portion PS is composed of two support members 530 and 538 between which the base plate 529 of the loading mechanism is interposed so that the support portion PS is movable with respect to the base plate 529 upon loading of tape.

A hollow portion 531 is provided in a lower portion of the support member 530 and is formed in an outer wall thereof with slits S. The support members 530 and 538 of the support portion PS are formed in center portions thereof with holes through which a shaft 534 passes. A pin 532 is fixed to an end portion of the shaft 534. Since the both end portions of the pin 532 are guided by the slits S, the shaft 534 does not rotate when it is moved vertically. A spring 533 is mounted between the pin 532 and a bottom portion of the hollow portion 531 to bias the shaft 534 downwardly.

Therefore, when the arc shaped actuator member FA rotates, its bottom surface is brought into slide contact with an end face of a small diameter portion 539 provided in an upper portion of the support member 538 of the support portion PS for the guide rollers SGR and TGR. Further, the arc shaped actuator portion FA is guided along the guide grooves 527 and 528 with the cylindrical portions 540 provided below the lower flanges 535 of the guide rollers SGR and TGR being received in the slots 521 and 522 formed between the actuators 505 and 506 and between the actuators 507 and 508, respectively.

A hollow portion 539a having inner diameter larger than an outer diameter of the shaft 534 is formed in the small diameter portion 539 formed in the upper portion of the support member 538 provided above the base plate 529 of the loading mechanism to guide the cylindrical portion 540 provided below the lower flange 535 vertically.

A roller 537 having width corresponding to the width of the magnetic tape T is rotatably mounted on the shaft 534. An upper flange 536 is fixedly secured to an upper end of the shaft 534. Thus, the magnetic tape T runs along an outer peripheral surface of the roller 534 provided between the upper surface of the lower flange 535 and a lower surface of the upper flange 536 while its position in the tape width direction being restricted by the upper surface of the lower flange 535 and the lower surface of the upper flange 536.

Heights of the supply side guide roller SGR and the take-up side guide roller TGR (position of the magnetic tape running path) which are defined by the arc shaped actuator member FA during the normal reproduction mode operation, the FF reproduction mode operation and the FB reproduction mode operation of the magnetic recording/reproducing apparatus will be described.

Figure 44:
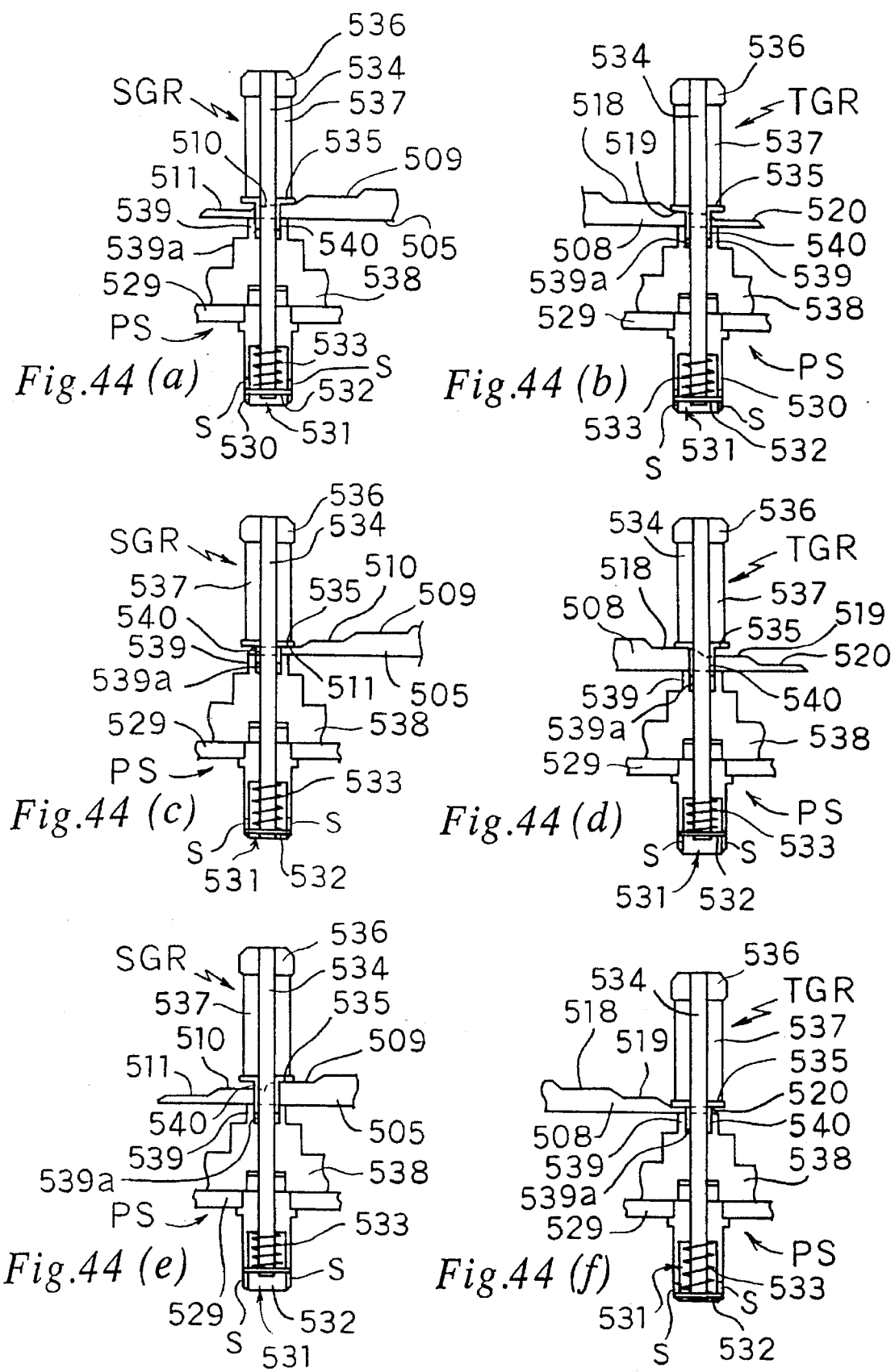

FIGS. 44(*a*) and 44(*b*) show the guide rollers SGR and TGR whose heights (positions in the magnetic tape running path) are restricted by the cam profiles 510 and 513 formed on the actuators 505 and 506 of the arc shaped actuator member FA and the cam profiles 516 and 519 formed on the acuators 507 and 508 thereof when the magnetic recording/reproducing apparatus is operating in the normal reproduction mode.

That is, since, in the normal reproduction mode, the upper drum Du in FIG. 4 or the upper drum Du and the lower drum Dd in FIG. 47 is stationary, there is no relative displacement of the supply side guide roller SGR to the take-up side guide roller TGR.

FIGS. 44(*c*) and 44(*d*) show the guide rollers SGR and TGR whose heights (positions in the magnetic tape running path) are restricted by the cam profiles 511 and 514 formed on the actuators 505 and 506 of the arc shaped actuator member FA and the cam profiles 515 and 518 formed on the acuators 507 and 508 thereof when the magnetic recording/ reproducing apparatus is operating in the FF reproduction mode.

Figure 49:
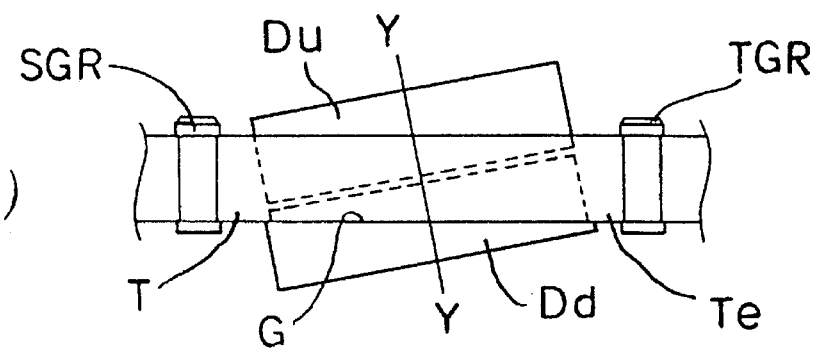
FIGS. 49(a) through 49(d) is a side view of the drum pair for explanation of a magnetic tape running.
Figure 49:
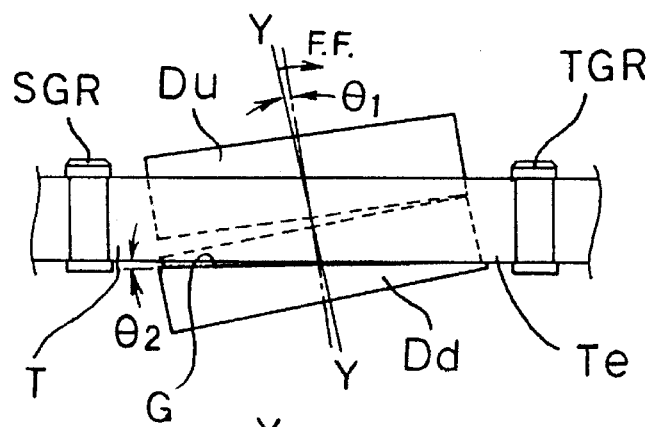
Figure 49:
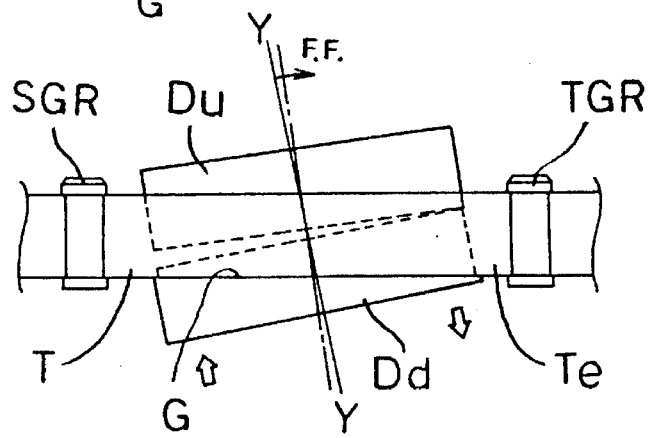
Figure 49:
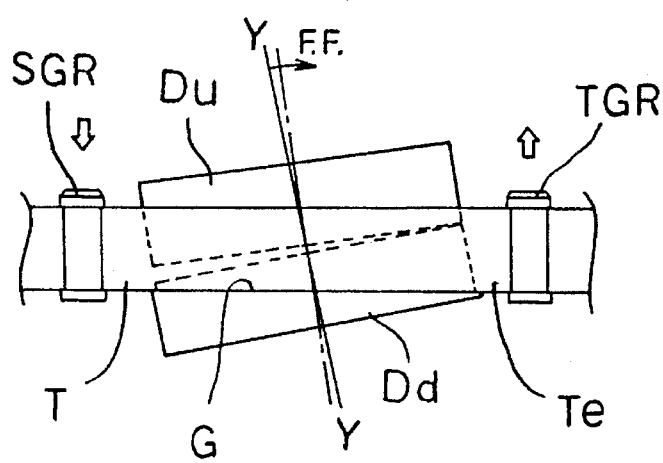
Figure 50:
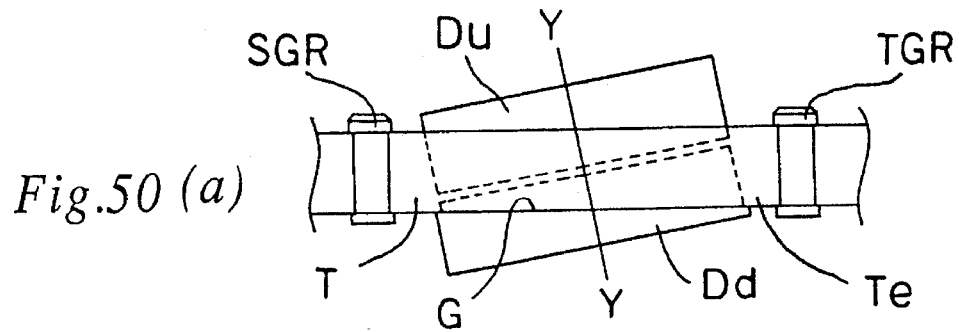
FIGS. 50(a) through 50(d) is a side view of the drum pair for explanation of a magnetic tape running.
Figure 50:
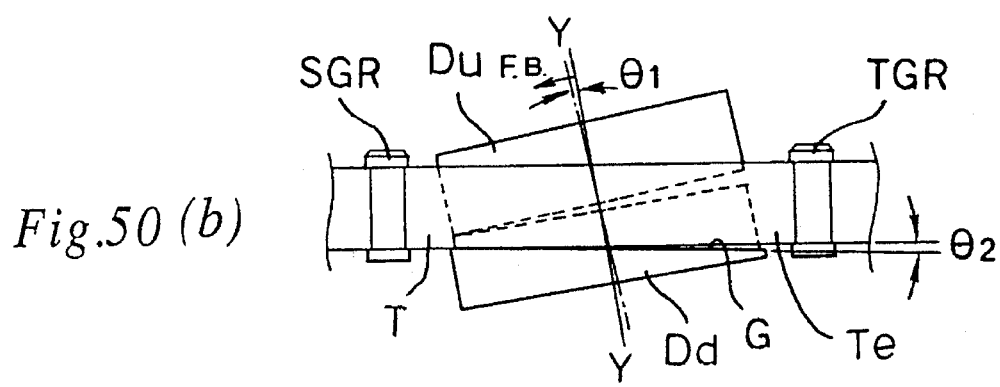
Figure 50:
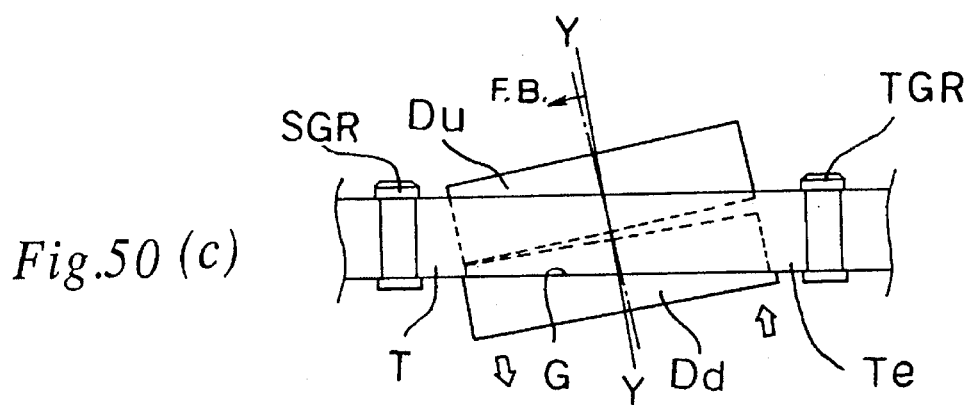
Figure 50:
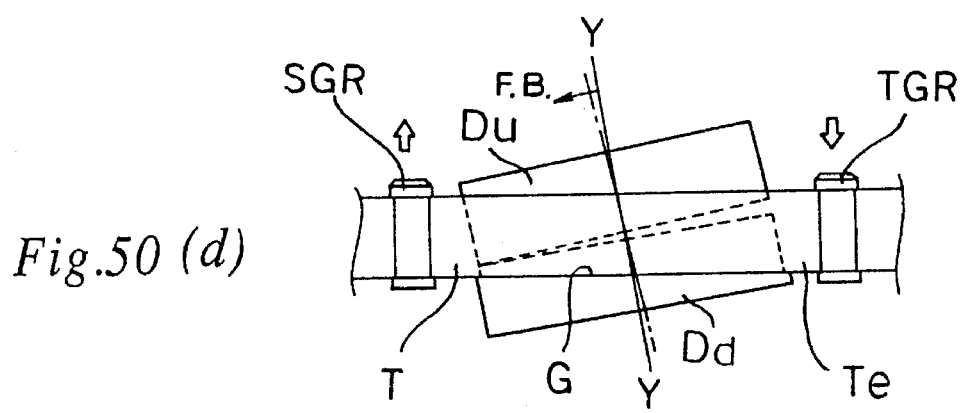
Figure 51:
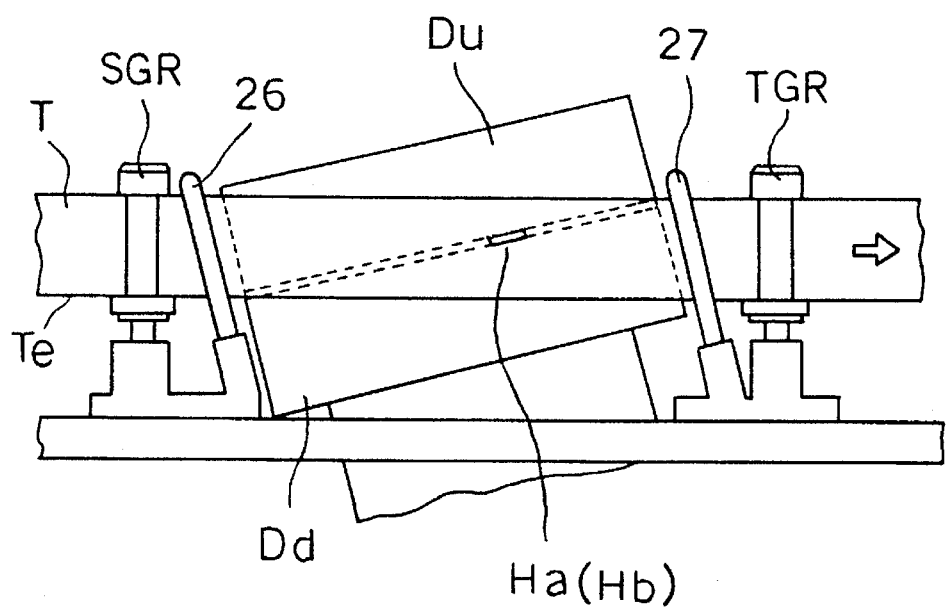
FIG. 51 shows a general magnetic tape transporting system in the vicinity of a drum pair.

That is, since, in the FF reproduction mode, the upper drum Du in FIG. 4 or the upper drum Du and the lower drum Dd in FIG. 47 is tilted clockwisely as shown in FIG. 49(*b*) to perform the track correction, the tendency of the reference edge Te of the magnetic tape T to slant toward the guide portion G or GA by Θ2 is prevented by downward and upward displacements of the supply side guide roller SGR and the take-up side guide roller TGR, respectively, as shown in FIG. 49(*d*), resulting in that the reference edge Te of the magnetic tape T is guided along the whole of the guide portion G or GA stably providing a preferable reproduced signal.

FIGS. 44(*e*) and 44(*f*) show the guide rollers SGR and TGR whose heights (positions in the magnetic tape running path) are restricted by the cam profiles 509 and 512 formed on the actuators 505 and 506 of the arc shaped actuator member FA and the cam profiles 517 and 520 formed on the acuators 507 and 508 thereof when the magnetic recording/ reproducing apparatus is operating in the FB reproduction mode.

That is, since, in the FB reproduction mode, the upper drum Du in FIG. 4 or the upper drum Du and the lower drum Dd in FIG. 47 is tilted clockwisely as shown in FIG. 50(*b*) to perform the track correction, the tendency of the reference edge Te of the magnetic tape T to slant toward the guide portion G or GA by 2 is prevented by upward and downward displacements of the supply side guide roller SGR and the take-up side guide roller TGR, respectively, as shown in FIG. 50(*d*), resulting in that the reference edge Te of the magnetic tape T is guided along the whole of the guide portion G or GA stably, realizing a preferable reproduced signal.

In the magnetic recording/reproducing apparatus described with reference to FIGS. 43(*a*), 43(*b*) and 44, each of the actuators 505 to 508 is formed with the plurality of specific cam profiles (509 to 520).

FIGS. 45 and 46 show a magnetic recording/reproducing apparatus in which a pair of arc shaped actuator members FA1 and FA2 having respective actuators FAf1 and FAf2 (these actuators will be referred to as "actuator FAf" as a whole in cases may be) formed with cam profiles 549, 550, 551 and 552 each in the form of uniform slope. In this embodiment also, the arc shaped actuator members FA rotate with bottom surfaces of the actuators FAf of the arc shaped actuator members FA being in slide-contact with an end face of a small diameter portion 539 provided in an upper portion of a support member 538 of support portions PS of guide rollers SGR and TGR and two portions juxtaposed with a gap therebetween in the vicinity of a top end portion thereof pinching cylindrical portions 540 provided below lower flanges 535 of the guide rollers SGR and TGR.

Since, when the arc shaped actuator members FA having the actuators FAf formed with the uniform slope cam profiles 549 to 552 are used, the cam members 549 to 552 contact with the lower surfaces of the lower flanges 535 of the guide rollers SGR and TGR, which function as cam followers, with rotation of the arc shaped actuator members FA, the heights (positions in the tape running path) of the guide rollers SGR and TGR are changed continuously without steps.

When the lead correction is performed by continuously changing the heights of the guide rollers SGR and TGR, it is preferable to use an annular cam member CA having cam profiles with which a slant angle of a common center axis of an upper drum Du and an intermediate member SA (in the case of the drum pair DA shown in FIG. 4) or an upper drum Du and a lower drum Dd (in the case of the drum pair DA shown in FIG. 47) can be changed continuously. A structure of the guide rollers SGR and TGR shown in FIG. 46 is the same as that shown in FIG. 44 and therefore details thereof are omitted.

Although, in the magnetic recording/reproducing apparatus described with reference to FIG. 43, the annular cam member CA and the arc shaped actuator members FA are rotated by a single drive source, they can be driven by separately provided drive sources as shown in FIG. 45.

In a magnetic recording/reproducing apparatus shown in FIG. 45, geared motors Mg, Mg1 and Mg2 are provided. A pinion 21 is fixedly secured to an output shaft 20 of the motor Mg. The pinion 21 meshes with a sector shaped gear 265 provided on an annular cam member CA through a connecting portion 264. When drive power of the motor Mg which is driven by a control portion which is not shown is transmitted to the annular cam member CA through the output shaft 20, the pinion 21 and the connecting portion 264, the annular cam member CA is operated to change a slant angle of a rotary shaft 1 to perform the track correction, as mentioned previously.

A pinion 542 is fixedly secured to an output shaft 541 of the geared motor Mg1. The pinion 542 meshes with a sector shaped gear 243 provided on an arc shaped actuator member FAf1. Further, a pinion 545 is fixedly secured to an output shaft 544 of the geared motor Mg1. The pinion 545 meshes with a sector shaped gear 546 provided on an arc shaped actuator member FAf2. When the geared motors Mg1 and Mg2 are driven by a control portion which is not shown, the arc shaped actuator members FA1 and FA2 rotated within arc shaped guide grooves 547 and 548 provided in a drum base DB, respectively. 555 is a long slot formed in the arc shaped actuator member FA1, 557 is a long slot formed in the arc shaped actuator member FA2 and 556 and 558 are pins implanted in a base plate BP.

The actuator FAf1 composed of two portions juxtaposed with a gap 553 therebetween and the actuator FAf2 composed of two portions juxtaposed with a gap 554 therebetween are formed at one end portions of the arc shaped actuator members FA1 and FA2, respectively. That is, the actuator FAf1 is composed of the portion on which the continuous slope cam profile 549 and the portion which is juxtaposed therewith with the gap 553 and on which a continuous slope cam profile 550 is formed. The actuator FAf2 is composed of the portion on which the continuous slope cam profile 551 and the portion which is juxtaposed therewith with the gap 554 and on which a continuous slop cam profile 552 is formed.

When the arc shaped actuator members FA1 and FA2 rotate as mentioned previously, bottom surfaces of the actuators FAf1 and FAf2 are brought into slide-contact with end faces of small diameter portions 539 provided in upper portions of the support members 538 of the support portions PS for the guide rollers SGR and TGR. Further, the arc shaped actuator members are rotated, with cylindrical portions 540 provided below the lower flanges 535 of the guide rollers SGR and TGR being pinched between the pairs of juxtaposed two portions with the gaps provided in the vicinity of their opposite ends, respectively.

It is of course possible to form, on the actuators FAf1 and FAf2 formed at one end portions of the respective arc shaped actuator members FA1 and FA2, a plurality of stepwise cam profiles as shown in, for example, FIG. 44 instead of the continuous cam profiles and further it is possible to unite the arc shaped actuator members FA1 and FA2 and drive the united members with a single geared motor.

However, when, as in the magnetic recording/reproducing apparatus shown in FIG. 45, the heights of the supply side guide roller SGR and the take-up side guide roller TGR are separately changed by the actuators FAf1 and FAf2 provided at one end portions of the arc shaped actuator members FA1 and FA2, respectively, it is possible to change the heights of the guide rollers SGR and TGR in various manners.

In the magnetic recording/reproducing apparatus shown in FIG. 53 or 45, an amount of rotation of the annular cam member CA to be rotated correspondingly to a change of reproduction mode and amount of rotation of the arc shaped actuator members FA, FA1, FA2, etc., are easily controlled by, for example, providing position sensors on respective rotary components and actuating respective drive sources (motors) under control of a control signal generated in the control portion, not shown, on the basis of a positional information obtained from the position sensors. In such case, the control circuit can be selected from various known control circuits.

Although the magnetic recording/reproducing apparatus according to the present invention has been described with reference to the first to fifteenth embodiments, it will be apparent for persons skilled in the art that the present invention is not limited thereto.

For example, the pivot point construction between the lower drum Dd and the intermediate member SA may be realized by rotatably connecting them directly by a pin extending along a straight line (for example, straight line L3) which is to be a center axis of rotation.

In the aforementioned embodiments, various types annular cam member CA (CRA) are used to rotate the intermediate member SA with respect to the lower drum Dd or to rotate the lower drum Dd with the drum base DB, however the method for such rotation is not limited to the annular cam member CA (CRA). In case of the intermediate member SA with respect to the lower drum Dd for example, it is possible to use a mechanism that a pair of threaded through-holes are provided on the lower drum Dd or the drum base DD at positions corresponding to the cam followers 36, 37 of the intermediate member SA, and a pair of screws having a gear at one end of respective screws is inserted to the pair of threaded through-holes, another end of the respective screws is made to contact with one or both of the cam followers 36, 37. With this mechanical arrangement, the pair of screws can be moved up and down with the gears being driven by a motor to be controlled, so that the respective screws depress the cam followers 36, 37 of the intermediate member SA causing thereof to rotate.

Although the the respective embodiments have been described with respect to the FF reproduction, the FB reproduction, etc., as examples, the magnetic recording/ reproducing apparatus according to the present invention can be applied directly to the so-called time-lapse recording, etc., as mentioned in the item of "Object of the Invention". That is, it is enough to perform the time-lapse recording with a locus plane of rotary magnetic heads being preliminary slanted with respect to a stopped magnetic tape by taking an expected tape running speed during reproduction into consideration.

Figure 55:
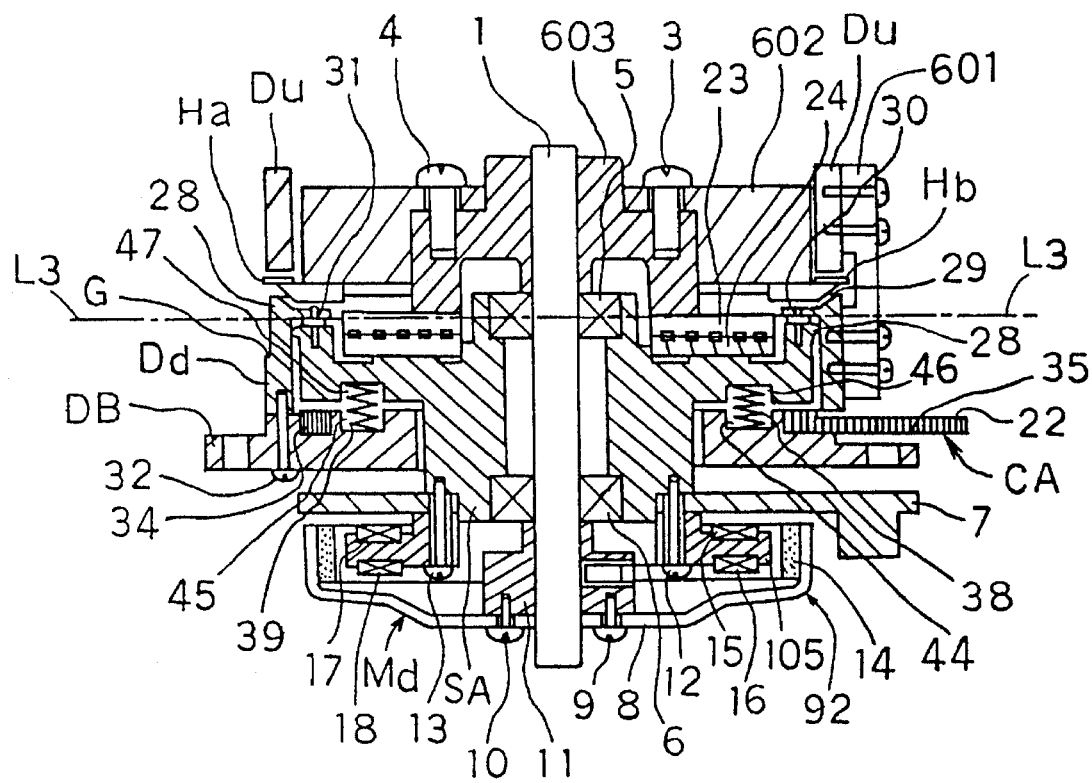
FIGS. 55(a) and 55(b) illustrates major portion of a modified version of the first embodiment shown in FIGS. 44(a) and (b).
Figure 55:
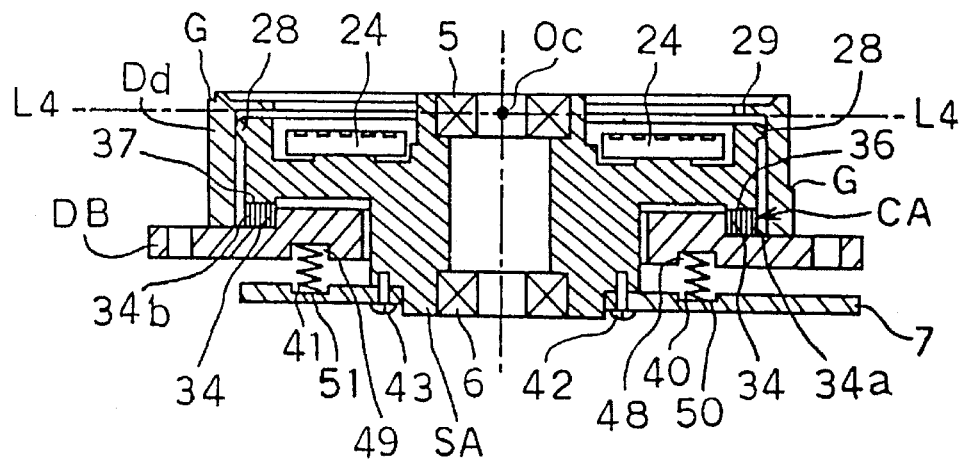

Further, regarding the aforementioned embodiments, description is given with the rotary magnetic heads Ha, Hb mounted on the rotary upper drum Du, however, the present invention can be applied to a case that the upper drum Du is stationary with a rotary disc carrying the rotary magnetic heads Ha, Hb. Explanation is now given to such case referring to FIG. 55, which is practically a modified version of the first embodiment.

FIG. 55(a) shows a sectional view of a drum pair and peripheral components thereof, which is taken along a vertical plane passing through the 90° and the 270° positions in FIG. 2, similarly, FIG. 55(b) shows a view taken along a vertical plane passing through the 0° and the 180° positions in FIG. 2.

In this configuration, the upper drum Du is coaxially fixed to the lower drum Dd mounted stationary on the drum base by a bracket 601, a rotary disc 602 carrying the rotary magnetic heads Ha, Hb is fixed to the rotary shaft 1 with a flange 603, other the above the structure is similar to the first embodiment shown in FIG. 4 and other figures. Accordingly in this configuration, the track compensation is performed as such that the drum Md, the intermediate member SA and the rotary disc 602 and the like are tilted around the fine L3 (point Oc) as an integral unit. The upper drum Du functions as a slide-contact surface for the magnetic tape T. Since the upper and lower drums Du and Dd are fixed together, the contact relationship between the magnetic tape T and the drum pair is kept constant regardless of the movement of the intermediate member SA. Although the explanation is given to the modified version of the embodiment 1, the similar modification can be applied as well to other embodiments described in the foregoing.

What is claimed is:

1. A magnetic recording/reproducing apparatus including drum means provided with rotary head means for recording and reproducing signals on and from slant tracks on a magnetic tape threaded around a periphery of said drum means, said drum means having a contact portion extending along said periphery in a predetermined angular range, said contact portion making a slide contact with the magnetic tape threaded around said drum means, said drum means having an upper drum and a lower drum, said lower drum being comprised of a lead portion for guiding a reference edge of said magnetic tape, said magnetic recording/reproducing apparatus comprising:

pivot means for pivoting said rotary head means, said pivot means provided on a straight line extending orthogonal to a central axis of said lower drum and approximately bisecting said predetermined angular range and further residing within a vicinity of a locus plane of said rotary head means, said pivot means provided in a proximity of said locus plane of said rotary head means; and tilting means for causing said locus plane of said rotary head means to tilt with respect to said lower drum and around said straight line by a predetermined angle.

2. A magnetic recording/reproducing apparatus as claimed in claim 1, further comprising:

an intermediate member provided on said drum means for carrying said rotary head means, said intermediate member being provided with bearing means for rotatably supporting a rotary shaft of said rotary head means; and suspending means for suspending said intermediate member coaxially with said lower drum;

said pivot means being provided between said lower drum and said intermediate member.

3. A magnetic recording/reproducing apparatus as claimed in claim 2, wherein said pivot means comprises:
- a pair of holes provided on one of an additional edge portion formed on said lower drum and a portion of an outer peripheral portion of said intermediate member opposing said additional edge portion protruding inwardly from said lower drum; and
- a pair of pins provided on one of said portion of said outer peripheral portion of said intermediate member and said additional edge portion for engaging with said pair of holes respectively.

4. A magnetic recording/reproducing apparatus as claimed in claim 2, wherein said suspending means comprises an edge portion formed in an outer peripheral portion of said intermediate member, said edge portion closely facing an inner portion of said lower drum in a vicinity of a plane which includes said pivot means and is orthogonal to said center axis of said lower drum, and further comprises resilient means for resiliently supporting said intermediate member on a base portion of said magnetic recording/reproducing apparatus.

5. A magnetic recording/reproducing apparatus as claimed in claim 4, wherein said pivot means comprises:
- a pair of holes provided on one of an additional edge portion formed on said lower drum and a portion of said outer peripheral portion of said intermediate member opposing said additional edge portion protruding inwardly from said lower drum; and
- a pair of pins provided on one of said portion of said outer peripheral portion of said intermediate member and said additional edge portion for engaging with said pair of holes respectively.

6. A magnetic recording/reproducing apparatus as claimed in claim 2, wherein said pivot means comprises:
- a pair of holes provided on one of an additional edge portion formed on said intermediate member and a portion of said lower drum opposing said additional edge portion protruding outwardly from said intermediate member; and
- a pair of pins provided on one of said additional edge portion and said portion of said lower drum opposing said additional edge portion for engaging with said pair of holes respectively.

7. A magnetic recording/reproducing apparatus as claimed in claim 6, wherein an outer diameter of said additional edge portion of said intermediate member is identical to an outer diameter of said contact portion provided on said lower drum.

8. A magnetic recording/reproducing apparatus as claimed in claim 2, wherein said suspending means comprises an edge portion formed in an inner peripheral portion of said lower drum, said edge portion closely facing an outer periphery of said intermediate member in a vicinity of a plane which includes aid pivot means and is orthogonal to said center axis of said lower drum, and further comprises resilient means for resiliently supporting said intermediate member on a base portion of said magnetic recording/reproducing apparatus.

9. A magnetic recording/reproducing apparatus as claimed in claim 8, wherein said pivot means comprises:
- a pair of holes provided on one of an additional edge portion formed on said intermediate member and a portion of said lower drum opposing said additional edge portion protruding outwardly from said intermediate member: and
- a pair of pins provided on one of said additional edge portion and said portion of said lower drum opposing to said additional edge portion for engaging with said pair of holes respectively.

10. A magnetic recording/reproducing apparatus as claimed in claim 9, wherein an outer diameter of said additional edge portion of said intermediate member is identical to an outer diameter of said contact portion provided on said lower drum.

11. A magnetic recording/reproducing apparatus as claimed in claim 1 further comprising:
- an intermediate member provided on said drum means, said intermediate member having a shaft fixedly secured thereto, said shaft being adapted to be a rotation center of said upper drum carrying said rotary head means, said upper drum supported by said shaft through bearing means;
- a drum motor having a rotor fixedly secured to said upper drum and a stator fixedly secured to said shaft of said intermediate member;
- suspending means for suspending said intermediate member coaxially with said lower drum; and
- said pivot means being provided between said lower drum and said intermediate member.

12. A magnetic recording/reproducing apparatus as claimed in claim 11, further comprising:
- a first guide roller provided in a running path of said magnetic tape at an inlet side of said drum means for restricting a height of said magnetic tape running therethrough;
- a second guide roller provided in said running path at an exit side of said drum means for restricting the height of said magnetic tape running therethrough;
- a first displacement means for changing a height of said first guide roller in a width direction of said magnetic tape; and
- a second displacement means for changing a height of said second guide roller in the width direction of said magnetic tape.

13. A magnetic recording/reproducing apparatus as claimed in claim 11, wherein said suspending means comprises an opening formed at a center portion of said lower drum, said opening loosely fitted on said shaft of said intermediate member in a vicinity of a plane which includes said pivot means and is orthogonal to said central axis of said lower drum, and further comprises resilient means for resiliently supporting said intermediate member on a base portion of said magnetic recording/reproducing apparatus.

14. A magnetic recording/reproducing apparatus as claimed in claim 13, further comprising:
- a first guide roller provided in a running path of said magnetic tape at an inlet side of said drum means for restricting a height of said magnetic tape running therethrough;
- a second guide roller provided in said running path at exit side of said drum means for restricting the height said magnetic tape running therethrough;
- a first displacement means for changing a height of said first guide roller in a width direction of said magnetic tape; and
- a second displacement means for changing a height of said second guide roller in the width direction of said magnetic tape.

15. A magnetic recording/reproducing apparatus as claimed in claim 1 further comprising:
- an intermediate member provided on said drum means for carrying said rotary head means, said intermediate member being provided with first bearing means for rotatably supporting a rotary shaft of said rotary head means;

second bearing means coaxially provided on said lower drum, said first bearing means residing within a vicinity of said locus plane of said rotary head means for rotatably supporting said rotary shaft of said rotary head means; and said pivot means being provided between said lower drum and said intermediate member.

* * * * *